US011920392B1

(12) United States Patent
Krietzman et al.

(10) Patent No.: US 11,920,392 B1
(45) Date of Patent: Mar. 5, 2024

(54) ELECTRICAL BONDING DOOR HINGES

(71) Applicant: CHATSWORTH PRODUCTS, INC., Agoura Hills, CA (US)

(72) Inventors: William Drew Krietzman, Rathdrum, ID (US); Preston Ellis Hennrich, Leander, TX (US); John Wayne Robertson, Georgetown, TX (US)

(73) Assignee: Chatsworth Products, Inc., Simi Valley, CA (US)

( * ) Notice: Subject to any disclaimer, the term of this patent is extended or adjusted under 35 U.S.C. 154(b) by 0 days.

(21) Appl. No.: 17/589,724

(22) Filed: Jan. 31, 2022

Related U.S. Application Data

(60) Provisional application No. 63/144,921, filed on Feb. 2, 2021.

(51) Int. Cl.
*E05D 11/00* (2006.01)
*E05D 5/12* (2006.01)
(Continued)

(52) U.S. Cl.
CPC ............ *E05D 11/0081* (2013.01); *E05D 5/12* (2013.01); *E05D 11/1014* (2013.01); *E05D 2005/102* (2013.01); *E05Y 2900/132* (2013.01)

(58) Field of Classification Search
CPC ... Y10T 16/522; Y10T 16/537; Y10T 16/557; H01R 35/02; H01R 35/04; H01H 3/162;
(Continued)

(56) References Cited

U.S. PATENT DOCUMENTS 1,564,611 A 12/1925 Mountford et al.
1,589,613 A 6/1926 Mountford et al.
(Continued)

FOREIGN PATENT DOCUMENTS

CN 102177633 A 9/2011
CN 108431433 A 8/2018
(Continued)

OTHER PUBLICATIONS

Information Disclosure Statement (IDS) Letter Regarding Common Patent Application(s), dated Mar. 16, 2022.
(Continued)

*Primary Examiner* — Chuck Y Mah
(74) *Attorney, Agent, or Firm* — Tillman Wright, PLLC; James D. Wright; David R. Higgins

(57) ABSTRACT

A hinge assembly includes first and second hinge units and an electrically conductive pin. The first hinge unit is mounted to a frame structure of an enclosure and includes a pin support comprising a barrel, a knuckle, or both, a pin receptacle arranged in the pin support, and an electrically conductive structure disposed at least partly inside the pin support and adjacent the pin receptacle. The pin rotates in the pin receptacle. The second hinge unit is carried on the pin and is door mounted. The second hinge unit and door can be removed from the first. The electrically conductive structure is biased against the pin and remains in contact while the pin rotates, and is electrically connected to the enclosure when the first hinge unit is mounted to it such that the pin is electrically bonded to the enclosure while the pin rotates.

20 Claims, 37 Drawing Sheets

30

(51) Int. Cl.
*E05D 11/10* (2006.01)
*E05D 5/10* (2006.01)

(58) Field of Classification Search
CPC ........ H01H 3/161; H01H 13/10; E05D 11/00; E05D 11/0081; E05D 11/1014; E05D 3/02; E05D 2003/025; E05D 5/12; E05D 2005/102; E05D 2900/531; E05D 2900/132; E05D 2800/678; E05D 7/00; G06F 1/1681; G06F 1/1683
See application file for complete search history.

(56) References Cited

U.S. PATENT DOCUMENTS 2,206,739 A 7/1940 Brogren et al.
2,390,752 A 12/1945 Tinnerman
2,406,415 A 8/1946 Tinnerman
2,426,799 A 9/1947 Tinnerman
2,430,555 A 11/1947 Burke
2,495,037 A 1/1950 Tinnerman
2,695,046 A 11/1954 Tinnerman, III
2,724,419 A 11/1955 Poupitch
2,778,000 A * 1/1957 Mills .................... F25D 23/028 439/31
2,875,804 A 3/1959 Flora
3,019,409 A 1/1962 Sarafinas
3,034,844 A 5/1962 Anderson et al.
3,035,624 A 5/1962 Jaworski
3,192,823 A 7/1965 Munse
3,247,312 A 4/1966 Allessi
3,355,695 A * 11/1967 Overesch ............ E05D 11/0081 439/31
3,404,931 A 10/1968 Fall et al.
3,431,590 A * 3/1969 Anderson ............... E05D 11/00 16/385
3,486,158 A 12/1969 Soltysik et al.
3,563,627 A 2/1971 Whipps
3,655,254 A 4/1972 Mayer et al.
3,778,932 A 12/1973 Ewing
3,810,069 A 5/1974 Jaconette, Jr.
3,857,625 A * 12/1974 Crane .................... H01R 35/02 439/31
3,919,457 A 11/1975 Steiner
4,040,694 A 8/1977 Lascarrou
4,045,104 A 8/1977 Peterson
4,101,233 A 7/1978 McConnell
4,417,366 A 11/1983 Salice
4,473,166 A 9/1984 Breiter
4,497,411 A 2/1985 DeBortoli
4,553,674 A 11/1985 Yoshikawa et al.
4,575,295 A 3/1986 Rebentisch
4,613,174 A 9/1986 Berg et al.
4,620,392 A 11/1986 Kerpers et al.
4,643,319 A 2/1987 Debus et al.
4,723,749 A 2/1988 Carraro et al.
4,796,541 A 1/1989 Halstrick
4,803,756 A 2/1989 Hufnagel
4,887,949 A 12/1989 Dimmick, III et al.
4,941,717 A 7/1990 Beaulieu
4,966,563 A 10/1990 Pierce et al.
4,974,289 A 12/1990 Piard
4,993,959 A 2/1991 Randolph
5,009,383 A 4/1991 Chapman
5,020,866 A 6/1991 McIlwraith
5,054,978 A 10/1991 Kowalski
5,067,863 A 11/1991 Kowalski
5,078,537 A 1/1992 Nomura
5,147,121 A 9/1992 McIlwraith
5,165,770 A 11/1992 Hahn
5,199,836 A 4/1993 Gogarty
5,212,907 A * 5/1993 Van Sandt ............. H02G 11/00 439/31
5,228,762 A 7/1993 Mascrier
RE34,393 E 9/1993 McIlwraith
5,271,586 A 12/1993 Schmidt
5,294,748 A 3/1994 Schwenk et al.
5,372,262 A 12/1994 Benson et al.
5,380,083 A 1/1995 Jones et al.
5,388,903 A 2/1995 Jones et al.
5,391,084 A 2/1995 Krietzman
5,441,337 A 8/1995 Mazura et al.
5,536,079 A 7/1996 Kostic
5,545,845 A 8/1996 Flores
5,561,886 A 10/1996 Flamme
5,570,940 A 11/1996 Maro
5,593,046 A 1/1997 Katsuura et al.
5,624,319 A 4/1997 Golczyk et al.
5,639,150 A 6/1997 Anderson et al.
5,695,263 A 12/1997 Simon et al.
5,728,973 A 3/1998 Jorgensen
5,788,351 A 8/1998 Prunty et al.
5,791,498 A 8/1998 Mills
5,806,945 A 9/1998 Anderson et al.
5,833,417 A 11/1998 Sargent et al.
5,864,922 A 2/1999 Kraft
5,899,545 A 5/1999 Besserer et al.
5,926,916 A 7/1999 Lee et al.
5,927,368 A 7/1999 Rohrer et al.
5,933,563 A 8/1999 Schaffer et al.
5,938,302 A 8/1999 Anderson et al.
5,940,937 A 8/1999 Churchill et al.
5,975,315 A 11/1999 Jordan
5,983,590 A 11/1999 Serban
5,991,975 A 11/1999 Baer
5,997,117 A 12/1999 Krietzman
6,000,769 A 12/1999 Chen
6,000,771 A 12/1999 Wissinger et al.
6,019,446 A 2/2000 Laboch et al.
6,024,330 A 2/2000 Mroz et al.
6,036,290 A 3/2000 Jancsek et al.
6,082,878 A 7/2000 Doubek
6,083,010 A * 7/2000 Daoud ................ E05D 11/0081 439/31
6,086,300 A 7/2000 Frohlich
6,123,203 A 9/2000 Gibbons
6,123,400 A 9/2000 Nicolai et al.
6,146,071 A 11/2000 Norkus et al.
6,152,554 A 11/2000 Parisi
6,161,803 A 12/2000 Daoud
6,185,098 B1 2/2001 Benavides
6,215,069 B1 4/2001 Martin et al.
6,220,554 B1 4/2001 Daoud
6,254,207 B1 7/2001 Leneutre
6,270,283 B1 8/2001 Turati
6,293,637 B1 9/2001 Anderson et al.
6,299,268 B1 10/2001 Carle et al.
6,321,917 B1 11/2001 Mendoza
6,348,655 B1 2/2002 Wright
6,365,834 B1 4/2002 Larsen et al.
6,401,940 B1 6/2002 Hartel et al.
6,425,488 B1 7/2002 Notohardjono et al.
6,425,648 B1 7/2002 Notohardjono et al.
6,427,952 B2 8/2002 Caveney et al.
6,428,127 B1 8/2002 Rasmussen
6,431,885 B1 8/2002 Stroup
6,457,924 B1 10/2002 Wallace
6,467,633 B2 10/2002 Mendoza
6,468,112 B1 10/2002 Follingstad et al.
6,481,160 B1 11/2002 Kowalczyk
6,489,565 B1 12/2002 Krietzman et al.
6,501,899 B1 12/2002 Marrs et al.
6,502,702 B1 1/2003 Hsue et al.
6,504,100 B2 1/2003 Lawrence et al.
6,515,225 B1 2/2003 Wright
6,517,174 B2 2/2003 Sevier
6,520,345 B1 2/2003 Marovic et al.
6,527,351 B1 3/2003 Sevier et al.
6,535,681 B2 3/2003 Daoud et al.
6,541,705 B1 4/2003 McGrath
6,546,179 B2 4/2003 Petri
6,554,697 B1 4/2003 Koplin
6,561,602 B1 5/2003 Sevier et al.
6,565,166 B1 5/2003 Bulk et al.

(56) References Cited

U.S. PATENT DOCUMENTS

| | | | |
|---|---|---|---|
| 6,584,267 | B1 | 6/2003 | Caveney et al. |
| 6,605,782 | B1 | 8/2003 | Krietzman et al. |
| 6,613,981 | B1 | 9/2003 | Hathcock et al. |
| 6,614,978 | B1 | 9/2003 | Caveney et al. |
| 6,632,999 | B2 | 10/2003 | Sempliner et al. |
| 6,695,149 | B1 | 2/2004 | Cote et al. |
| 6,712,434 | B2 | 3/2004 | Knab et al. |
| 6,755,493 | B1 | 6/2004 | Krietzman et al. |
| 6,760,531 | B1 | 7/2004 | Solheid et al. |
| 6,762,360 | B2 | 7/2004 | Wright |
| 6,796,437 | B2 | 9/2004 | Krampotich et al. |
| 6,808,240 | B2 | 10/2004 | Altena |
| 6,814,244 | B1 | 11/2004 | Hathcock |
| 6,831,225 | B2 | 12/2004 | Chandler |
| 6,883,879 | B2 | 4/2005 | Latchinian |
| 6,884,942 | B2 | 4/2005 | McGrath et al. |
| 6,915,616 | B2 | 7/2005 | Fontana et al. |
| 6,918,796 | B2 | 7/2005 | Elliot et al. |
| 6,946,605 | B2 | 9/2005 | Levesque et al. |
| 6,951,288 | B2 | 10/2005 | Henderson |
| 6,964,588 | B2 | 11/2005 | Follingstad et al. |
| 6,968,647 | B2 | 11/2005 | Levesque et al. |
| 6,976,292 | B2 | 12/2005 | MacPherson et al. |
| 6,981,893 | B2 | 1/2006 | Barker et al. |
| 6,992,247 | B2 | 1/2006 | Rasmussen et al. |
| 7,000,784 | B2 | 2/2006 | Canty et al. |
| 7,019,213 | B1 | 3/2006 | McNutt et al. |
| 7,026,553 | B2 | 4/2006 | Levesque et al. |
| 7,119,282 | B2 | 10/2006 | Krietzman et al. |
| 7,144,320 | B2 | 12/2006 | Turek et al. |
| 7,178,292 | B2 | 2/2007 | Yamada |
| 7,178,679 | B2 | 2/2007 | Canty et al. |
| 7,200,316 | B2 | 4/2007 | Giraud et al. |
| 7,220,150 | B2 | 5/2007 | Follingstad et al. |
| 7,225,586 | B2 | 6/2007 | Levesque et al. |
| 7,226,260 | B2 | 6/2007 | Jackson, Jr. et al. |
| 7,255,640 | B2 | 8/2007 | Aldag et al. |
| 7,259,326 | B2 | 8/2007 | Nguyen |
| 7,285,027 | B2 | 10/2007 | McGrath et al. |
| 7,293,666 | B2 | 11/2007 | Mattlin et al. |
| 7,316,461 | B2 | 1/2008 | Wyatt et al. |
| 7,362,941 | B2 | 4/2008 | Rinderer et al. |
| 7,378,046 | B2 | 5/2008 | Canty et al. |
| 7,381,100 | B2 | 6/2008 | Follingstad et al. |
| 7,417,188 | B2 | 8/2008 | McNutt et al. |
| 7,425,678 | B2 | 9/2008 | Adducci et al. |
| 7,427,713 | B2 | 9/2008 | Adducci et al. |
| 7,438,638 | B2 | 10/2008 | Lewis, II et al. |
| 7,458,859 | B2 | 12/2008 | McGrath et al. |
| 7,472,970 | B2 | 1/2009 | Bergesch et al. |
| 7,476,804 | B2 | 1/2009 | Adducci et al. |
| 7,485,803 | B2 | 2/2009 | Adducci et al. |
| 7,495,169 | B2 | 2/2009 | Adducci et al. |
| 7,498,512 | B2 | 3/2009 | Adducci et al. |
| 7,504,581 | B2 | 3/2009 | Adducci et al. |
| 7,507,912 | B1 | 3/2009 | Sempliner et al. |
| 7,542,287 | B2 | 6/2009 | Lewis, II et al. |
| 7,547,228 | B1 | 6/2009 | Schlarman |
| 7,592,541 | B2 | 9/2009 | Adducci et al. |
| 7,608,779 | B2 | 10/2009 | Adducci et al. |
| 7,637,771 | B2 | 12/2009 | Laursen |
| 7,667,135 | B2 | 2/2010 | Adducci et al. |
| 7,697,285 | B2 | 4/2010 | Donowho et al. |
| 7,718,889 | B2 | 5/2010 | Rasmussen et al. |
| 7,718,891 | B2 | 5/2010 | Adducci et al. |
| 7,746,637 | B2 | 6/2010 | Donowho et al. |
| 7,762,405 | B2 | 7/2010 | Vogel et al. |
| 7,764,495 | B2 | 7/2010 | Hruby et al. |
| 7,772,489 | B2 | 8/2010 | Adducci et al. |
| 7,778,513 | B2 | 8/2010 | Rinderer et al. |
| 7,781,675 | B2 | 8/2010 | Adducci et al. |
| 7,789,606 | B2 | 9/2010 | Kosidlo, IV et al. |
| 7,795,532 | B2 | 9/2010 | Walker |
| 7,804,685 | B2 | 9/2010 | Krietzman |
| 7,823,846 | B2 | 11/2010 | Williams, III |
| 7,839,635 | B2 | 11/2010 | Donowho et al. |
| 7,880,084 | B2 | 2/2011 | Adducci et al. |
| 7,893,356 | B2 | 2/2011 | Garza et al. |
| 7,894,190 | B2 | 2/2011 | Davis et al. |
| 7,952,869 | B2 | 5/2011 | Lewis, II et al. |
| 7,957,139 | B2 | 6/2011 | Davis et al. |
| 7,973,242 | B2 | 7/2011 | Jones et al. |
| 7,999,183 | B2 | 8/2011 | Garza et al. |
| 8,035,965 | B2 | 10/2011 | Adducci et al. |
| 8,040,673 | B2 | 10/2011 | Krietzman |
| 8,049,109 | B2 | 11/2011 | Sempliner et al. |
| 8,107,238 | B2 | 1/2012 | Krietzman et al. |
| 8,138,419 | B2 | 3/2012 | Garza et al. |
| 8,235,634 | B2 | 8/2012 | Larsen et al. |
| 8,237,052 | B2 | 8/2012 | Adducci et al. |
| 8,263,867 | B2 | 9/2012 | Garza et al. |
| 8,273,989 | B2 | 9/2012 | Garza et al. |
| 8,281,940 | B2 | 10/2012 | Fan |
| 8,317,274 | B2 | 11/2012 | Isiao |
| 8,330,043 | B2 | 12/2012 | Alaniz et al. |
| 8,395,046 | B2 | 3/2013 | Nicewicz et al. |
| 8,405,984 | B2 | 3/2013 | Donowho et al. |
| 8,424,691 | B2 | 4/2013 | McMillan, III et al. |
| 8,443,987 | B2 | 5/2013 | Peng et al. |
| 8,459,918 | B2 | 6/2013 | Lin et al. |
| 8,556,357 | B2 | 10/2013 | Fan |
| 8,628,158 | B2 | 1/2014 | Caveney |
| 8,653,363 | B2 | 2/2014 | Behrens et al. |
| 8,683,762 | B2 | 4/2014 | Rodriquez et al. |
| 8,730,665 | B2 | 5/2014 | Lewis, II et al. |
| 8,737,068 | B2 | 5/2014 | Krietzman et al. |
| 8,746,466 | B2 | 6/2014 | Taylor |
| 8,787,023 | B2 | 7/2014 | Lewis et al. |
| 8,844,888 | B1 | 9/2014 | Gretz |
| 8,867,206 | B2 | 10/2014 | Hruby et al. |
| 8,879,881 | B2 | 11/2014 | Cote et al. |
| 8,901,438 | B2 | 12/2014 | Lewis, II et al. |
| 8,966,821 | B2 | 3/2015 | Walker et al. |
| 8,973,951 | B2 | 3/2015 | Nicewicz |
| 9,055,677 | B2 | 6/2015 | Garza, Jr. et al. |
| 9,084,369 | B2 | 7/2015 | Lewis, II et al. |
| 9,119,329 | B2 | 8/2015 | Krietzman et al. |
| 9,185,824 | B2 | 11/2015 | Nordin et al. |
| 9,210,833 | B2 | 12/2015 | Caveney et al. |
| 9,332,863 | B2 | 5/2016 | Ramey et al. |
| 9,351,427 | B2 | 5/2016 | Lewis, II et al. |
| 9,408,326 | B2 | 8/2016 | Lewis, II et al. |
| 9,420,727 | B2 | 8/2016 | Lewis, II et al. |
| 9,548,597 | B2 | 1/2017 | Vacca et al. |
| 9,549,487 | B2 | 1/2017 | Lewis, II et al. |
| 9,572,286 | B2 | 2/2017 | Greeson et al. |
| 9,627,860 | B2 | 4/2017 | Proserpio et al. |
| 9,642,270 | B2 | 5/2017 | Lewis, II et al. |
| 9,781,852 | B2 | 10/2017 | Garza, Jr. et al. |
| 9,795,060 | B2 | 10/2017 | Greeson et al. |
| 9,801,309 | B2 | 10/2017 | Krietzman et al. |
| 9,814,159 | B2 | 11/2017 | Lewis, II et al. |
| 9,943,003 | B2 | 4/2018 | Segroves et al. |
| 9,949,406 | B2 | 4/2018 | Lewis, II et al. |
| 9,974,198 | B2 | 5/2018 | Lewis, II et al. |
| 9,980,400 | B2 | 5/2018 | Lewis, II et al. |
| 10,123,462 | B2 | 11/2018 | Krietzman et al. |
| 10,178,784 | B2 | 1/2019 | Lewis, II et al. |
| 10,182,651 | B2 | 1/2019 | Post et al. |
| 10,237,994 | B2 | 3/2019 | Donowho et al. |
| 10,271,452 | B2 | 4/2019 | Hennrich et al. |
| 10,334,761 | B2 | 6/2019 | Krietzman et al. |
| 10,337,550 | B2 | 7/2019 | Davis et al. |
| 10,356,951 | B2 | 7/2019 | Lewis, II et al. |
| 10,440,847 | B2 | 10/2019 | Lewis, II et al. |
| 10,477,720 | B2 | 11/2019 | Hennrich et al. |
| 10,568,239 | B2 | 2/2020 | Krietzman et al. |
| 10,588,227 | B2 | 3/2020 | Donowho et al. |
| 10,595,442 | B2 | 3/2020 | Davis |
| 10,624,232 | B2 | 4/2020 | Krietzman |
| 10,653,025 | B2 | 5/2020 | Garza et al. |
| 10,674,634 | B2 | 6/2020 | Lewis, II et al. |
| 10,765,037 | B2 | 9/2020 | Lewis, II et al. |
| 10,791,640 | B2 | 9/2020 | Lewis, II et al. |

(56) References Cited

U.S. PATENT DOCUMENTS 10,859,111 B2 12/2020 Davis
11,039,543 B2 6/2021 Donowho et al.
11,071,227 B2 7/2021 Hennrich et al.
11,083,108 B2 8/2021 Lewis, II et al.
11,162,615 B2 11/2021 Hennrich et al.
11,209,039 B2 12/2021 Davis et al.
11,212,928 B2 12/2021 Lewis, II et al.
11,268,636 B2 3/2022 Hennrich et al.
11,444,438 B2 9/2022 Schindler et al.
11,464,123 B2 10/2022 Garza, Jr. et al.
11,464,132 B2 10/2022 Krietzman
11,493,151 B2 11/2022 Hennrich et al.
11,547,020 B2 1/2023 Lewis, II et al.
11,619,328 B2 4/2023 Hennrich et al.
11,622,458 B1 4/2023 Hennrich et al.
11,622,469 B2 4/2023 Waz et al.
11,627,677 B1 4/2023 Hennrich et al.
11,644,125 B2 5/2023 Hennrich
11,644,126 B2 5/2023 Hennrich et al.
11,678,447 B2 6/2023 Lewis, II et al.
11,678,456 B1 6/2023 Krietzman et al.
11,678,458 B1 6/2023 Krietzman et al.
11,706,898 B2 7/2023 Krietzman
11,785,745 B2 10/2023 Lewis, II et al.
11,792,948 B2 10/2023 Garza, Jr. et al.
2002/0046979 A1 4/2002 Larsen et al.
2002/0074149 A1 6/2002 Lawrence et al.
2002/0149911 A1 10/2002 Bishop et al.
2002/0172013 A1 11/2002 Chandler
2003/0020379 A1 1/2003 Larsen et al.
2003/0034717 A1 2/2003 Yao
2003/0079897 A1 5/2003 Sempliner et al.
2003/0226238 A1 12/2003 Baer
2004/0016713 A1 1/2004 Wyatt et al.
2004/0020873 A1 2/2004 Henderson
2004/0050808 A1 3/2004 Krampotich et al.
2004/0154818 A1 8/2004 Franks, Jr.
2004/0181916 A1 9/2004 Arduini
2004/0183409 A1 9/2004 Rinderer
2004/0190270 A1 9/2004 Aldag et al.
2004/0201335 A1 10/2004 Davis
2005/0220562 A1 10/2005 Blackaby
2005/0247650 A1 11/2005 Vogel et al.
2006/0103270 A1 5/2006 Bergesch et al.
2006/0141921 A1 6/2006 Turek et al.
2007/0064389 A1 3/2007 Lewis, II et al.
2007/0064391 A1 3/2007 Lewis, II et al.
2007/0210679 A1 9/2007 Adducci et al.
2007/0210680 A1 9/2007 Appino et al.
2007/0210681 A1 9/2007 Adducci et al.
2007/0210683 A1 9/2007 Adducci et al.
2007/0210686 A1 9/2007 Adducci et al.
2007/0221393 A1 9/2007 Adducci et al.
2007/0249237 A1 10/2007 Follingstad et al.
2007/0257159 A1 11/2007 Nelson et al.
2007/0257169 A1 11/2007 Taggett
2007/0293138 A1 12/2007 Adducci et al.
2008/0035810 A1 2/2008 Lewis, II
2008/0037228 A1 2/2008 Lewis, II
2008/0062654 A1 3/2008 Mattlin et al.
2008/0067904 A1 3/2008 Adducci et al.
2008/0074849 A1 3/2008 Adducci et al.
2008/0130262 A1 6/2008 Rinderer et al.
2008/0141495 A1 6/2008 Fisher
2008/0155915 A1 7/2008 Howe et al.
2008/0174217 A1 7/2008 Walker
2008/0266789 A1 10/2008 Hruby et al.
2008/0289873 A1 11/2008 Derring et al.
2008/0316702 A1 12/2008 Donowho et al.
2008/0316703 A1 12/2008 Donowho et al.
2009/0014614 A1 1/2009 Warmoth et al.
2009/0059523 A1 3/2009 Mallia et al.
2009/0061755 A1 3/2009 Calder et al.
2009/0093169 A1 4/2009 McGrath et al.
2009/0129013 A1 5/2009 Donowho et al.
2009/0151983 A1 6/2009 Sempliner et al.
2009/0165250 A1 7/2009 Duan et al.
2009/0190307 A1 7/2009 Krietzman
2009/0227197 A1 9/2009 Lewis, II et al.
2009/0236117 A1 9/2009 Garza et al.
2009/0239461 A1 9/2009 Lewis, II et al.
2009/0283488 A1 11/2009 McMillan, III et al.
2010/0003911 A1 1/2010 Graczyk et al.
2010/0061059 A1 3/2010 Krietzman et al.
2010/0084188 A1 4/2010 Rajvanshi et al.
2010/0096105 A1 4/2010 Novotny et al.
2010/0096962 A1 4/2010 Rajvanshi et al.
2010/0101820 A1 4/2010 Alaniz et al.
2010/0122830 A1 5/2010 Garza et al.
2010/0126750 A1 5/2010 Garza et al.
2010/0126751 A1 5/2010 Garza et al.
2010/0172092 A1 7/2010 Davis et al.
2010/0172093 A1 7/2010 Davis et al.
2010/0193241 A1 8/2010 Bennett et al.
2010/0193754 A1 8/2010 Garza et al.
2010/0200707 A1 8/2010 Garza et al.
2010/0243315 A1 9/2010 Shumate et al.
2011/0001408 A1 1/2011 Caveney et al.
2011/0019362 A1 1/2011 Krietzman
2011/0020091 A1 1/2011 Larsen et al.
2011/0083873 A1 4/2011 Hartman et al.
2011/0100668 A1 5/2011 Syed
2011/0148261 A1 6/2011 Donowho et al.
2011/0173906 A1 7/2011 Reddicliffe
2011/0278060 A1 11/2011 Rajvanshi et al.
2011/0278999 A1 11/2011 Caveney et al.
2011/0287704 A1 11/2011 Lewis, II et al.
2011/0290553 A1 12/2011 Behrens et al.
2011/0308179 A1 12/2011 Pirner
2012/0012543 A1 1/2012 Fan
2012/0013229 A1 1/2012 Krietzman
2012/0043869 A1 2/2012 Liu et al.
2012/0049706 A1 3/2012 Cottuli et al.
2012/0062083 A1 3/2012 Lewis, II et al.
2012/0062084 A1 3/2012 Lewis, II et al.
2012/0062086 A1 3/2012 Garza, Jr. et al.
2012/0062091 A1 3/2012 Donowho et al.
2012/0063099 A1 3/2012 Alaniz et al.
2012/0080984 A1 4/2012 Watts
2012/0110788 A1 5/2012 Chen
2012/0134763 A1 5/2012 Lin et al.
2012/0181906 A1 7/2012 Caveney
2012/0194999 A1 8/2012 Krietzman et al.
2012/0244729 A1 9/2012 Rivera et al.
2012/0267991 A1 10/2012 Adducci et al.
2012/0279779 A1 11/2012 Cottuli et al.
2012/0292278 A1 11/2012 Schluter et al.
2012/0305307 A1 12/2012 Korcz et al.
2013/0069501 A1 3/2013 Liu
2014/0132134 A1 5/2014 Garza, Jr. et al.
2014/0319084 A1 10/2014 Lewis, II et al.
2014/0323029 A1 10/2014 Lewis, II et al.
2014/0334099 A1 11/2014 Krietzman et al.
2015/0008810 A1 1/2015 Ivey et al.
2015/0030300 A1 1/2015 Terry et al.
2015/0065028 A1 3/2015 Krietzman
2015/0069888 A1 3/2015 Lewis, II et al.
2015/0136714 A1 5/2015 Franklin
2015/0173253 A1 6/2015 Lewis, II et al.
2015/0250071 A1 9/2015 Garza, Jr. et al.
2015/0264839 A1 9/2015 Lewis, II et al.
2015/0282390 A1 10/2015 Lewis, II et al.
2015/0319872 A1 11/2015 Lewis, II et al.
2015/0333303 A1 11/2015 Hachiya et al.
2015/0342082 A1 11/2015 Roehrl et al.
2015/0351289 A1 12/2015 Krietzman et al.
2015/0366094 A1 12/2015 Segroves et al.
2016/0138261 A1 5/2016 Zhang et al.
2016/0262277 A1 9/2016 Lewis, II et al.
2016/0302317 A1 10/2016 Lewis, II et al.
2017/0127569 A1 5/2017 Rimler et al.
2017/0127570 A1 5/2017 Lewis, II et al.
2017/0150652 A1 5/2017 Greeson et al.
2017/0167523 A1 6/2017 Davis et al.

(56) References Cited

U.S. PATENT DOCUMENTS

| | | | |
|---|---|---|---|
| 2017/0223864 A1 | 8/2017 | Jost et al. | |
| 2017/0223865 A1 | 8/2017 | Lewis, II et al. | |
| 2017/0254129 A1* | 9/2017 | Gompper | E06B 5/006 |
| 2017/0290181 A1 | 10/2017 | Donowho et al. | |
| 2017/0331269 A1 | 11/2017 | Hansen | |
| 2017/0332501 A1 | 11/2017 | Lewis, II et al. | |
| 2018/0027677 A1 | 1/2018 | Garza, Jr. et al. | |
| 2018/0042143 A1 | 2/2018 | Krietzman et al. | |
| 2018/0110153 A1 | 4/2018 | Hennrich et al. | |
| 2018/0228056 A1 | 8/2018 | Lewis, II et al. | |
| 2018/0263127 A1 | 9/2018 | Lewis, II et al. | |
| 2018/0270968 A1 | 9/2018 | Lewis, II et al. | |
| 2019/0063483 A1 | 2/2019 | Davis | |
| 2019/0098791 A1 | 3/2019 | Hennrich et al. | |
| 2019/0098792 A1 | 3/2019 | Hennrich et al. | |
| 2019/0215973 A1 | 7/2019 | Donowho et al. | |
| 2019/0313551 A1 | 10/2019 | Krietzman et al. | |
| 2019/0343023 A1 | 11/2019 | Lewis, II et al. | |
| 2020/0039033 A1 | 2/2020 | Lai et al. | |
| 2020/0077533 A1 | 3/2020 | Lu et al. | |
| 2020/0077534 A1 | 3/2020 | Hennrich et al. | |
| 2020/0113074 A1 | 4/2020 | Lewis, II et al. | |
| 2020/0187387 A1 | 6/2020 | Lewis, II et al. | |
| 2020/0196465 A1 | 6/2020 | Donowho et al. | |
| 2020/0245494 A1 | 7/2020 | Krietzman | |
| 2020/0275569 A1 | 8/2020 | Garza, Jr. et al. | |
| 2020/0288605 A1 | 9/2020 | Lewis, II et al. | |
| 2020/0367381 A1 | 11/2020 | Hennrich et al. | |
| 2020/0367382 A1 | 11/2020 | Hennrich et al. | |
| 2020/0383230 A1 | 12/2020 | Hennrich et al. | |
| 2020/0396868 A1 | 12/2020 | Lewis, II et al. | |
| 2021/0014988 A1 | 1/2021 | Lewis, II et al. | |
| 2021/0079944 A1 | 3/2021 | Davis | |
| 2021/0307183 A1 | 9/2021 | Donowho et al. | |
| 2021/0329808 A1 | 10/2021 | Hennrich et al. | |
| 2021/0385976 A1 | 12/2021 | Lewis, II et al. | |
| 2022/0034430 A1 | 2/2022 | Hennrich et al. | |
| 2022/0099133 A1 | 3/2022 | Davis | |
| 2022/0124924 A1 | 4/2022 | Lewis, II et al. | |
| 2022/0183190 A1 | 6/2022 | Lewis, II et al. | |
| 2022/0235883 A1 | 7/2022 | Hennrich et al. | |
| 2023/0013890 A1 | 1/2023 | Garza, Jr. et al. | |
| 2023/0014492 A1 | 1/2023 | Krietzman | |
| 2023/0065144 A1 | 3/2023 | Hennrich et al. | |
| 2023/0156974 A1 | 5/2023 | Lewis, II et al. | |
| 2023/0243445 A1 | 8/2023 | Hennrich et al. | |
| 2023/0328914 A1 | 10/2023 | Krietzman | |

FOREIGN PATENT DOCUMENTS

| | | | | |
|---|---|---|---|---|
| CN | 201680073061.8 | | 5/2021 | |
| DE | 29607244 | U1 * | 8/1997 | E05D 11/00 |
| DE | 19707594 | A1 * | 10/1997 | E05D 11/00 |
| DE | 20207426 | U1 | 9/2002 | |
| EP | 2205054 | A1 | 7/2010 | |
| EP | 2429271 | | 3/2012 | |
| EP | 2429272 | | 3/2012 | |
| FR | 1402979 | A | 6/1965 | |
| FR | 2794501 | A1 | 12/2000 | |
| FR | 2904732 | A1 * | 2/2008 | B60R 16/0207 |
| GB | 981072 | A | 1/1965 | |
| GB | 2366084 | B | 9/2002 | |
| JP | H8-8-187537 | | 7/1996 | |
| JP | 2019-502069 | | 1/2019 | |
| JP | 7066618 | | 5/2022 | |
| SE | 535066 | C2 | 4/2012 | |
| TW | 201630514 | A | 8/2016 | |
| WO | 1999048305 | | 9/1999 | |
| WO | 2001001533 | A1 | 1/2001 | |
| WO | 2001001534 | A1 | 1/2001 | |
| WO | 2005112477 | A1 | 11/2005 | |
| WO | 2006055506 | A2 | 5/2006 | |
| WO | 2008022058 | A2 | 2/2008 | |
| WO | 2008022058 | A3 | 11/2008 | |
| WO | 2009089306 | A1 | 7/2009 | |
| WO | 2009103090 | A2 | 8/2009 | |
| WO | 2009103090 | A3 | 10/2009 | |
| WO | 2010028384 | A2 | 3/2010 | |
| WO | 2010028384 | A3 | 5/2010 | |
| WO | 2009089306 | A4 | 6/2011 | |
| WO | 2017105840 | A1 | 6/2017 | |
| WO | 2018022721 | A1 | 2/2018 | |

OTHER PUBLICATIONS

Chatsworth Products, Inc., "Thermal Management Solutions," Signature Solutions Brochure, available at Internet Web Page <www.chatsworth.com/passivecooling>, dated Mar. 2008 (6 pages).

Emerson Network Power, Smart Cooling Solutions Data Center, Oct. 2012, Internet Web Page <http://www.emersonnetworkpower.com/en-EMEA/Products/RACKSANDINTEGRATEDCABINETS/Documents/Knurr%20DCD/Smart-Cooling-Solutions-Data-Center-EN.pdf> (51 pages).

Hewlett-Packard Development Company, LP, HP 10000 G2 42U Rack Air Duct Installation Guide, dated Aug. 2008 (23 pages).

Panduit Corporation, Panduit Net-Access Vertical Exhaust Duct (VED) Instructions, dated 2009 (4 pages).

Panduit Corporation, Panduit Net-Access Vertical Exhaust System (VES) Specification Sheet, dated 2011 (4 pages).

Rack Technologies PTY Ltd, Product Catalog, Internet Web Page <http://racktechnologies.com.au/files/rt2005.pdf>, Jun. 16, 2005, retrieved from Internet Archive Wayback Machine <http://web.archive.org/web/20050616212856/http://racktechnologies.com.au/files/rt2005.pdf> as reviewed as of Apr. 29, 2016 (73 pages).

Eaton Corporation, Eaton Airflow Management Solutions: Installation Guide for Telescopic Chimney for SSeries Enclosures, Publication No. MN160007EN, dated 2014 (13 pages).

Eaton Corporation, Data Center Products: Eaton Telescopic Chimney, dated 2014 (2 pages).

Panduit Corporation, Panduit Vertical Exhaust Duct for N-Type and S-Type Cabinets: Installation Instructions, dated 2012 (14 pages).

"European Search Report" European Patent Application No. 11275109.4 for Chatsworth Products Inc., dated Sep. 18, 2014 (5 pages).

Information Disclosure Statement (IDS) Letter Regarding Common Patent Application(s), dated Sep. 12, 2022.

Information Disclosure Statement (IDS) Letter Regarding Common Patent Application(s), dated Dec. 12, 2022.

Information Disclosure Statement (IDS) Letter Regarding Common Patent Application(s), dated Mar. 16, 2023.

Information Disclosure Statement (IDS) Letter Regarding Common Patent Application(s), dated Jun. 15, 2023.

Information Disclosure Statement (IDS) Letter Regarding Common Patent Application(s), dated Oct. 20, 2023.

* cited by examiner prior art

*prior art*

*prior art*

110

330

330

330

ELECTRICAL BONDING DOOR HINGES

CROSS-REFERENCE TO RELATED APPLICATIONS

The present application is a U.S. nonprovisional patent application of, and claims priority under 35 U.S.C. § 119(e) to, U.S. provisional patent application Ser. No. 63/144,921, filed Feb. 2, 2021, which '921 application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to electrical bonding in an electronic equipment enclosure, and, in particular, to electrically bonding the door of an enclosure to the frame.

Background

In any device or system utilizing electrical power, it is important to reduce electrical safety and operational issues via proper grounding and/or bonding. The electrical protection of today's high-speed cabling systems is an essential part of a properly designed and installed information and communications technology (ICT) infrastructure. A bonding and grounding system will aid in controlling negative influences such as electromagnetic interference (EMI), electrostatic discharge (ESD) or ground potential rise from lightning.

The idea in electrical bonding is to bring a series of devices or structures to the same electrical potential so that a fault current does not cause one element of the system to become energized or "hot" (leading to a shock or fire hazard). Bonding prevents this because, without potential differences, there is no voltage differential seeking a path. In the event of a fault, the current automatically eases and helps prevent a structure from going hot. Although bonding by itself does not protect people or devices, when combined with grounding, it is a staple of safe electrical design.

Bonding and grounding in an electronic equipment environment involve many components at different points in an installation. The particular bonding and grounding solutions that are utilized depend on the particular application involved. For example, in an electronic equipment enclosure in which hinged doors are to be electrically bonded to the enclosure frames, special care must be taken to accommodate the movement of the doors. This typically involves the use of a length of electrical wire fastened and bonded to both the frame and the door. In this regard, FIG. 1 is a fragmentary isometric view of a portion of an electronic equipment enclosure utilizing internal hinge assemblies and conventional electrical bonding from a door to the enclosure frame, and FIGS. 2 and 3 are fragmentary isometric views of a portion of an electronic equipment enclosure utilizing external hinge assemblies and conventional electrical bonding from a door to the enclosure frame.

Although the approaches illustrated in FIGS. 1-3 accomplish the necessary electrical bonding, they require a number of additional dedicated components. In general, these approaches require the use of wires, quick disconnect terminals, rivets, rivet nuts, welded threaded studs, paint cutting washers and/or nuts, and the like, and the installation of these components requires additional labor operations. The number of steps required to complete the necessary electrical connections becomes particularly important in environments where the doors are removed and reinstalled frequently by technicians for the purpose of installing equipment in an electronic equipment enclosure and/or making changes to such equipment. Furthermore, there is a risk that an installer or technician may fail to carry out these steps, which creates risks to the user. Still further, removing a door that is bonded in this manner requires unplugging quick disconnect terminals, unfastening hardware, and/or the like.

Notably, the hinge assemblies themselves provide a mechanical interface between doors and the enclosure frames to which they are attached. More particularly, the hinge assemblies include pins, barrels, knuckles, and the like that interact as the respective doors are opened and closed. Even when they are made of electrically conductive materials, however, they have not historically been able to provide reliable electrical bonding. More recently, however, internal hinge components have been developed to provide frictional resistance, thereby controlling the opening/closing speed of the hinge. Examples of such elements include torque elements, detent features, and making contact using removable pins. However, although useful for their intended purposes, these features have not been used for electrical bonding.

In view of these and other disadvantages, a need exists for an improved approach to electrically bonding an electronic equipment enclosure door to the frame, preferably involving the use of the hinges themselves, and a particular need exists for such an approach when removing and installing the door.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of electrically bonding the door of an electronic equipment enclosure door to its frame structure, the present invention is not limited to use only in electrically bonding a door to a frame structure, as will become apparent from the following summaries and detailed descriptions of aspects, features, and one or more embodiments of the present invention.

Broadly defined, the present invention according to one aspect relates to a hinge assembly providing built-in electrical bonding for a removable door in an electronic equipment enclosure, comprising: a first hinge unit, adapted to be mounted to a frame structure of the electronic equipment enclosure, that includes a pin support comprising a barrel and/or a knuckle, a pin receptacle arranged in the pin support, and an electrically conductive bonding element disposed at least partly inside the pin support and adjacent the pin receptacle; an electrically conductive pin disposed in the pin receptacle and arranged to rotate therein; and a removable second hinge unit carried on the pin and adapted to be mounted to a door of the electronic equipment enclosure, thereby supporting the door on the frame structure in a hinged relationship, wherein the second hinge unit can be removed from the first hinge unit to enable the door to be removed from the frame structure; wherein the electrically conductive bonding element is biased against the pin when the pin is disposed in the pin receptacle and remains in contact with the pin while the pin rotates within the pin receptacle from an open state to a closed state and from the closed state to the open state, and the electrically conductive bonding element is electrically connected to the frame structure so long as the first hinge unit is mounted to the frame structure, such that the pin is electrically bonded to the frame structure, via the biased electrically conductive bonding element, while the pin rotates within the pin receptacle from an open state to a closed state and from the closed state to the open state.

In a feature of this aspect, the electrically conductive bonding element is electrically connected to the pin support, and the pin support is electrically connected to the frame structure.

In another feature of this aspect, the pin includes a cylindrical surface, and wherein the electrically conductive bonding element is biased against the cylindrical surface of the pin when the pin is disposed in the pin receptacle and remains in contact with the pin while the pin rotates within the pin receptacle from an open state to a closed state and from the closed state to the open state.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the pin is electrically bonded to the second hinge unit such that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure. In further features, the second hinge unit is electrically connected to the door so long as the second hinge unit is mounted to the door such that the door is electrically bonded to the frame structure via bonding between the door and the second hinge unit, bonding between the second hinge unit and the pin, bonding between the pin and the electrically conductive bonding element, bonding between the electrically conductive bonding element and the pin support, and bonding between the pin support and the frame structure; the second hinge unit includes a pin housing that is press fit into an opening provided in a structural member of the door; the pin housing includes a plurality of unpainted ribs that make electrical contact with edges of the opening in the structural member of the door when the pin housing is press fit into the opening; the pin housing has a key structure that interlocks with the opening in the structural member of the door; the second hinge unit includes a second pin support including a barrel, a knuckle, or both, and wherein the second pin support is electrically connected to the door; the second pin support is electrically connected to the door via fasteners that make electrical contact with both the door and with the second pin support; the fasteners utilize paint-cutting surfaces to establish the electrical contact between the door and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Broadly defined, the present invention according to another aspect relates to a hinge assembly providing built-in electrical bonding for a removable door in an electronic equipment enclosure, including a first hinge unit, adapted to be mounted to a door of the electronic equipment enclosure, that includes a pin support comprising a barrel and/or a knuckle, a pin receptacle arranged in the pin support, and an electrically conductive bonding element disposed at least partly inside the pin support and adjacent the pin receptacle; an electrically conductive pin disposed in the pin receptacle and arranged to rotate therein; and a removable second hinge unit carried on the pin and adapted to be mounted to a frame structure of the electronic equipment enclosure, thereby supporting the door on the frame structure in a hinged relationship, wherein the second hinge unit can be removed from the first hinge unit to enable the door to be removed from the frame structure; wherein the electrically conductive bonding element is biased against the pin when the pin is disposed in the pin receptacle and remains in contact with the pin while the pin rotates within the pin receptacle from an open state to a closed state and from the closed state to the open state, and the electrically conductive bonding element is electrically connected to the door so long as the first hinge unit is mounted to the door, such that the pin is electrically bonded to the door, via the biased electrically conductive bonding element, while the pin rotates within the pin receptacle from an open state to a closed state and from the closed state to the open state.

In a feature of this aspect, the electrically conductive bonding element is electrically connected to the pin support, and the pin support is electrically connected to the door.

In another feature of this aspect, the pin includes a cylindrical surface, and the electrically conductive bonding element is biased against the cylindrical surface of the pin when the pin is disposed in the pin receptacle and remains in contact with the pin while the pin rotates within the pin receptacle from an open state to a closed state and from the closed state to the open state.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the pin is electrically bonded to the second hinge unit such that the second hinge unit is electrically bonded to the door via bonding between the second hinge unit and the pin, bonding between the pin and the electrically conductive bonding element, bonding between the electrically conductive bonding element and the pin support, and bonding between the pin support and the door. In further features, the second hinge unit is electrically connected to the frame structure so long as the second hinge unit is mounted to the frame structure such that the frame structure is electrically bonded to the door via bonding between the frame structure and the second hinge unit, bonding between the second hinge unit and the pin, bonding between the pin and the electrically conductive bonding element, bonding between the electrically conductive bonding element and the pin support, and bonding between the pin support and the door; the second hinge unit includes a pin housing that is press fit into an opening provided in a structural member of the frame structure; the pin housing includes a plurality of unpainted ribs that make electrical contact with edges of the opening in the structural member of the frame structure when the pin housing is press fit into the opening; the pin housing has a key structure that interlocks with the opening in the structural member of the frame structure; the second hinge unit includes a second pin support comprising a barrel, a knuckle, or both, and the second pin support is electrically connected to the frame structure; the second pin support is electrically connected to the frame structure via fasteners that make electrical contact with both the frame structure and with the second pin support; the fasteners utilize paint-cutting surfaces to establish the electrical contact between the frame structure and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Broadly defined, the present invention according to another aspect relates to an electronic equipment enclosure providing electrical bonding for a removable door through a hinge assembly, including: a frame structure; a door; and a hinge assembly providing built-in electrical bonding in the electronic equipment enclosure, including a first hinge unit, mounted to the frame structure, that has a pin support comprising a barrel and/or a knuckle, a pin receptacle arranged in the pin support, and an electrically conductive bonding element disposed at least partly inside the pin support and adjacent the pin receptacle; an electrically conductive pin disposed in the pin receptacle and arranged to rotate therein; and a removable second hinge unit carried on the pin and adapted to be mounted to the door of the electronic equipment enclosure, thereby supporting the door on the frame structure in a hinged relationship, wherein the second hinge unit can be removed from the first hinge unit to enable the door to be removed from the frame structure; wherein the electrically conductive bonding element is biased against the pin when the pin is disposed in the pin receptacle and remains in contact with the pin while the pin rotates within the pin receptacle from an open state to a closed state and from the closed state to the open state, and the electrically conductive bonding element is electrically connected to the frame structure so long as the first hinge unit is mounted to the frame structure, such that the pin is electrically bonded to the frame structure, via the biased electrically conductive bonding element, while the pin rotates within the pin receptacle from an open state to a closed state and from the closed state to the open state.

In a feature of this aspect, the electrically conductive bonding element is electrically connected to the pin support, and the pin support is electrically connected to the frame structure.

In another feature of this aspect, the pin includes a cylindrical surface, and the electrically conductive bonding element is biased against the cylindrical surface of the pin when the pin is disposed in the pin receptacle and remains in contact with the pin while the pin rotates within the pin receptacle from an open state to a closed state and from the closed state to the open state.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the pin is electrically bonded to the second hinge unit such that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure.

In further features, the second hinge unit is electrically connected to the door so long as the second hinge unit is mounted to the door such that the door is electrically bonded to the frame structure via bonding between the door and the second hinge unit, bonding between the second hinge unit and the pin, bonding between the pin and the electrically conductive bonding element, bonding between the electrically conductive bonding element and the pin support, and bonding between the pin support and the frame structure; the second hinge unit includes a pin housing that is press fit into an opening provided in a structural member of the door; the pin housing includes a plurality of unpainted ribs that make electrical contact with edges of the opening in the structural member of the door when the pin housing is press fit into the opening; the pin housing has a key structure that interlocks with the opening in the structural member of the door; the second hinge unit includes a second pin support comprising a barrel, a knuckle, or both, and the second pin support is electrically connected to the door; the second pin support is electrically connected to the door via fasteners that make electrical contact with both the door and with the second pin support; the fasteners utilize paint-cutting surfaces to establish the electrical contact between the door and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Broadly defined, the present invention according to another aspect relates to an electronic equipment enclosure providing electrical bonding for a removable door through a hinge assembly, including: a frame structure; a door; and a hinge assembly providing built-in electrical bonding in the electronic equipment enclosure, including a first hinge unit, mounted to the door, that has a pin support comprising a barrel and/or a knuckle, a pin receptacle arranged in the pin support, and an electrically conductive bonding element disposed at least partly inside the pin support and adjacent the pin receptacle; an electrically conductive pin disposed in the pin receptacle and arranged to rotate therein; and a removable second hinge unit carried on the pin and adapted to be mounted to the frame structure of the electronic equipment enclosure, thereby supporting the door on the frame structure in a hinged relationship, wherein the second hinge unit can be removed from the first hinge unit to enable the door to be removed from the frame structure; wherein the electrically conductive bonding element is biased against the pin when the pin is disposed in the pin receptacle and remains in contact with the pin while the pin rotates within the pin receptacle from an open state to a closed state and from the closed state to the open state, and the electrically conductive bonding element is electrically connected to the door so long as the first hinge unit is mounted to the door, such that the pin is electrically bonded to the door, via the biased electrically conductive bonding element, while the pin rotates within the pin receptacle from an open state to a closed state and from the closed state to the open state.

In a feature of this aspect, the electrically conductive bonding element is electrically connected to the pin support, and the pin support is electrically connected to the frame structure.

In another feature of this aspect, the pin includes a cylindrical surface, and the electrically conductive bonding element is biased against the cylindrical surface of the pin when the pin is disposed in the pin receptacle and remains in contact with the pin while the pin rotates within the pin receptacle from an open state to a closed state and from the closed state to the open state.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the pin is electrically bonded to the second hinge unit such that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure. In further features, the second hinge unit is electrically connected to the frame structure so long as the second hinge unit is mounted to the frame structure such that the frame structure is electrically bonded to the door via bonding between the frame structure and the second hinge unit, bonding between the second hinge unit and the pin, bonding between the pin and the electrically conductive bonding element, bonding between the electrically conductive bonding element and the pin support, and bonding between the pin support and the door; the second hinge unit includes a pin housing that is press fit into an opening provided in a structural member of the frame structure; the pin housing includes a plurality of unpainted ribs that make electrical contact with edges of the opening in the structural member of the frame structure when the pin housing is press fit into the opening; the pin housing has a key structure that interlocks with the opening in the structural member of the frame structure; the second hinge unit includes a second pin support comprising a barrel, a knuckle, or both, and wherein the second pin support is electrically connected to the frame structure; the second pin support is electrically connected to the frame structure via fasteners that make electrical contact with both the frame structure and with the second pin support; the fasteners utilize paint-cutting surfaces to establish the electrical contact between the frame structure and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Broadly defined, the present invention according to another aspect relates to a method of providing electrical bonding for a removable door through a hinge assembly of an electronic equipment enclosure, including the steps of: mounting a first hinge unit, of a hinge assembly, to a frame structure of the electronic equipment enclosure, the first hinge unit including a pin support comprising a barrel and/or a knuckle, a pin receptacle arranged in the pin support, and an electrically conductive bonding element disposed at least partly inside the pin support and adjacent the pin receptacle; as part of the mounting step, electrically connecting the electrically conductive bonding element to the frame structure; mounting a second hinge unit, of the hinge assembly, to a door of the electronic equipment enclosure; inserting the electrically conductive pin into the pin receptacle such that the electrically conductive bonding element is biased against the pin; removably supporting the second hinge unit on the first hinge unit via the electrically conductive pin such that the door is supported on the frame structure in a hinged relationship; and maintaining electrical contact between electrically conductive pin and the electrically conductive bonding element, such that the pin is electrically bonded to the frame structure via the biased electrically conductive bonding element, while the pin rotates within the pin receptacle, and while the door rotates relative to the frame structure, from an open state to a closed state and from the closed state to the open state.

In a feature of this aspect, the step of electrically connecting the electrically conductive bonding element to the frame structure includes electrically connecting the electrically conductive bonding element to the pin support and electrically connecting the pin support to the frame structure.

In another feature of this aspect, the pin includes a cylindrical surface, and the step of inserting the electrically conductive pin into the pin receptacle such that the electrically conductive bonding element is biased against the pin includes inserting the electrically conductive pin into the pin receptacle such that the electrically conductive bonding element is biased against the cylindrical surface of the pin.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the method further includes a step of electrically connecting the second hinge unit to the pin such that that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure. In further features, the method further includes a step of electrically connecting the second hinge unit to the door such that the door is electrically bonded to the frame structure via bonding between the door and the second hinge unit, bonding between the second hinge unit and the pin, bonding between the pin and the electrically conductive bonding element, bonding between the electrically conductive bonding element and the pin support, and bonding between the pin support and the frame structure; the step of mounting the second hinge unit to the door includes press fitting a pin housing into an opening provided in a structural member of the door; the step of press fitting the pin housing into the opening includes press fitting a plurality of unpainted ribs into electrical contact with edges of the opening; the method further includes a step of interlocking a key structure of the pin housing with the opening; the second hinge unit includes a second pin support comprising a barrel, a knuckle, or both, and wherein the method further comprises electrically connecting the second pin support to the door; the step of electrically connecting the second pin support to the door includes electrically connecting the second pin support to the door via fasteners that make electrical contact with both the door and with the second pin support; the fasteners utilize paint-cutting surfaces to establish the electrical contact between the door and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Broadly defined, the present invention according to another aspect relates to a method of providing electrical bonding for a removable door through a hinge assembly of an electronic equipment enclosure, including the steps of: mounting a first hinge unit, of a hinge assembly, to a door of the electronic equipment enclosure, the first hinge unit including a pin support comprising a barrel and/or a knuckle, a pin receptacle arranged in the pin support, and an electrically conductive bonding element disposed at least partly inside the pin support and adjacent the pin receptacle; as part of the mounting step, electrically connecting the electrically conductive bonding element to the door; mounting a second hinge unit, of the hinge assembly, to a frame structure of the electronic equipment enclosure; inserting the electrically conductive pin into the pin receptacle such that the electrically conductive bonding element is biased against the pin; removably supporting the second hinge unit on the first hinge unit via the electrically conductive pin such that the door is supported on the frame structure in a hinged relationship; and maintaining electrical contact between electrically conductive pin and the electrically conductive bonding element, such that the pin is electrically bonded to the door via the biased electrically conductive bonding element, while the pin rotates within the pin receptacle, and while the door rotates relative to the frame structure, from an open state to a closed state and from the closed state to the open state.

In a feature of this aspect, the step of electrically connecting the electrically conductive bonding element to the door includes electrically connecting the electrically conductive bonding element to the pin support and electrically connecting the pin support to the door.

In another feature of this aspect, the pin includes a cylindrical surface, and the step of inserting the electrically conductive pin into the pin receptacle such that the electrically conductive bonding element is biased against the pin includes inserting the electrically conductive pin into the pin receptacle such that the electrically conductive bonding element is biased against the cylindrical surface of the pin.

In another feature of this aspect, the electrically conductive bonding element is a bonding contact spring biased against the cylindrical surface of the pin. In further features, the bonding contact spring is a simple flat spring, disposed in a recess in the barrel or knuckle of the pin support, that is bowed in the middle and is thereby biased against the cylindrical surface of the pin; the bonding contact spring is a wire spring, staked at one end in a groove in the barrel or knuckle of the pin support, that applies a constant support against the cylindrical surface of the pin; and/or the pin includes a groove with which the wire spring engages, thereby acting as a detent for locking the pin in position.

In another feature of this aspect, the method further includes a step of electrically connecting the second hinge unit to the pin such that that the second hinge unit is electrically bonded to the door via bonding between the second hinge unit and the pin, bonding between the pin and the electrically conductive bonding element, bonding between the electrically conductive bonding element and the pin support, and bonding between the pin support and the door. In further features, the method further includes a step of electrically connecting the second hinge unit to the frame structure such that the door is electrically bonded to the frame structure via bonding between the frame structure and the second hinge unit, bonding between the second hinge unit and the pin, bonding between the pin and the electrically conductive bonding element, bonding between the electrically conductive bonding element and the pin support, and bonding between the pin support and the door; the step of mounting the second hinge unit to the frame structure includes press fitting a pin housing into an opening provided in a structural member of the frame structure; the step of press fitting the pin housing into the opening includes press fitting a plurality of unpainted ribs into electrical contact with edges of the opening; the method further includes a step of interlocking a key structure of the pin housing with the opening; the second hinge unit includes a second pin support comprising a barrel, a knuckle, or both, and wherein the method further comprises electrically connecting the second pin support to the frame structure; the step of electrically connecting the second pin support to the frame structure includes electrically connecting the second pin support to the frame structure via fasteners that make electrical contact with both the frame structure and with the second pin support; the fasteners utilize paint-cutting surfaces to establish the electrical contact between the frame structure and the second pin support; the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit; the return spring makes electrical contact with both the pin and the pin housing, thereby establishing the electrical bonding between the pin and the second hinge unit; and/or the return spring is a coil spring arranged coaxially around the pin.

In another feature of this aspect, the hinge assembly is an internal hinge assembly with the pin support being hidden by the door when the door is in the closed state.

In another feature of this aspect, the hinge assembly is an external hinge assembly with the pin support visibly wrapping around an outside edge of the door when the door is in the closed state.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
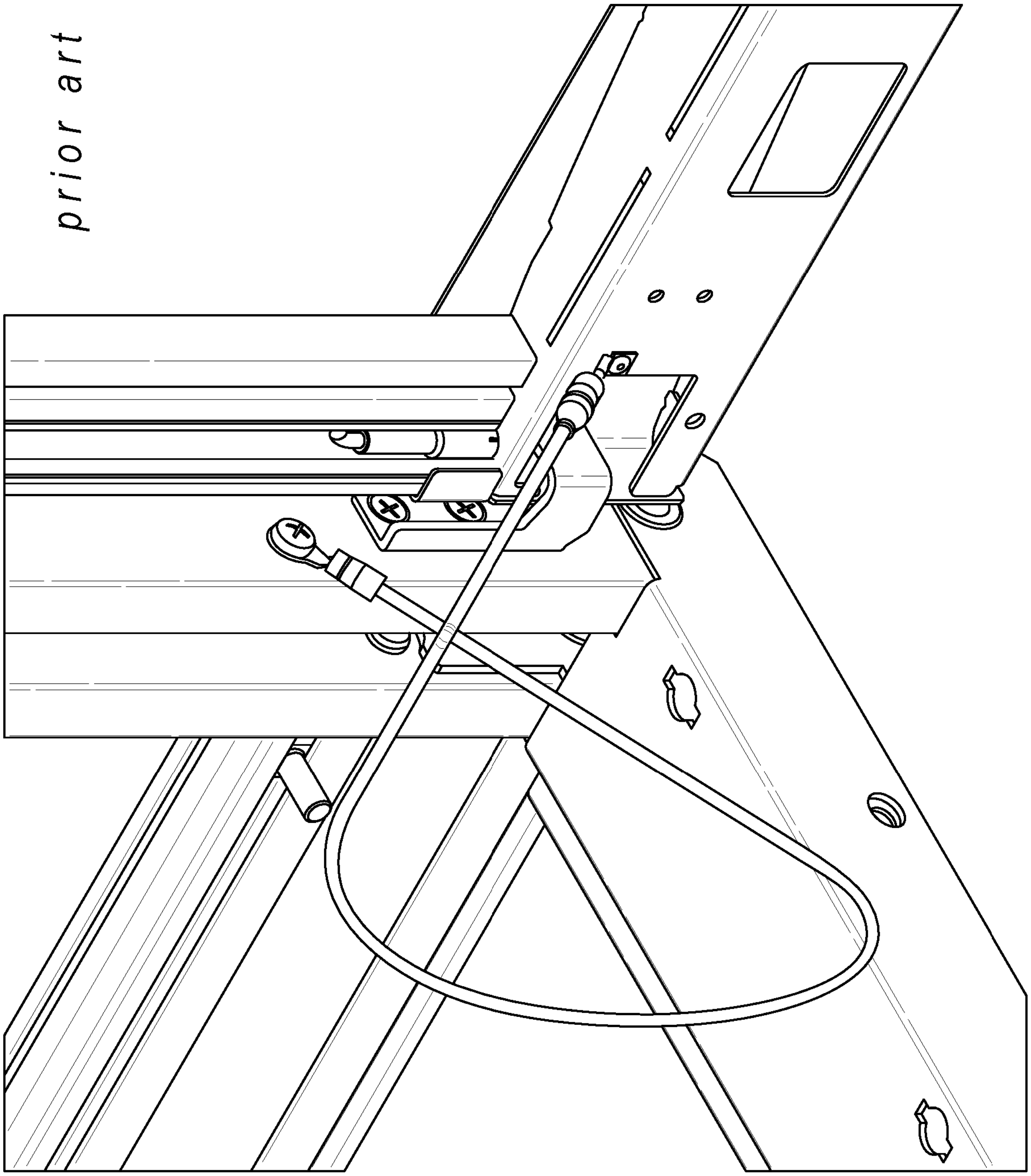
FIG. 1 is a fragmentary isometric view of a portion of an electronic equipment enclosure utilizing internal hinge assemblies and conventional electrical bonding from a door to the enclosure frame.
Figure 2:
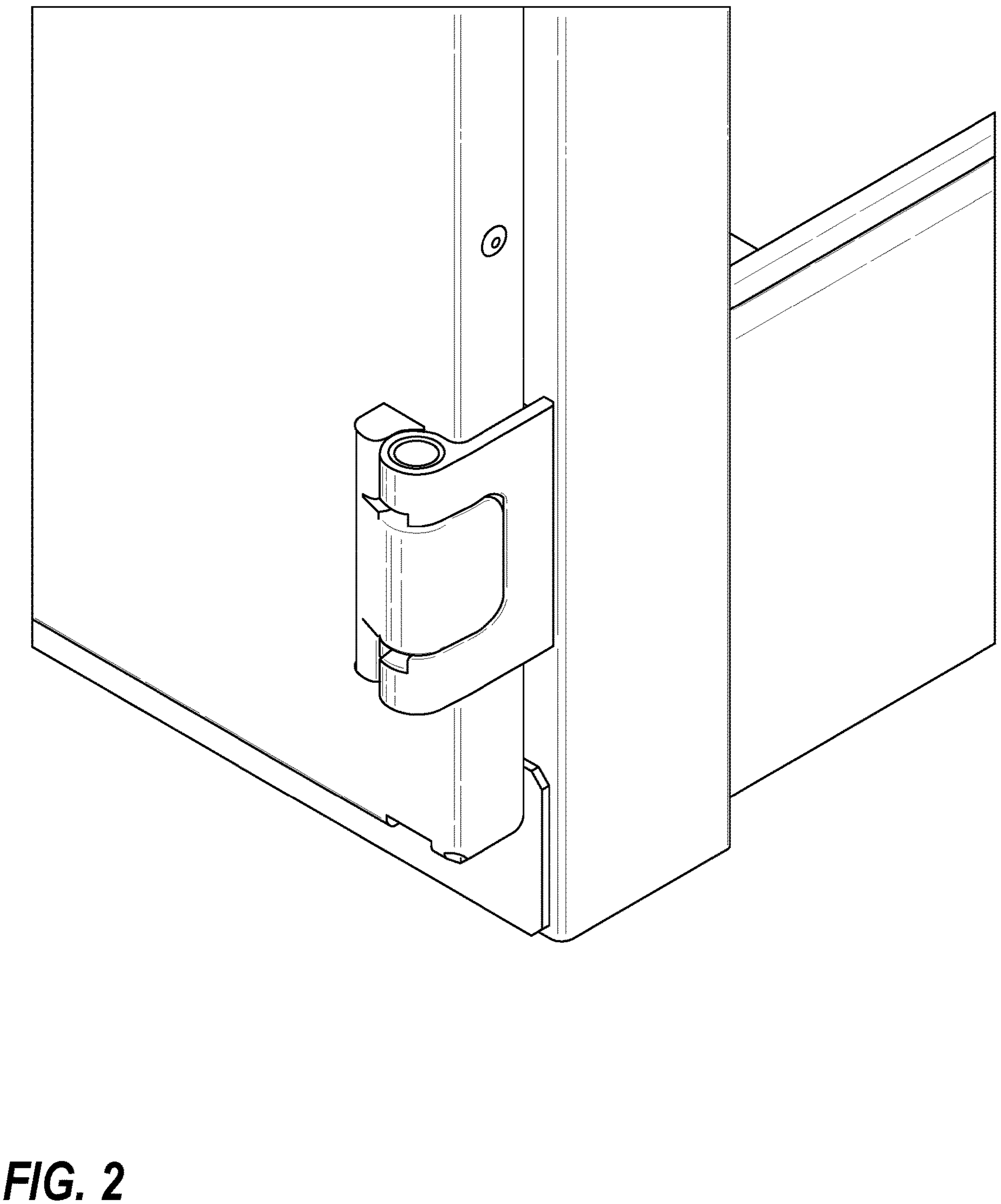
FIGS. 2 and 3 are fragmentary isometric views of a portion of an electronic equipment enclosure utilizing external hinge assemblies and conventional electrical bonding from a door to the enclosure frame.
Figure 3:
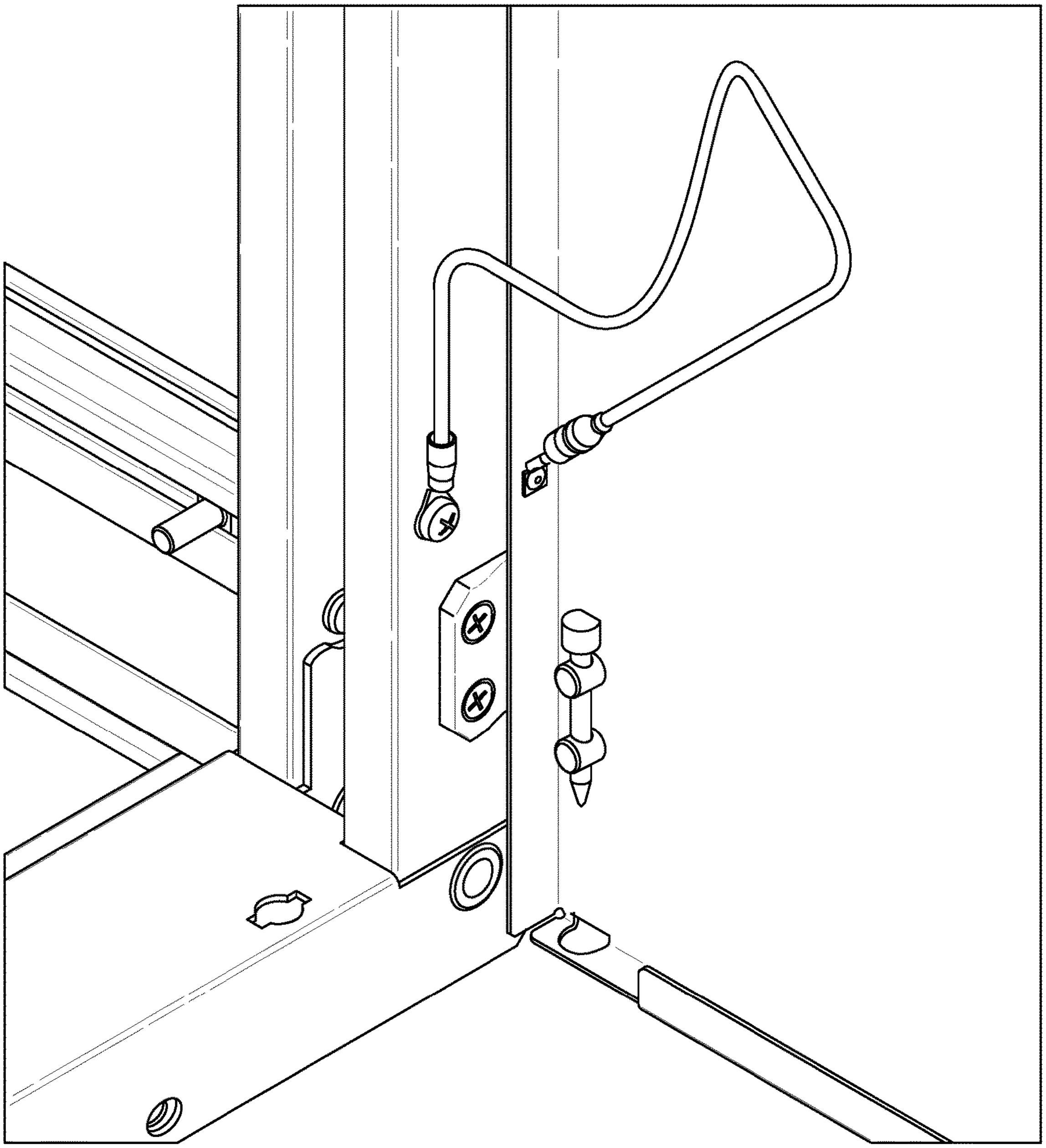

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 4:
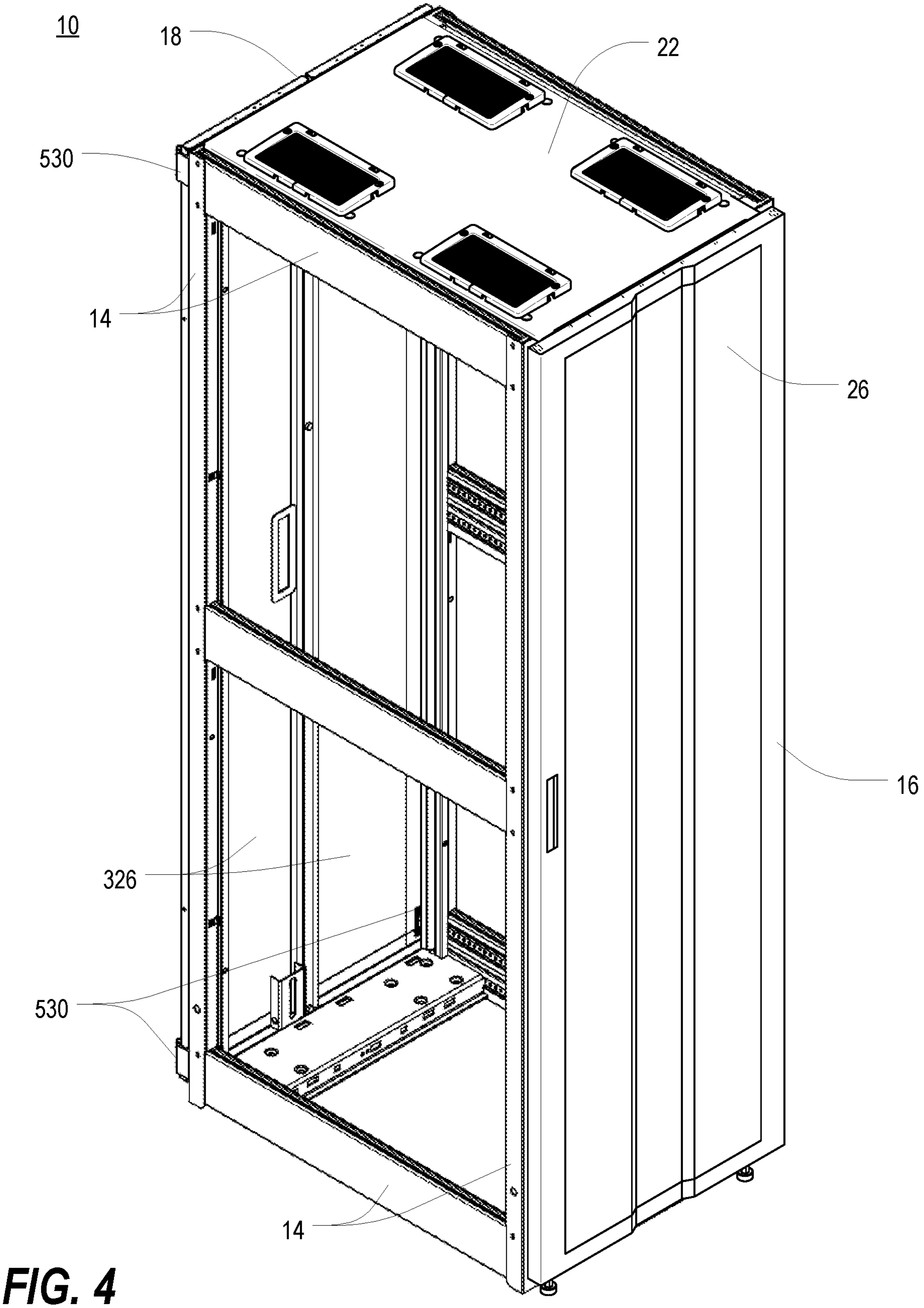
FIG. 4 is a front isometric view of an electronic equipment enclosure having electrically-bonded hinge assemblies in accordance with one or more preferred embodiments of the present invention.
Figure 5:
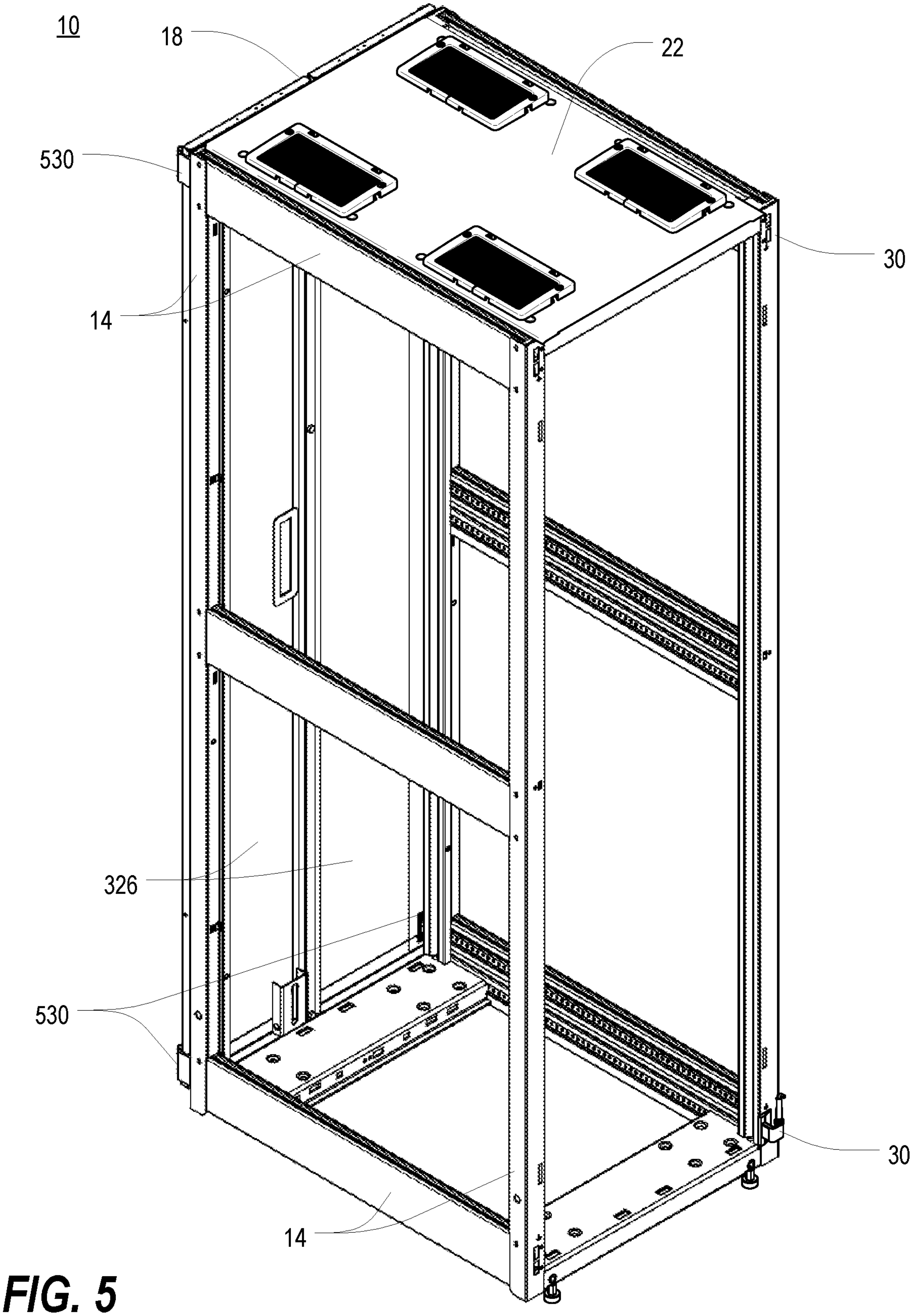
FIG. 5 is a front isometric view of the electronic equipment enclosure of FIG. 4, shown with the front door removed.

FIG. 4 is a front isometric view of an electronic equipment enclosure 10 having electrically-bonded hinge assemblies in accordance with one or more preferred embodiments of the present invention, and FIG. 5 is a front isometric view of the electronic equipment enclosure 10 of FIG. 4, shown with the front door removed. As shown therein, the enclosure 10 includes a four-post frame structure 14 supporting a front panel assembly 16, a rear panel assembly 18, and a top panel assembly 22. Although not shown, the frame structure 14 may further support a pair of side panel assemblies, a bottom panel assembly, and/or other structures. In the illustrated embodiment, the front panel assembly 16 is implemented as a single hinged door 26, the rear panel assembly 18 is implemented as a pair of hinged doors 326, and the top panel assembly 22 includes a primary panel and a plurality of ports. However, it will be appreciated that various replacement components may be substituted for the components of the enclosure system, without departing from the scope of the present invention.

Figure 6:
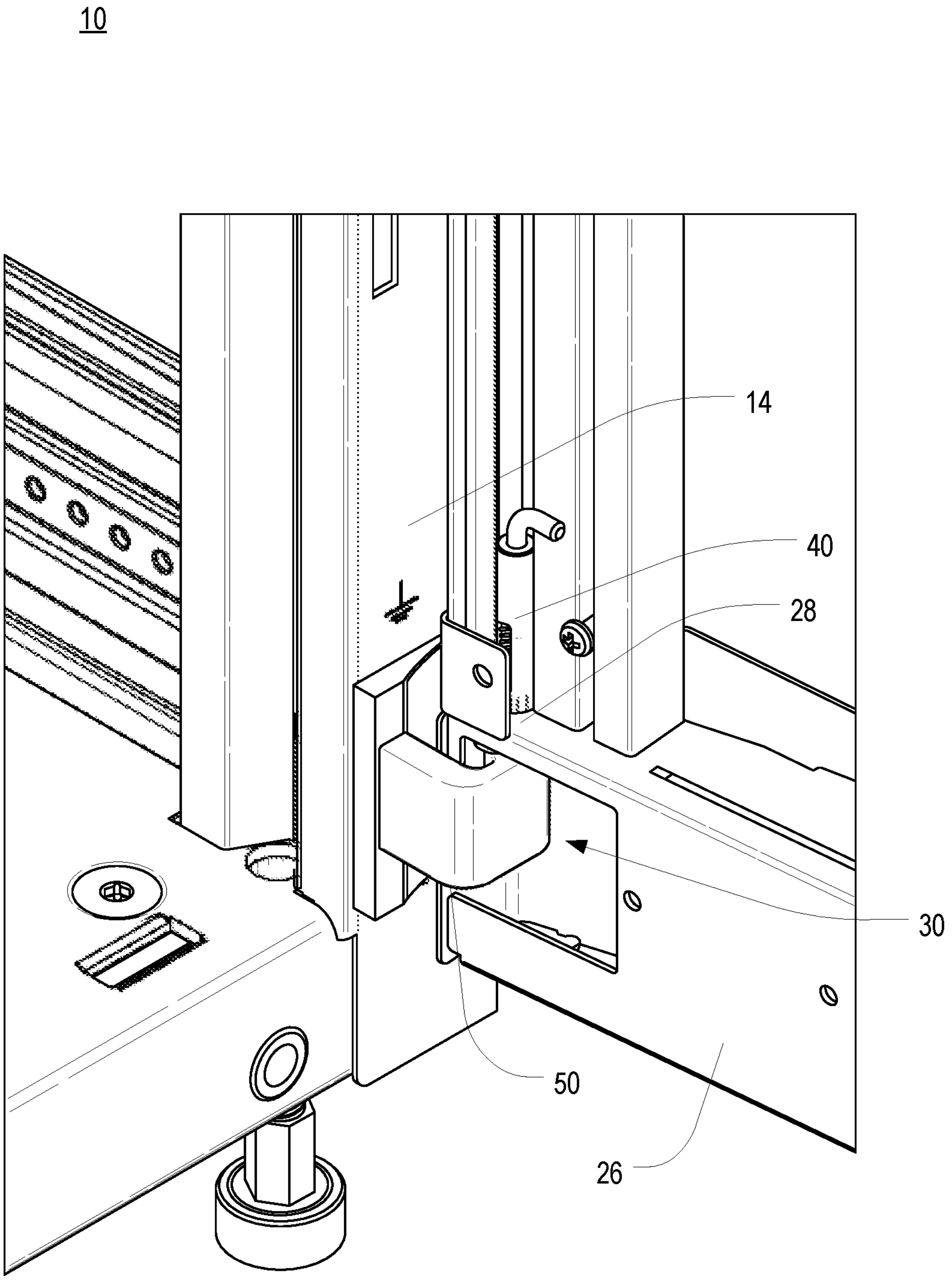
FIG. 6 is an enlarged fragmentary front isometric view of the lower right corner of the electronic equipment enclosure of FIG. 4, shown with an open door supported on one of the internal hinge assemblies.

The single hinged door 26 of the front panel assembly 16 is supported by two internal hinge assemblies 30. In this regard, FIG. 6 is an enlarged fragmentary front isometric view of the lower right corner of the electronic equipment enclosure 10 of FIG. 4, shown with an open door 26 supported on one of the internal hinge assemblies 30. The hinge assemblies 30 of the front panel assembly 16 are referred to as “internal” hinge assemblies because they are mostly or entirely hidden behind the front surface of the door 26. Each hinge assembly 30 includes a pin unit 40 and a barrel unit 50, with the pin unit 40 being rotatable relative to the barrel unit 50. The barrel unit 50 is mounted to one of the posts of the frame structure 14, while structural portions 28 of the door 26 are carried on the pin unit 40, thus allowing the door 26 to be rotated relative to the post of the frame structure 14.

Figure 7:
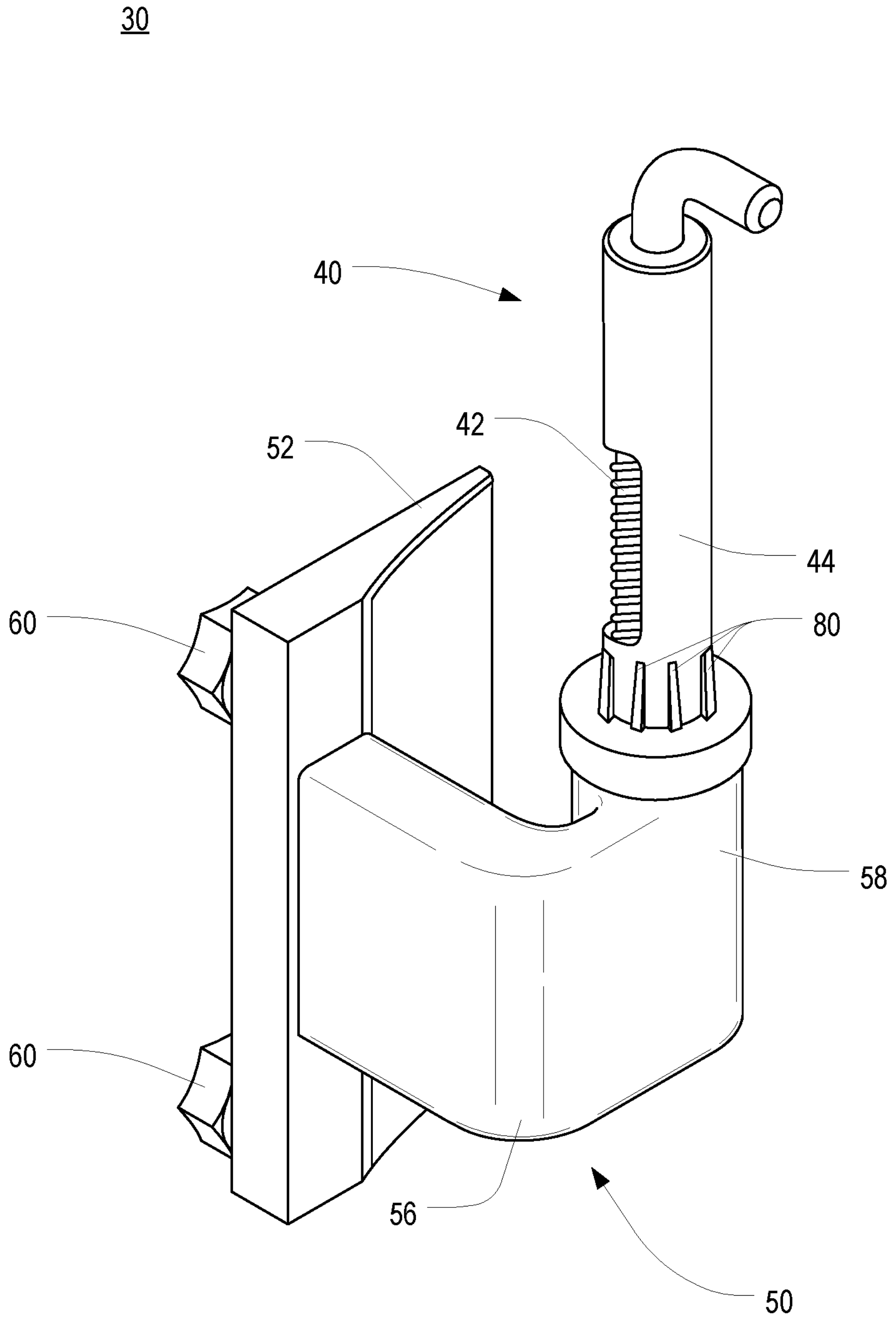
FIG. 7 is an isometric view of the electrically-bonded internal hinge assembly of FIG. 6, shown in isolation.
Figure 8:
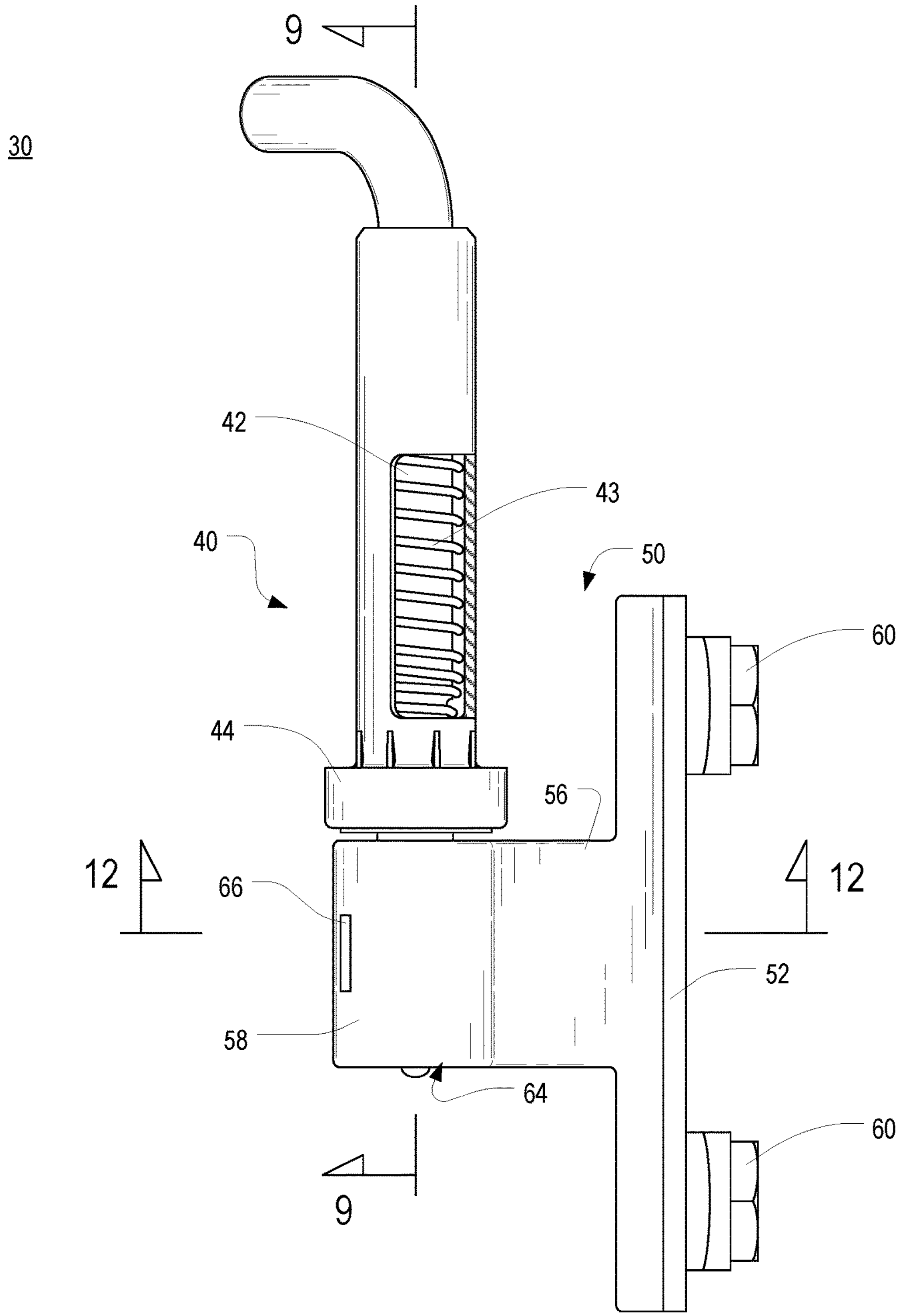
FIG. 8 is a right side view of the electrically-bonded internal hinge assembly of FIG. 7.

FIG. 7 is an isometric view of the electrically-bonded internal hinge assembly 30 of FIG. 6, shown in isolation, and FIG. 8 is a right side view of the electrically-bonded internal hinge assembly 30 of FIG. 7. As shown therein, the barrel unit 50 includes a base 52, a support arm 56 extending from the base 52, and a barrel 58 with a cylindrical receptacle 64 (visible in FIG. 9) disposed at a distal end of the support arm 56. The barrel unit 50 is fixed to the post via fasteners 60 that extend through apertures in the post 14 and into corresponding threaded apertures (not shown) in the base 52. The pin unit 40 includes a cylindrical pin 42 that fits closely within the cylindrical receptacle 64 of the barrel 58. In addition, the pin unit 40 includes a pin housing 44 carried on the pin 42.

Figure 9:
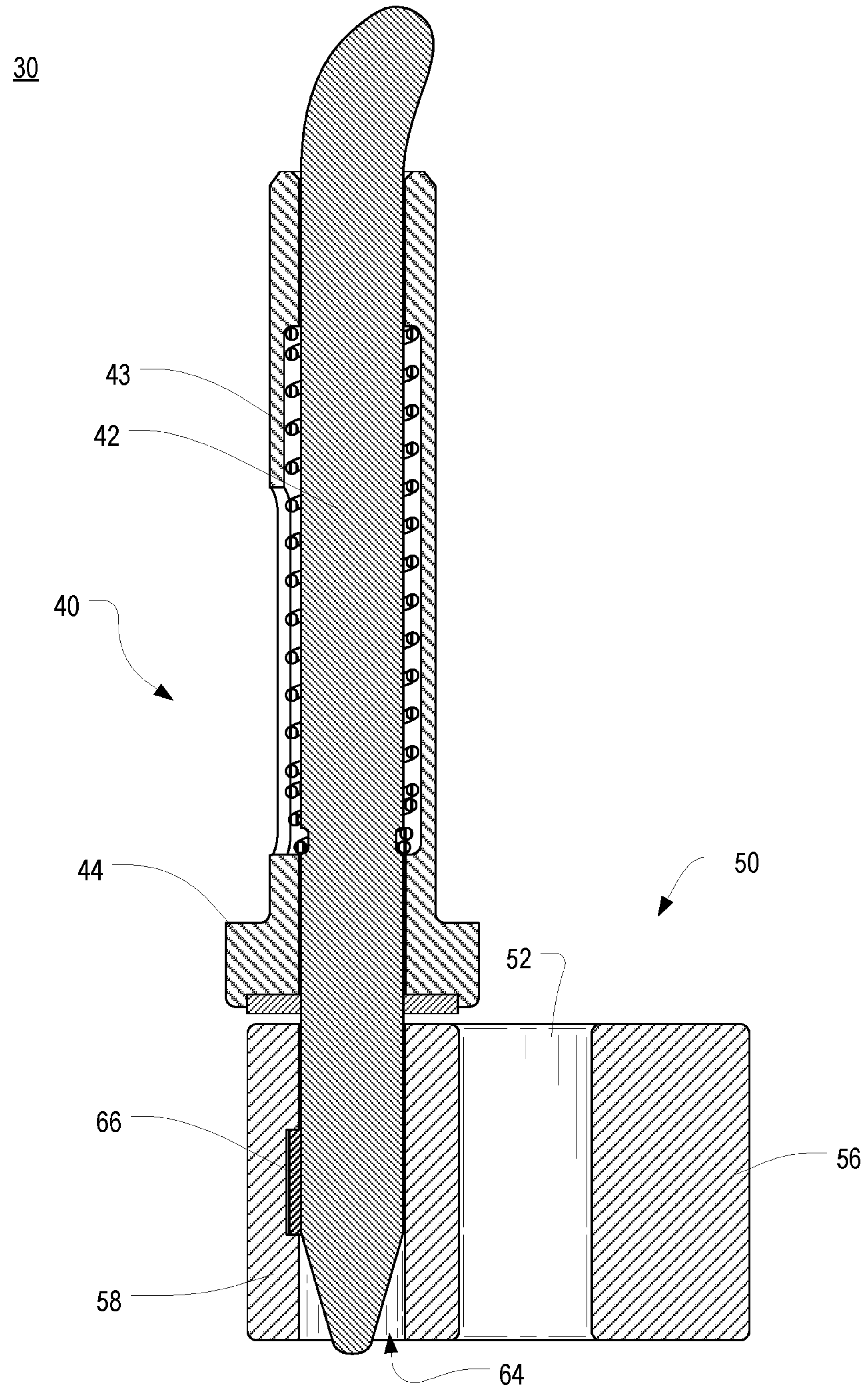
FIG. 9 is a rear cross-sectional view of the electrically-bonded internal hinge assembly of FIG. 8, taken along line 9-9.
Figure 10:
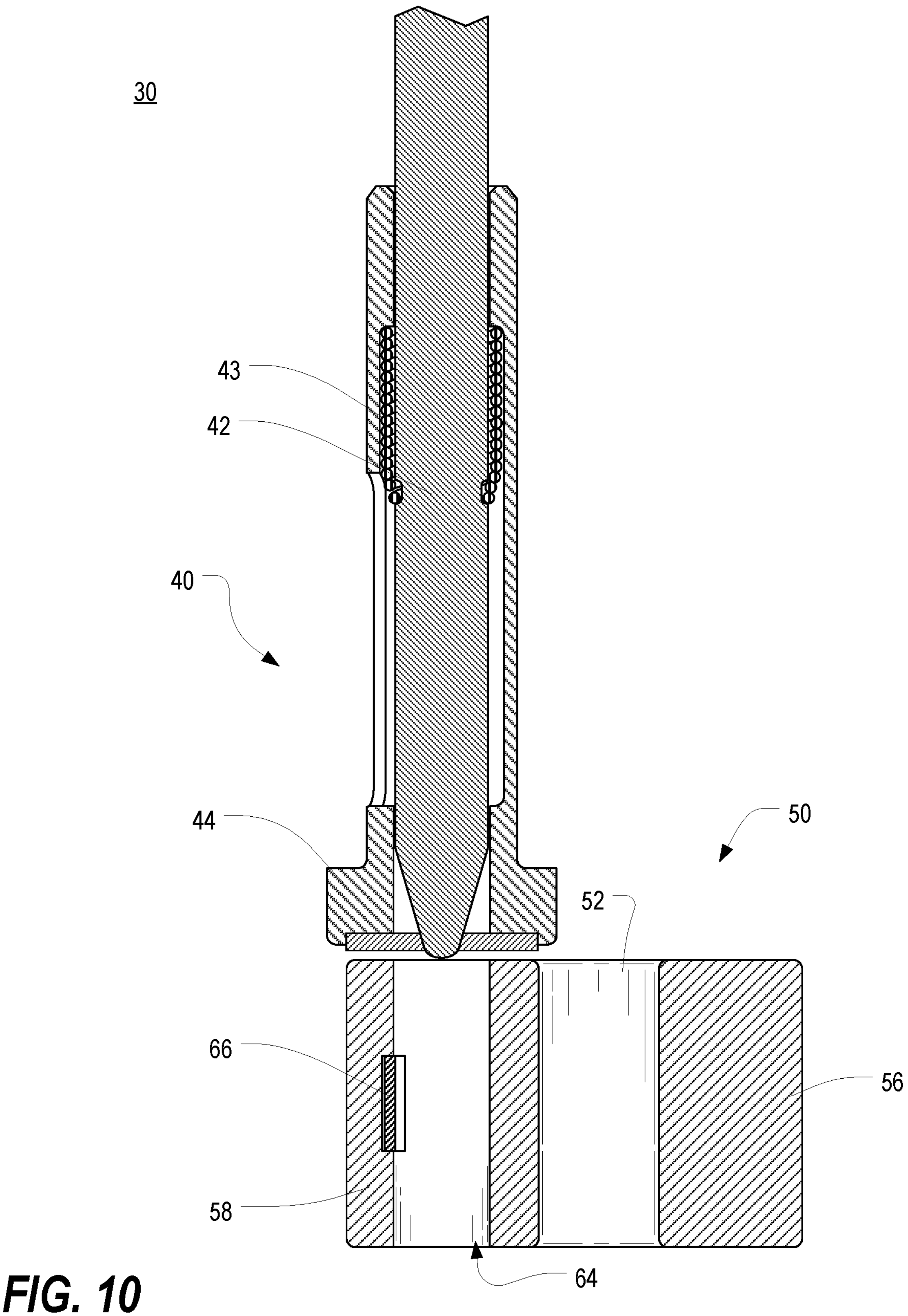
FIGS. 10 and 11 are further rear cross-sectional views of the electrically-bonded internal hinge assembly of FIG. 8 illustrating the removal of the pin unit from the barrel unit.
Figure 11:
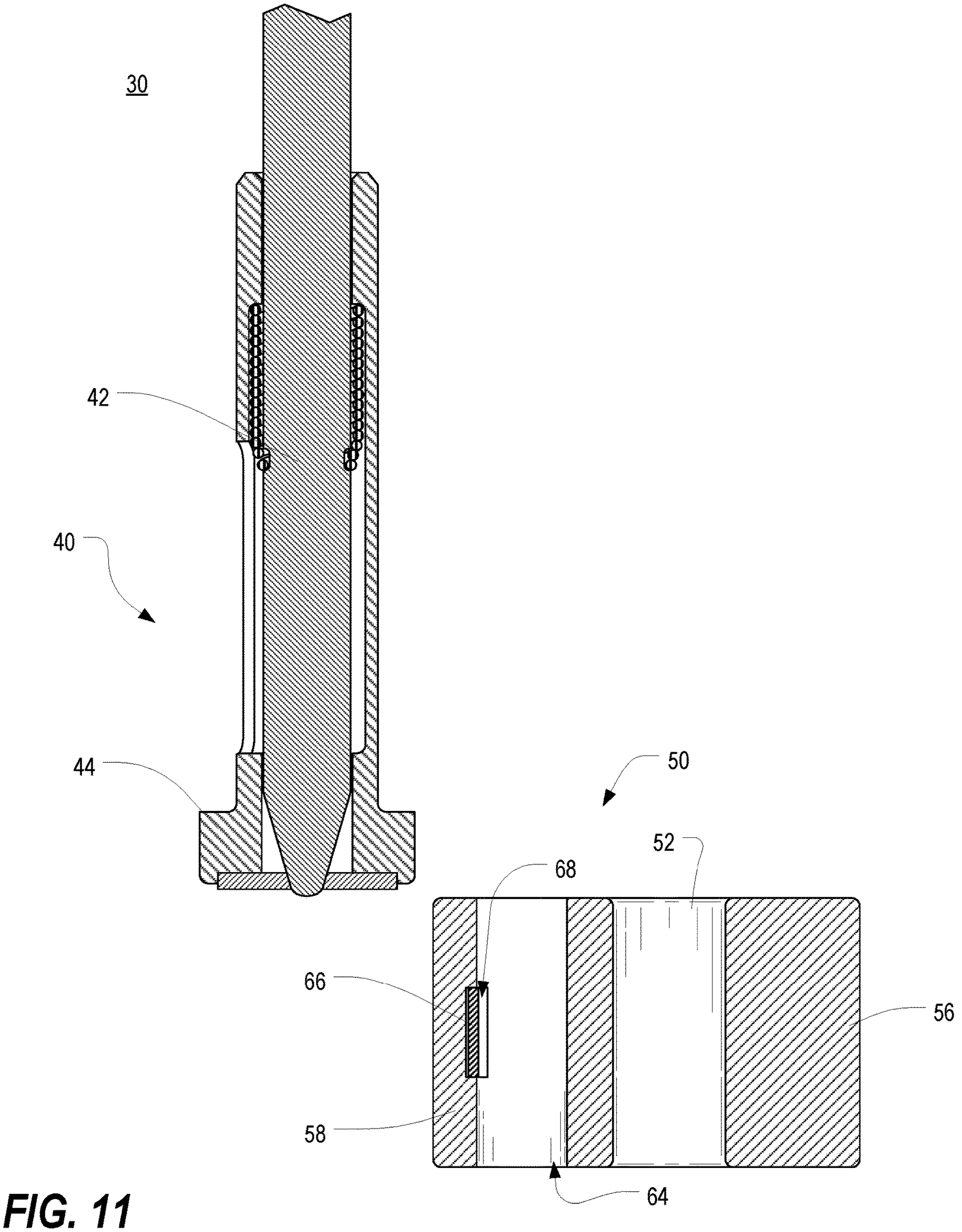

In at least some embodiments, the front door 26 may be easily removed from the frame structure 14 to facilitate installation, service, modification, and removal of equipment in the enclosure 10. In this regard, FIG. 9 is a rear cross-sectional view of the electrically-bonded internal hinge assembly 30 of FIG. 8, taken along line 9-9, and FIGS. 10 and 11 are further rear cross-sectional views of the electrically-bonded internal hinge assembly 30 of FIG. 8 illustrating the removal of the pin unit 40 from the barrel unit 50. In FIG. 9, the cylindrical pin 42 is shown seated within the cylindrical receptacle 64 of the barrel unit 50, thereby permitting the door (not shown in FIGS. 9-11) to be rotated on the pin 42 (and on the corresponding pin 42 of the hinge assembly 30 located at the upper front right of the enclosure 10 of FIG. 7). However, when the pin 42 is manipulated such that the lower end of the cylindrical pin 42 is withdrawn from the barrel unit 50, as shown in FIG. 10, the pin unit 40 may be separated from the barrel unit 50, as shown in FIG. 11. Thus, in the illustrated embodiment, a user may simply grasp the hooked upper end of the cylindrical pin 42, withdraw the pin 42 from the barrel unit 50, and remove the lower end of the door 26 from the frame structure 14. Furthermore, in at least some embodiments, the cylindrical pin 42 is biased into the position shown in FIG. 9 by a pin bonding and return spring 43, shown embodied as a coil spring, such that withdrawing the pin 42 requires the application of a force sufficient to overcome the biasing force of the spring 43. This ensures that the pins 42 are not disengaged from the barrel units 50 accidentally.

The internal hinge assembly 30 provides electrical connectivity between the frame structure 14 and the front door assembly 16 using a variety of features. First, the barrel unit 50, which itself is preferably constructed partially or entirely from a conductive material, may be bonded to the frame structure 14 via paint cutting washers or nuts. Alternatively or additionally, the barrel unit 50 may be bonded to the frame structure 14 via the threaded apertures (which eliminate rivet nuts or hex nuts), particularly when using thread cutting screws, and/or in other ways. Likewise, the pin housing 44 includes unpainted ribs 80 that make contact with an unpainted hole in the door 26 when the pin housing 44 is press fit into the hole, thereby bonding the door 26 to the pin housing 44.

Notably, electrical bonding between the pin 42 and the pin housing 44 is achieved via the pin bonding and return spring 43. As shown in FIG. 9, the spring 43 is wrapped around the pin 42. An upper end of the spring 43 creates a pressure contact on the pin housing 44, while a lower end of the spring 43 creates a pressure contact in a circumferential groove of the pin 42 itself. Such a combination creates electrical bonding or other connectivity between the pin 42 and the housing 44, which in turn may be electrically connected to structural portions of the door.

Figure 12:
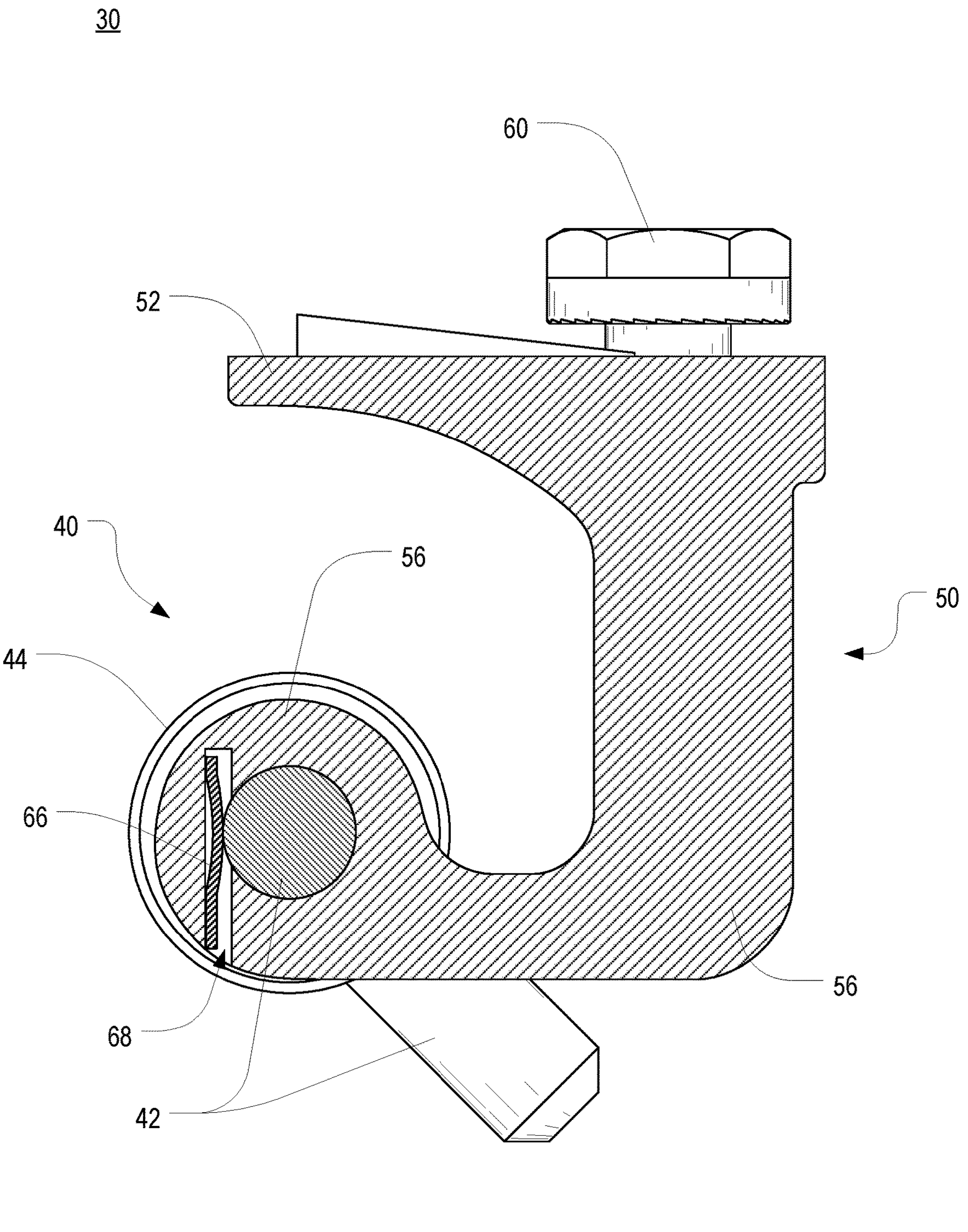
FIG. 12 is a bottom cross-sectional view of the electrically-bonded hinge assembly of FIG. 8, taken along line 12-12.
Figure 13:
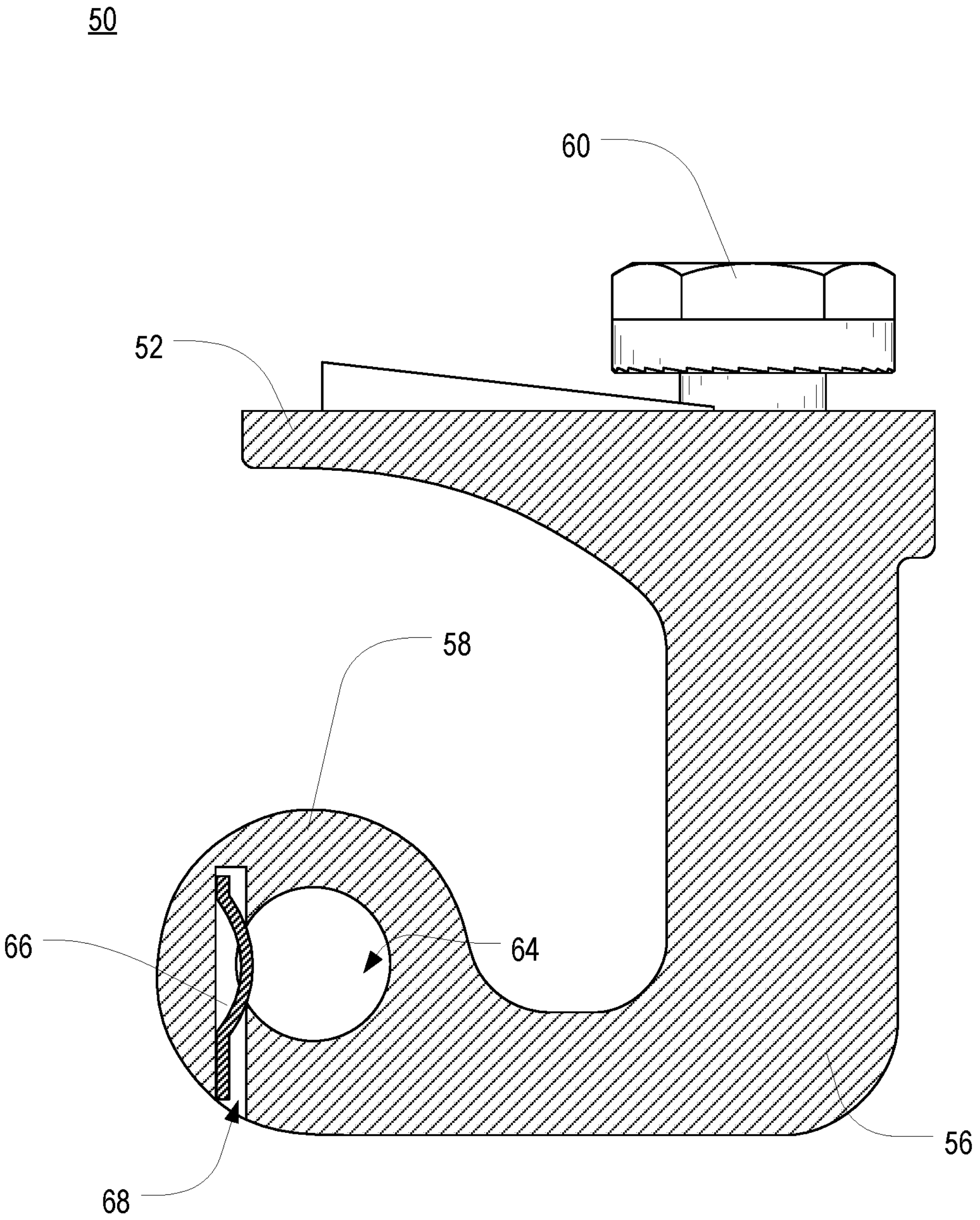
FIG. 13 is a bottom cross-sectional view of the barrel portion of the hinge assembly of FIG. 12, shown with the hinge pin removed.

Perhaps more notably, the internal hinge assembly 30 includes features that provide a stable electrical connection between the pin 42 and the barrel 58 throughout the range of movement of the door 26 relative to the frame structure 14. In this regard, FIG. 12 is a bottom cross-sectional view of the electrically-bonded hinge assembly 30 of FIG. 8, taken along line 12-12. As shown therein, a recess 68 in the barrel 58 contains a bonding element in the form of a bonding contact spring 66, such as a simple flat spring, that is bowed in the middle and is thereby biased against the pin 42, thereby maintaining an interference contact (and potentially electrical connectivity) between the bonding contact spring 66 and the pin 42. This bias is evident, for example, in FIG. 13, which is a bottom cross-sectional view of the barrel portion 50 of the hinge assembly 30 of FIG. 12, shown with the hinge pin 42 removed. In FIG. 13, the bonding contact spring 66 may be seen to be bent further in response to the natural bias of the spring 66. Although not shown, a plurality of such springs 66, particularly in a grouping that includes at least one spring 66 on each side of the pin 42, continues to provide some electrical connectivity (and thus electrical bonding) between the pin 42 and at least one spring 66 at all times, even when the pin 42 rotates relative to the barrel 58, and throughout the range of movement of the door relative to the frame structure.

Further variations of the approach illustrated in FIGS. 12 and 13 include the use of a wire spring staked at one end in a groove in a hinge body wherein the other end applies a constant force against the hinge pin. The wire spring could also engage with a groove in the pin to act as a detent for locking the pin in position.

Thus, electrical bonding between the frame structure 14 and the door 26 may be provided by bonding the base 52 to the frame structure 14; bonding the pin 42 to the barrel 58, particularly through the use of a bonding element in the form of a bonding contact spring 66 that is itself bonded to other portions of the barrel unit 50 and which remains in contact with the pin 42 throughout the range of movement of the door 26 relative to the frame structure 14; bonding the pin housing 44 to the pin 42, particularly through the use of the pin bonding and return spring 43 that remains in contact with both the pin housing 44 and the pin 42 throughout the range of movement of the door 26 relative to the frame structure 14; and bonding the pin housing 44 to the structural portions 28 of the door 26.

Figure 14:
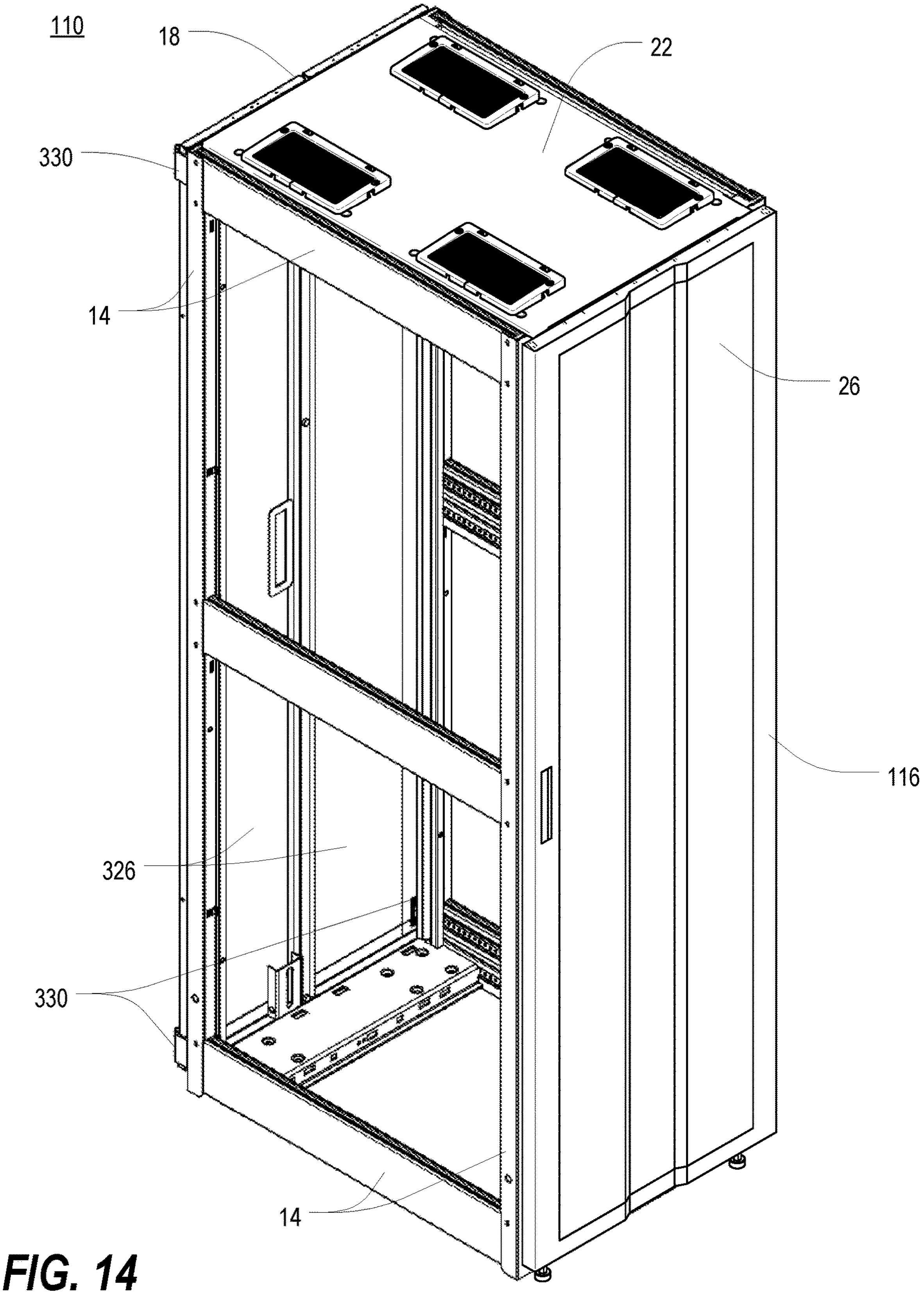
FIG. 14 is a front isometric view of another electronic equipment enclosure having electrically-bonded hinge assemblies in accordance with one or more preferred embodiments of the present invention.
Figure 15:
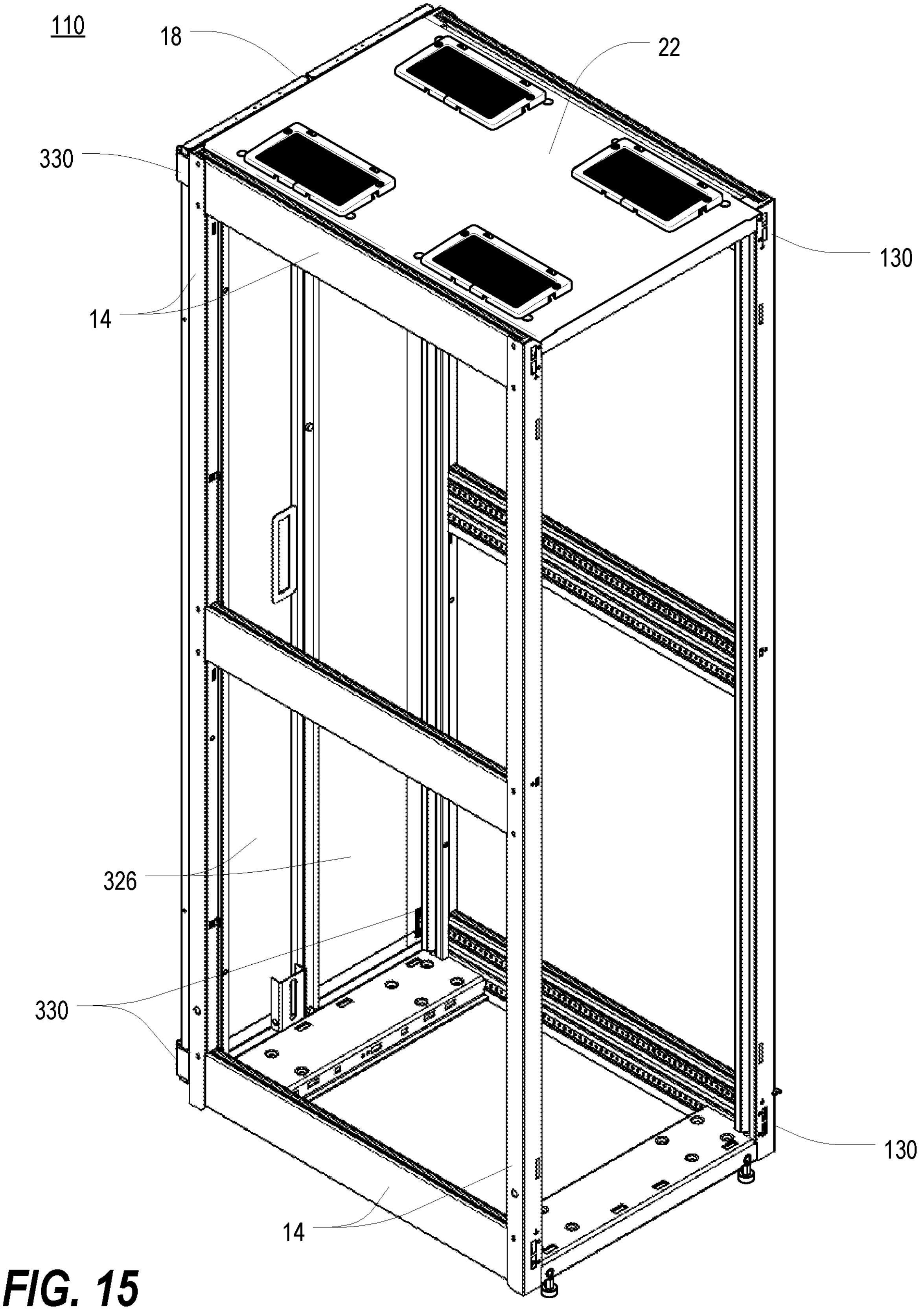
FIG. 15 is a front isometric view of the electronic equipment enclosure of FIG. 14, shown with the front door removed.

Electrically bonding a door via the pin of a hinge assembly may be accomplished in other manners as well. In this regard, FIG. 14 is a front isometric view of another electronic equipment enclosure 110 having electrically-bonded hinge assemblies in accordance with one or more preferred embodiments of the present invention, and FIG. 15 is a front isometric view of the electronic equipment enclosure 110 of FIG. 14, shown with the front door removed. Like the enclosure 10 of FIGS. 4 and 5, the enclosure 110 includes a four-post frame structure 14 supporting a front panel assembly 116, a rear panel assembly 18, and a top panel assembly 22. Although not shown, the frame structure 14 may further support a pair of side panel assemblies, a bottom panel assembly, and/or other structures. In the illustrated embodiment, the front panel assembly 116 is implemented as a single hinged door 26, the rear panel assembly 18 is implemented as a pair of hinged doors 326, and the top panel assembly 22 includes a primary panel and a plurality of ports. However, it will be appreciated that various replacement components may be substituted for the components of the enclosure system, without departing from the scope of the present invention.

Figure 16:
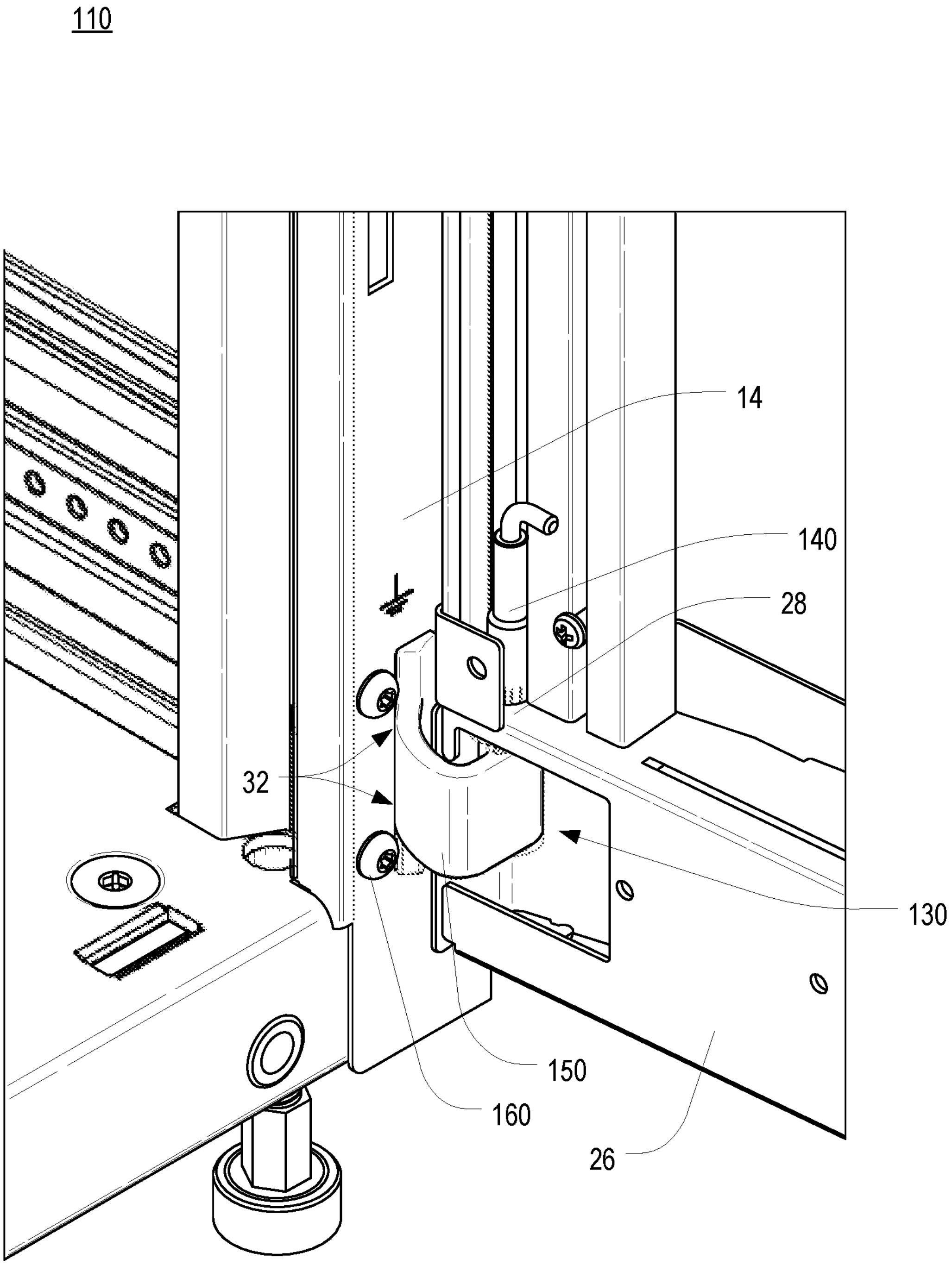
FIG. 16 is an enlarged fragmentary front isometric view of the lower right corner of the electronic equipment enclosure of FIG. 14, shown with an open door supported on one of the internal hinge assemblies.

The single hinged door 26 of the front panel assembly 116 is supported by two alternative internal hinge assemblies 130. In this regard, FIG. 16 is an enlarged fragmentary front isometric view of the lower right corner of the electronic equipment enclosure 110 of FIG. 14, shown with an open door 26 supported on one of the internal hinge assemblies 130. Like the hinge assemblies 30 of FIGS. 4-6, the hinge assemblies 130 of the front panel assembly 116 are referred to as “internal” hinge assemblies because they are mostly or entirely hidden behind the front surface of the door 26. Each hinge assembly 130 includes a pin unit 140 and a barrel unit 150, with the pin unit 140 being rotatable relative to the barrel unit 150. The barrel unit 150 is mounted to one of the posts of the frame structure 14, while structural portions 28 of the door 26 are carried on the pin unit 140, thus allowing the door 26 to be rotated relative to the post of the frame structure 14.

Figure 17:
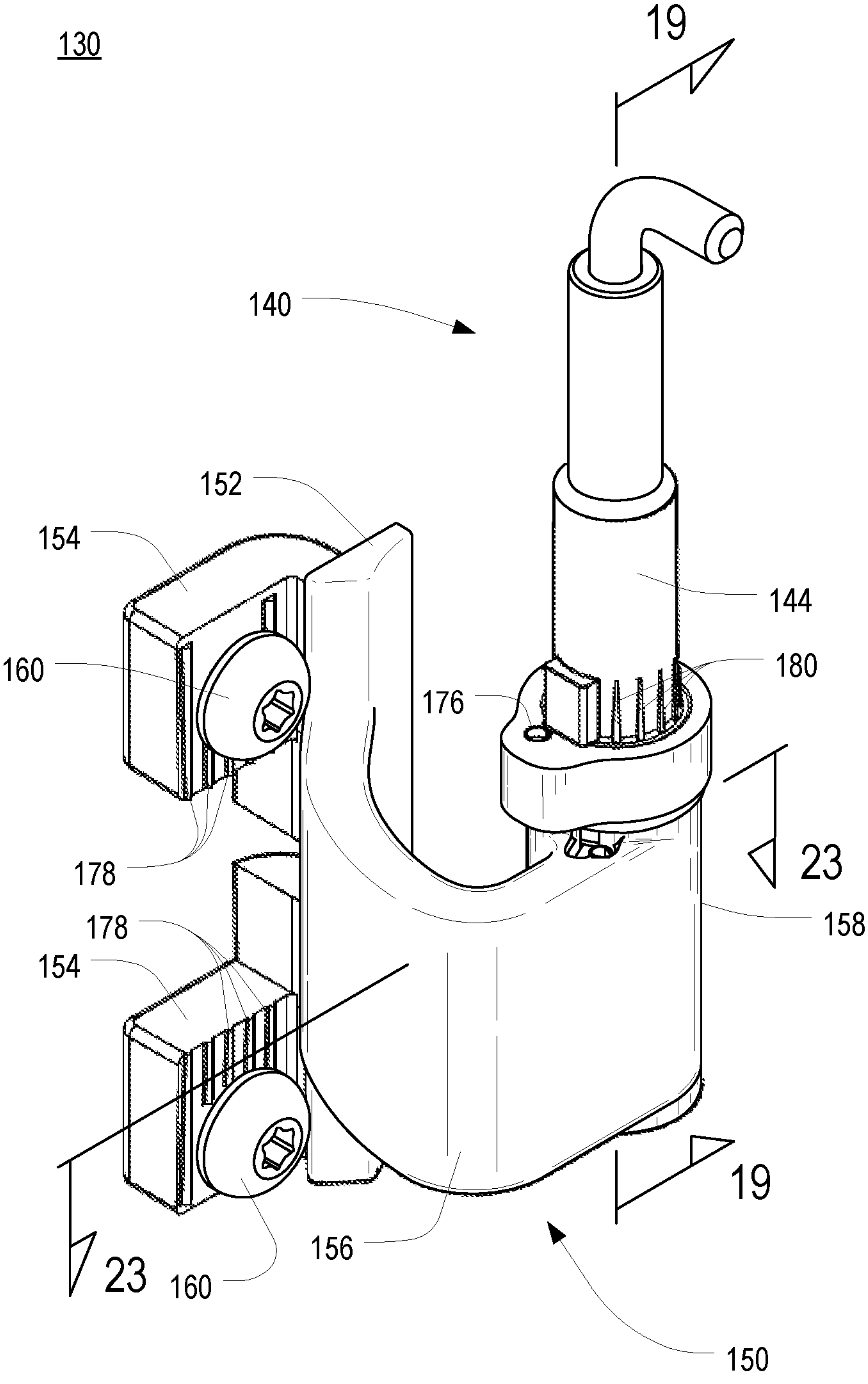
FIG. 17 is an isometric view of the electrically-bonded internal hinge assembly of FIG. 16, shown in isolation.
Figure 18:
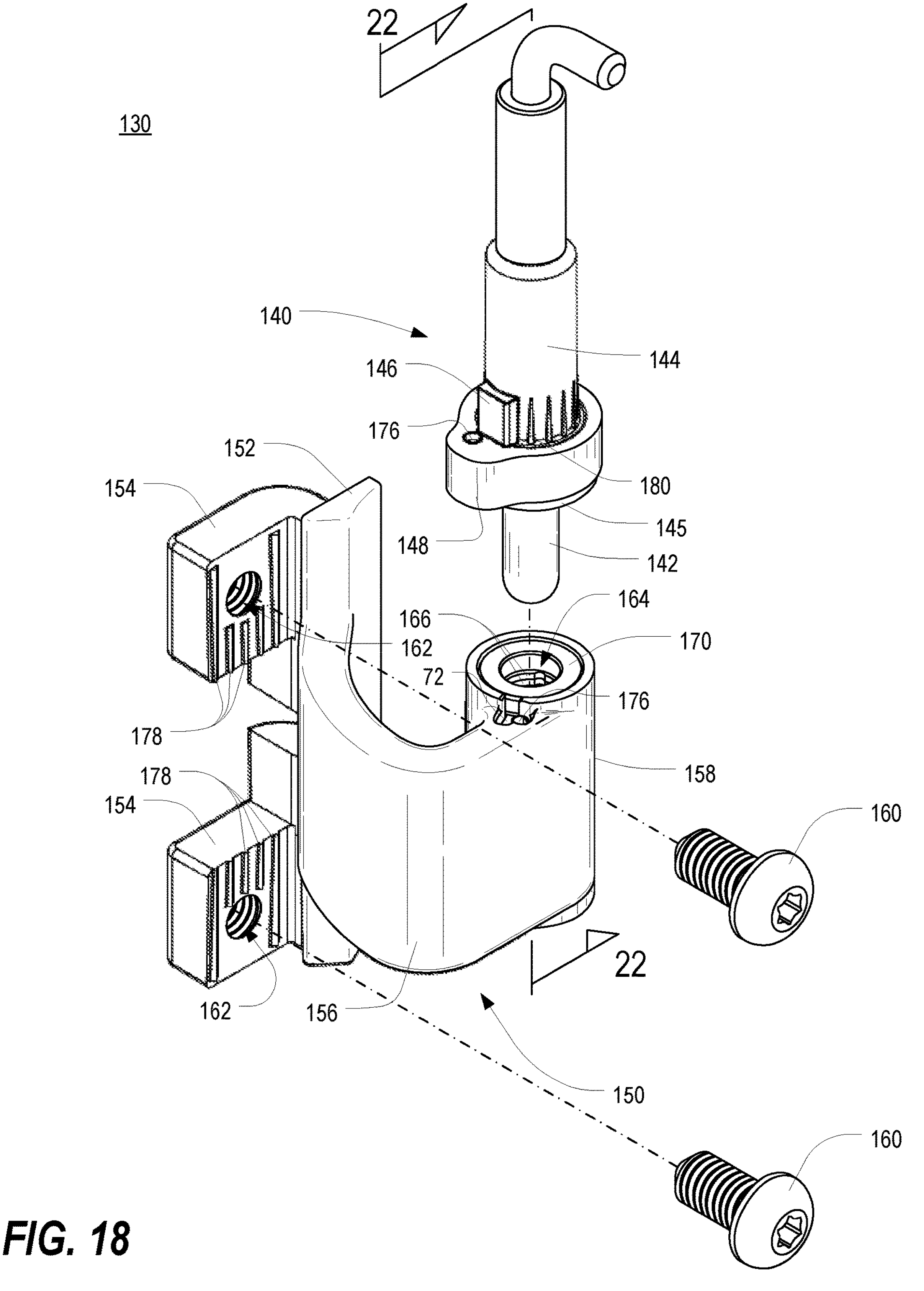
FIG. 18 is an exploded isometric view of the electrically-bonded internal hinge assembly of FIG. 17.

FIG. 17 is an isometric view of the electrically-bonded internal hinge assembly 130 of FIG. 16, shown in isolation, and FIG. 18 is an exploded isometric view of the electrically-bonded internal hinge assembly 130 of FIG. 17. As shown therein, the barrel unit 150 includes a base 152 carried on a pair of mounting brackets 154, a support arm 156 extending from the base 152, and a barrel 158 with a cylindrical receptacle 164 disposed at a distal end of the support arm 156. The mounting brackets 154 extend through openings 32 in the post of the frame structure 14 (partially visible in FIG. 16) and fit against a rear surface thereof, and the barrel unit 150 is fixed to the post via fasteners 160 that extend through apertures in the post and corresponding threaded apertures 162 in the mounting brackets 154. The pin unit 140 includes a cylindrical pin 142 that fits closely within the cylindrical receptacle 164 of the barrel 158. In addition, the pin unit 140 includes a pin housing 144 carried on the pin 142. The pin housing 144 includes a key structure 146, which interlocks with the structural portions 28 of the door 26 to prevent rotation relative thereto, and an electrical interconnect housing 148, which is described in further detail hereinbelow.

Figure 19:
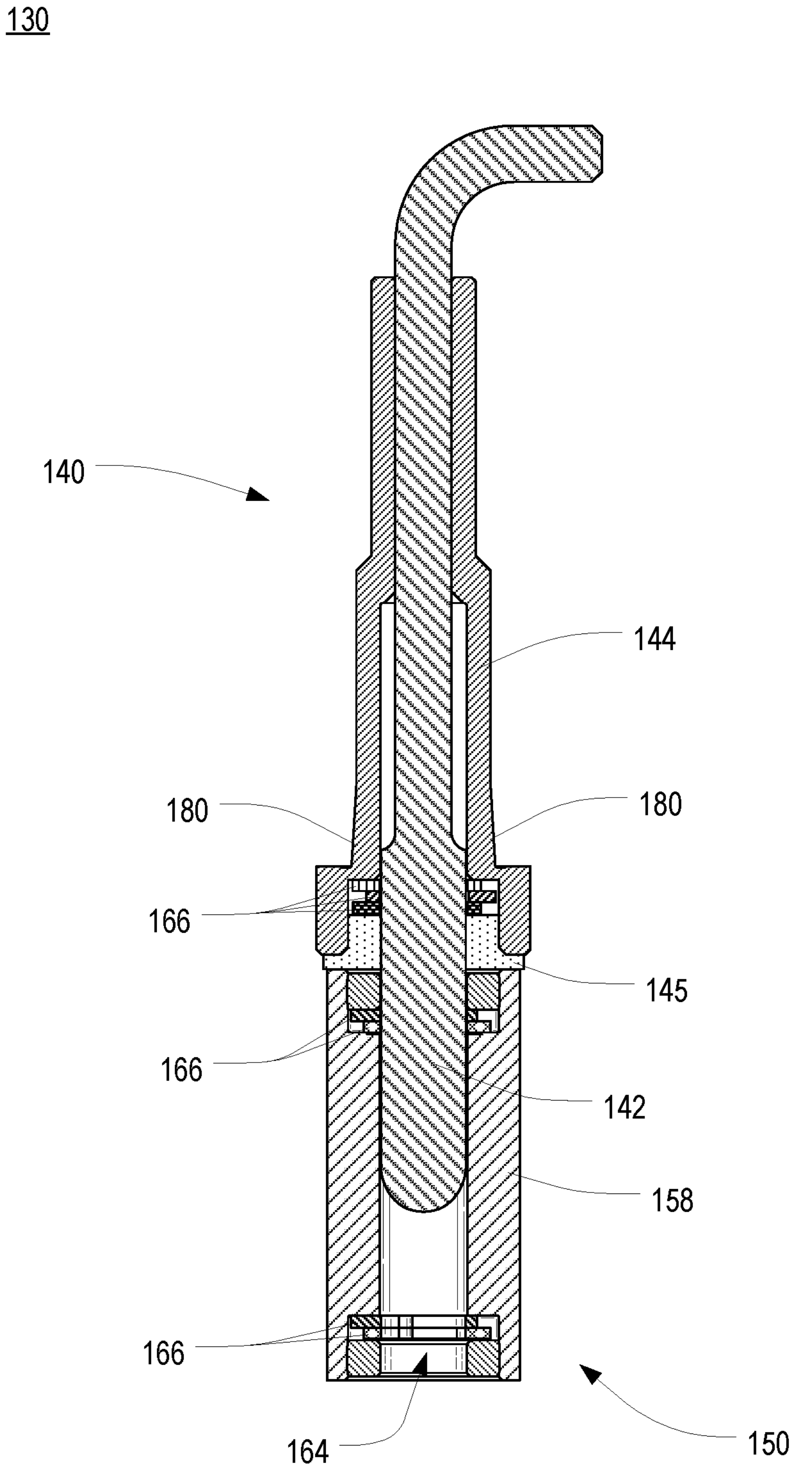
FIG. 19 is a left side cross-sectional view of the electrically-bonded internal hinge assembly of FIG. 17, taken along line 19-19.
Figure 20:
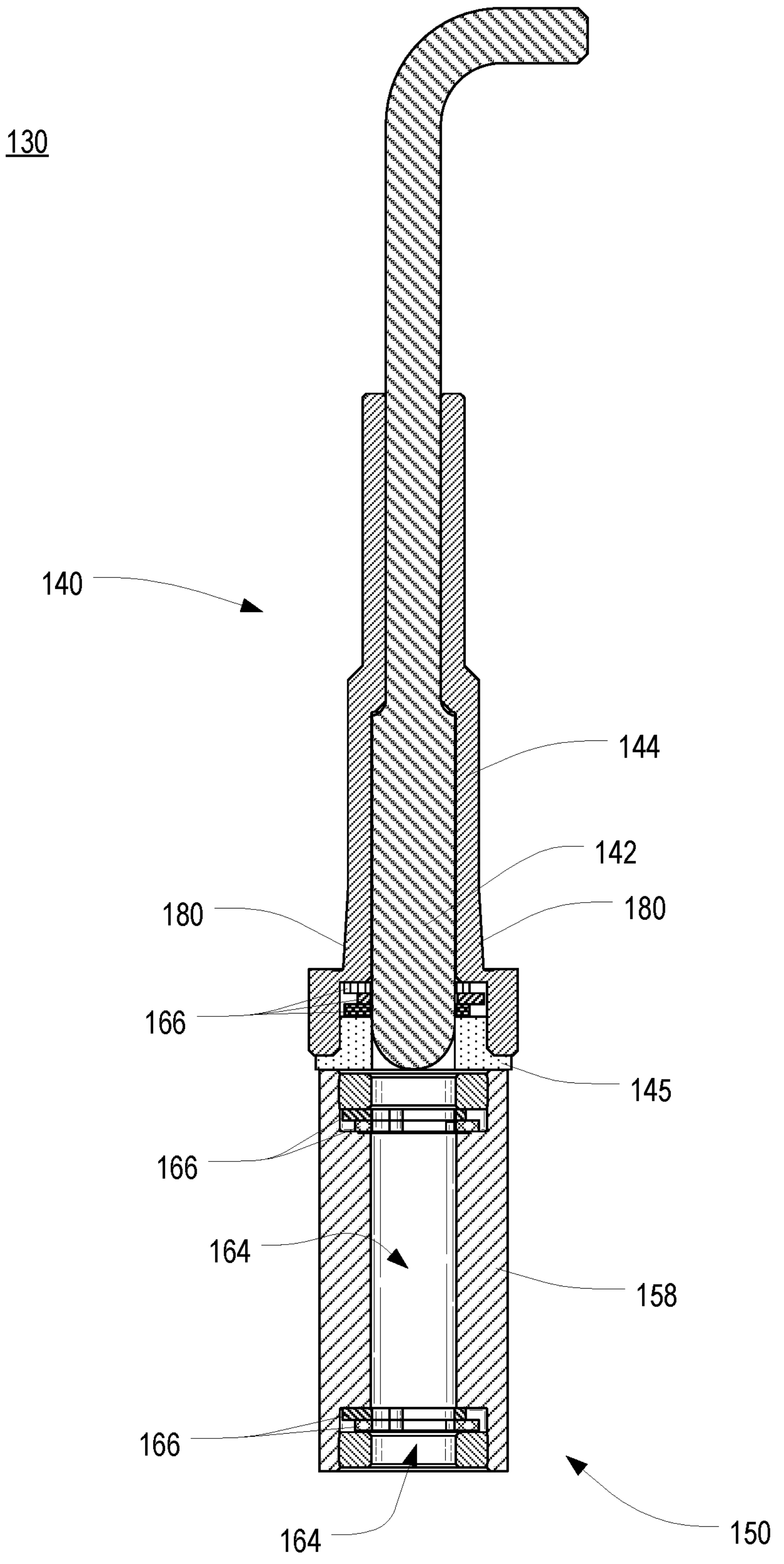
FIGS. 20 and 21 are further left side cross-sectional views of the electrically-bonded internal hinge assembly of FIG. 17 illustrating the removal of the pin unit from the barrel unit.
Figure 21:
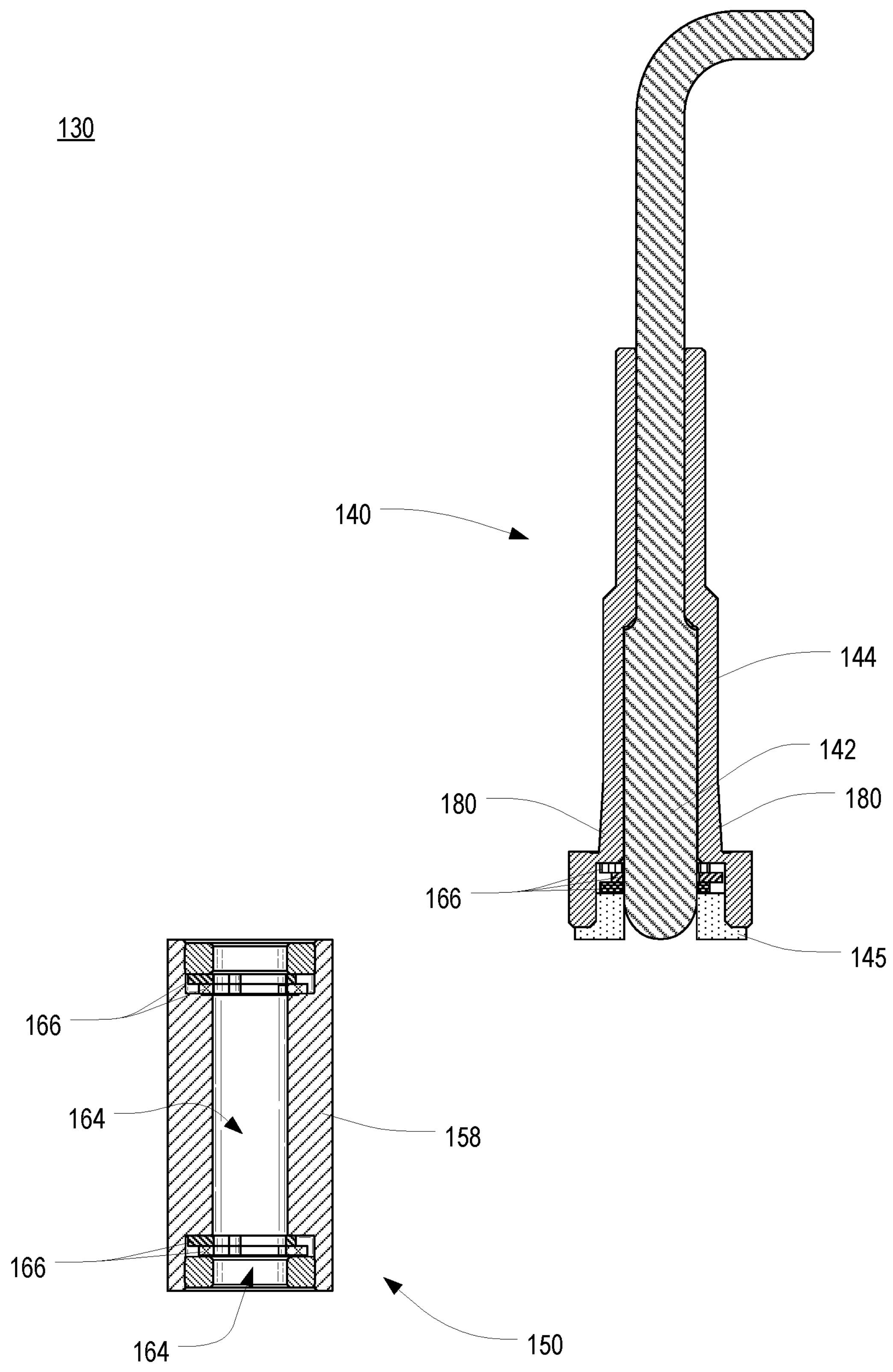

In at least some embodiments, the front door 26 may be easily removed from the frame structure 14 to facilitate installation, service, modification, and removal of equipment in the enclosure 110. In this regard, FIG. 19 is a left side cross-sectional view of the electrically-bonded internal hinge assembly 130 of FIG. 17, taken along line 19-19, and FIGS. 20 and 21 are further left side cross-sectional views of the electrically-bonded internal hinge assembly 130 of FIG. 17 illustrating the removal of the pin unit 140 from the barrel unit 150. In FIG. 19, the cylindrical pin 142 is shown seated within the cylindrical receptacle 164 of the barrel unit 150, thereby permitting the door (not shown in FIGS. 19-21) to be rotated on the pin 142 (and on the corresponding pin 142 of the hinge assembly 130 located at the upper front right of the enclosure 110 of FIG. 15). However, when the pin 142 is manipulated such that the lower end of the cylindrical pin 142 is withdrawn from the barrel unit 150, as shown in FIG. 20, the pin unit 140 may be separated from the barrel unit 150, as shown in FIG. 21. Thus, in the illustrated embodiment, a user may simply grasp the hooked upper end of the cylindrical pin 142, withdraw the pin 142 from the barrel unit 150, and remove the lower end of the door 26 from the frame structure 14. Furthermore, in at least some embodiments, the cylindrical pin 142 is biased into the position shown in FIG. 19 by a coil spring or the like such that withdrawing the pin 142 requires the application of a force sufficient to overcome the biasing force of the spring. This ensures that the pins 142 are not disengaged from the barrel units 150 accidentally.

The internal hinge assembly 130 provides electrical connectivity between the frame structure 14 and the front door assembly 16 using a variety of features. First, the barrel unit 150, which itself is preferably constructed partially or entirely from a conductive material, may be bonded to the frame structure 14 via unpainted ribs 178 that make contact with an unpainted surface on the frame structure 14. Alternatively or additionally, the barrel unit 150 may be bonded to the frame structure 14 via the threaded apertures 162 (which eliminate rivet nuts or hex nuts), particularly when using thread cutting screws 160, and/or in other ways. Likewise, the pin housing 144 includes unpainted ribs 180 that make contact with an unpainted hole in the door 26 when the pin housing 144 is press fit into the hole, thereby bonding the door 26 to the pin housing 144.

Figure 22:
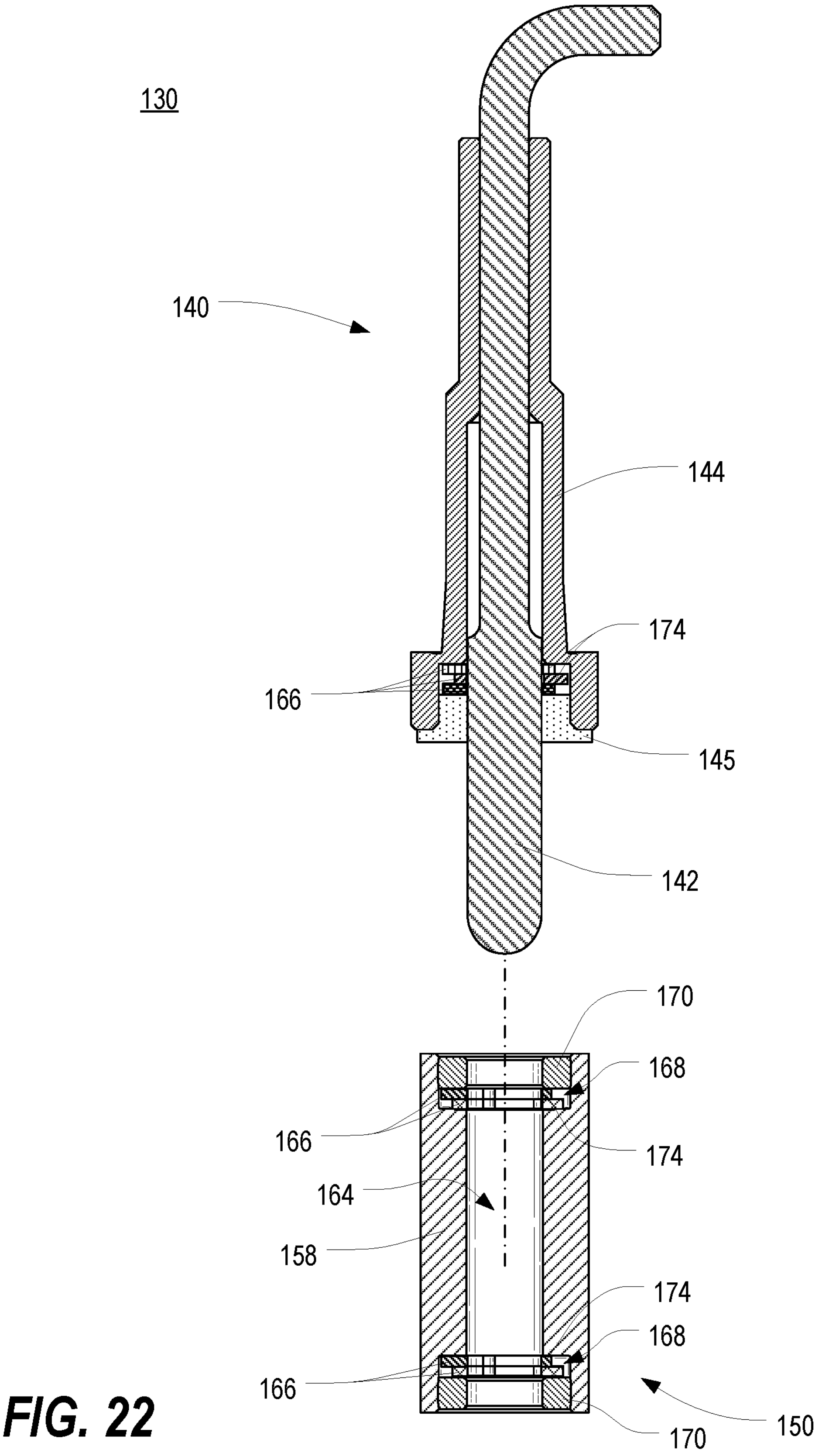
FIG. 22 is a left side cross-sectional view of the exploded electrically-bonded internal hinge assembly of FIG. 18, taken along line 22-22.

Perhaps most notably, the internal hinge assembly 130 includes features that provide a stable electrical connection between the pin 142 and the barrel 158 throughout the range of movement of the door 26 relative to the frame structure 14. In this regard, FIG. 22 is a left side cross-sectional view of the exploded electrically-bonded internal hinge assembly 130 of FIG. 18, taken along line 22-22. With particular reference to FIGS. 19 and 22, groupings of bonding elements in the form of electrically-conductive bonding contact clips 166 are located at the top and bottom of the barrel 158 and inside the pin housing 144. As further described hereinbelow, the bonding contact clips 166 are spring-biased such that they are forced inward, against sides of the pin 142, when the pin 142 is disposed in the cylindrical receptacle 164. (The bonding contact clips 166 in the bottom of the barrel 158 are not necessarily utilized when the hinge assembly 130 is in the orientation shown in FIGS. 18 and 19, but such extra clips 166 may make it possible to reverse the vertical orientation of the hinge assembly 130 without loss of function.) In the barrel unit 150, the clips 166 of each grouping are arranged in a counterbore 168 in each end of the barrel 158 and are held in place via an endcap 170. In the pin unit 140, the clips 166 are held in place within the pin housing 144 by a plastic end bushing 145, which in some embodiments may itself be retained at least in part by one or more bosses (not shown) on the bottom of the pin housing 144.

Figure 23:
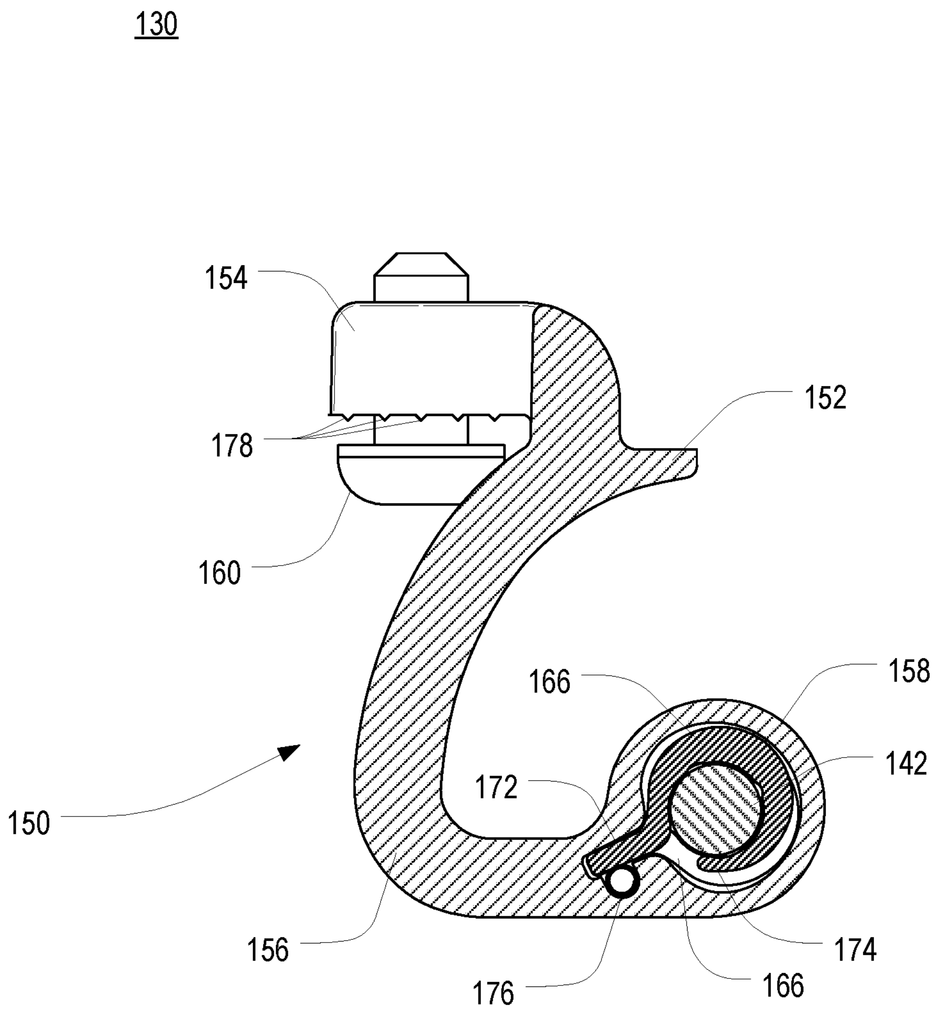
FIG. 23 is a top cross-sectional view of the electrically-bonded internal hinge assembly of FIG. 17, taken along line 23-23.

Notably, each grouping of bonding contact clips 166 includes at least one clip 166 oriented in an opposite direction from another clip 166 in the grouping so as to ensure contact between at least one of the clips 166 and the pin 142 no matter which way the door 26 is being rotated. This is better illustrated in FIG. 23, which is a top cross-sectional view of the electrically-bonded internal hinge assembly 130 of FIG. 17, taken along line 23-23. As shown therein, each bonding contact clip 166 is shaped like a portion of a question mark such that it hooks around the pin 142 inside the barrel 158. In FIG. 23, a first clip 166 is shown in cross section, while a second clip 166 is partially visible beneath the first. From its base 172, the first clip 166 extends clockwise around the pin 142, first widening and then tapering to a relatively narrow end 174. Although only partially visible, the second clip 166 is identical in shape but is reversed such that it extends counter-clockwise around the pin 142.

The bonding contact clips 166 are also subjected to a biasing force. Again, because oppositely-oriented clips 166 are present in each grouping, the biasing force has the effect of ensuring that the first clip 166 contacts the pin 142 from one side, and that the second clip 166 contacts the pin 142 from the opposite side. Furthermore, because of how the bonding contact clips 166 wrap or hook around the pin 142, these forces are applied even when the pin 142 rotates relative to the barrel 158. The biasing force may be applied in a variety of ways, but in the illustrated embodiment, a spiral torsion spring 176 is arranged immediately adjacent the various bases 172 of the clips 166. For the groupings of clips 166 in the barrel unit 150, the spiral torsion springs 176 are located within the barrel 158 and/or support arm 156, while for the grouping in the pin unit 140, the spring 176 is located in the electrical interconnect housing 148, adjacent the bases 172 of the clips 166. Other biasing mechanisms may likewise be utilized without departing from the scope of the present invention. Notably, the biasing mechanisms, such as the spiral torsion spring 176, may themselves provide further electrical connectivity between the structure in which they are housed and the clips 166.

Thus, electrical bonding between the frame structure 14 and the door 26 may be provided by bonding the base 152 to the frame structure 14; bonding the pin 142 to the barrel 158, particularly through the use of bonding elements in the form of alternating bonding contact clips 166 that are themselves bonded to other portions of the barrel unit 150 and which remain in contact with the pin 142 throughout the range of movement of the door 26 relative to the frame structure 14; bonding the pin housing 144 to the pin 142, particularly through the use of alternating bonding contact clips 166 that are themselves bonded to other portions of the pin unit 140 and which remain in contact with the pin 142 throughout the range of movement of the door 26 relative to the frame structure 14; and bonding from the pin housing 144 to the structural portions 28 of the door 26.

Figure 24:
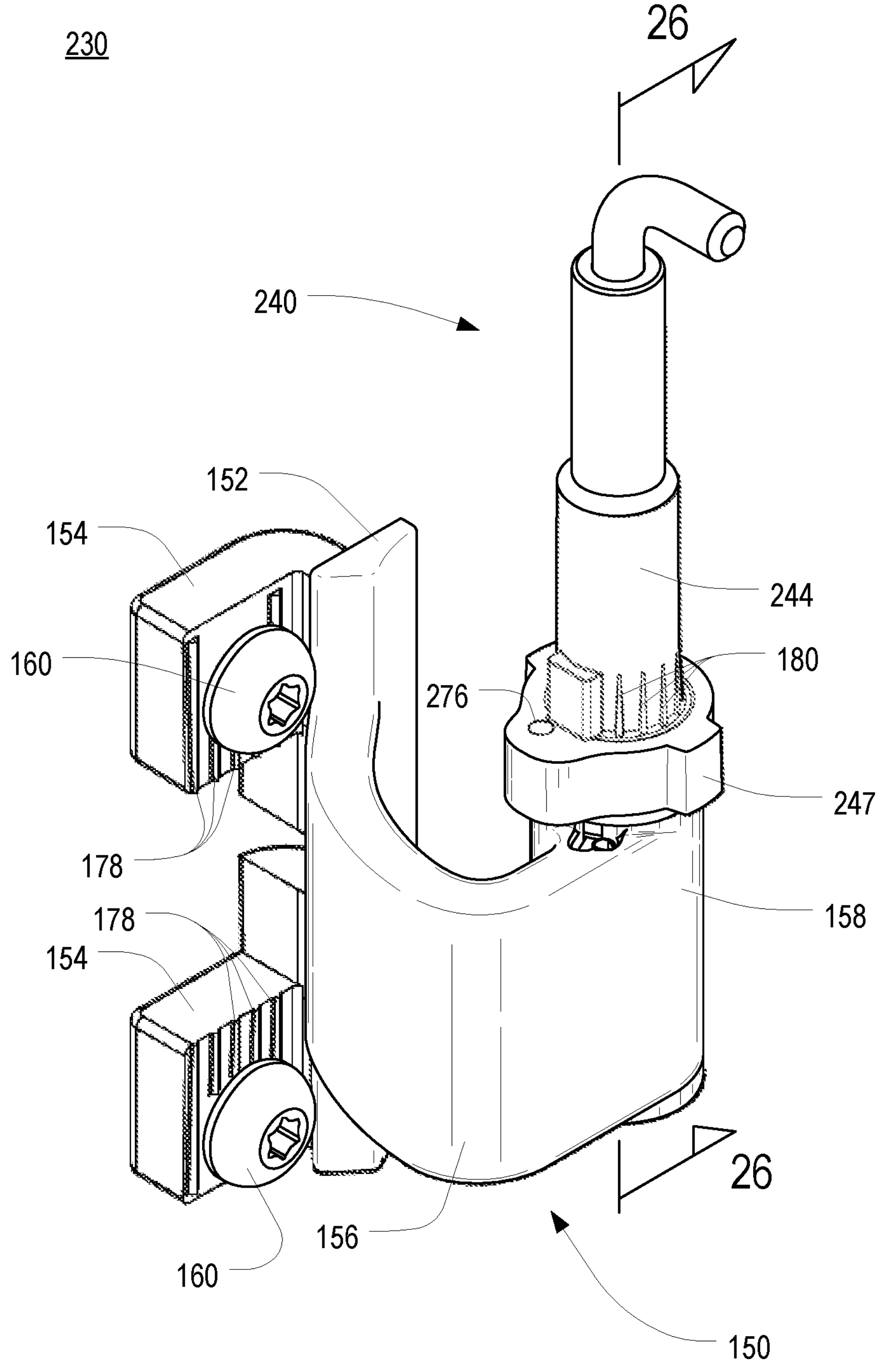
FIG. 24 is an isometric view of an electrically-bonded internal hinge assembly having an alternative pin unit in accordance with one or more preferred embodiments of the present invention.
Figure 25:
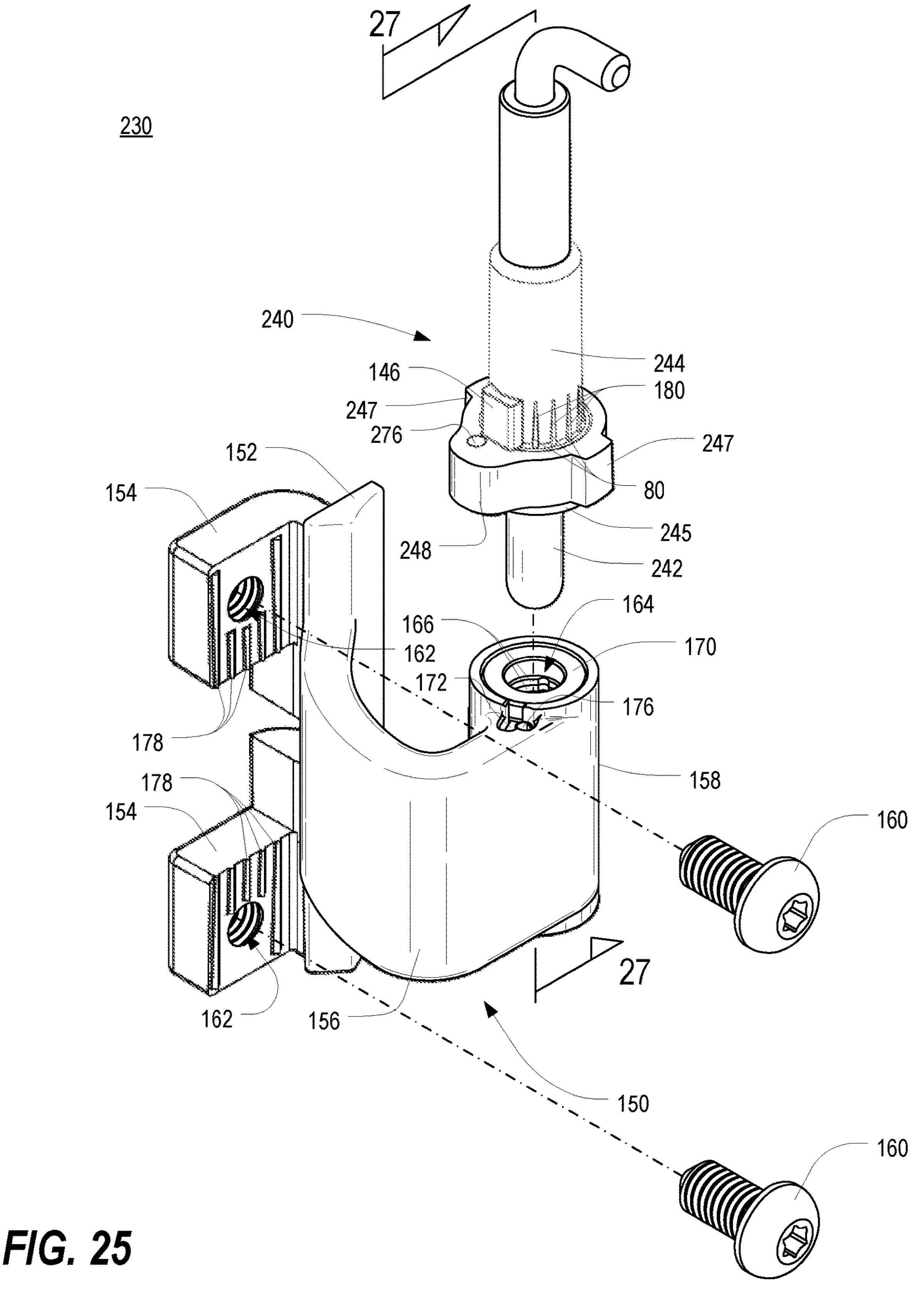
FIG. 25 is an exploded isometric view of the electrically-bonded internal hinge assembly of FIG. 24.

An alternative version of a pin unit 240 is shown in FIGS. 24 and 25, wherein FIG. 24 is an isometric view of an electrically-bonded internal hinge assembly 230 that utilizes the pin unit 240, and FIG. 25 is an exploded isometric view of the electrically-bonded internal hinge assembly 230 of FIG. 24. As shown therein, the barrel unit 150 of the hinge assembly 230 is identical to that of FIGS. 16-23. The pin unit 240 is also very similar to the pin unit 140 of FIGS. 16-23 and includes a cylindrical pin 242 that fits closely within the cylindrical receptacle 164 of the barrel 158. In addition, the pin unit 240 includes a pin housing 244 carried on the pin 242. Like the pin housing 144 of the previous pin unit 140, the pin housing 244 includes a key structure 146 that interlocks with the structural portions 28 of the door 26 to prevent rotation relative thereto. The pin housing 244 also includes a pair of external bosses 247 for improving installation in the door 26. Like the hinge assembly 130 of FIGS. 16-23, the hinge assembly 230 of FIGS. 24 and 25 facilitates the removal of the front door 26 from the frame structure 14 by manipulating the pin 242 in like manner to that discussed with respect to FIGS. 19-21 and separating the pin unit 240 from the barrel unit 150.

Figure 26:
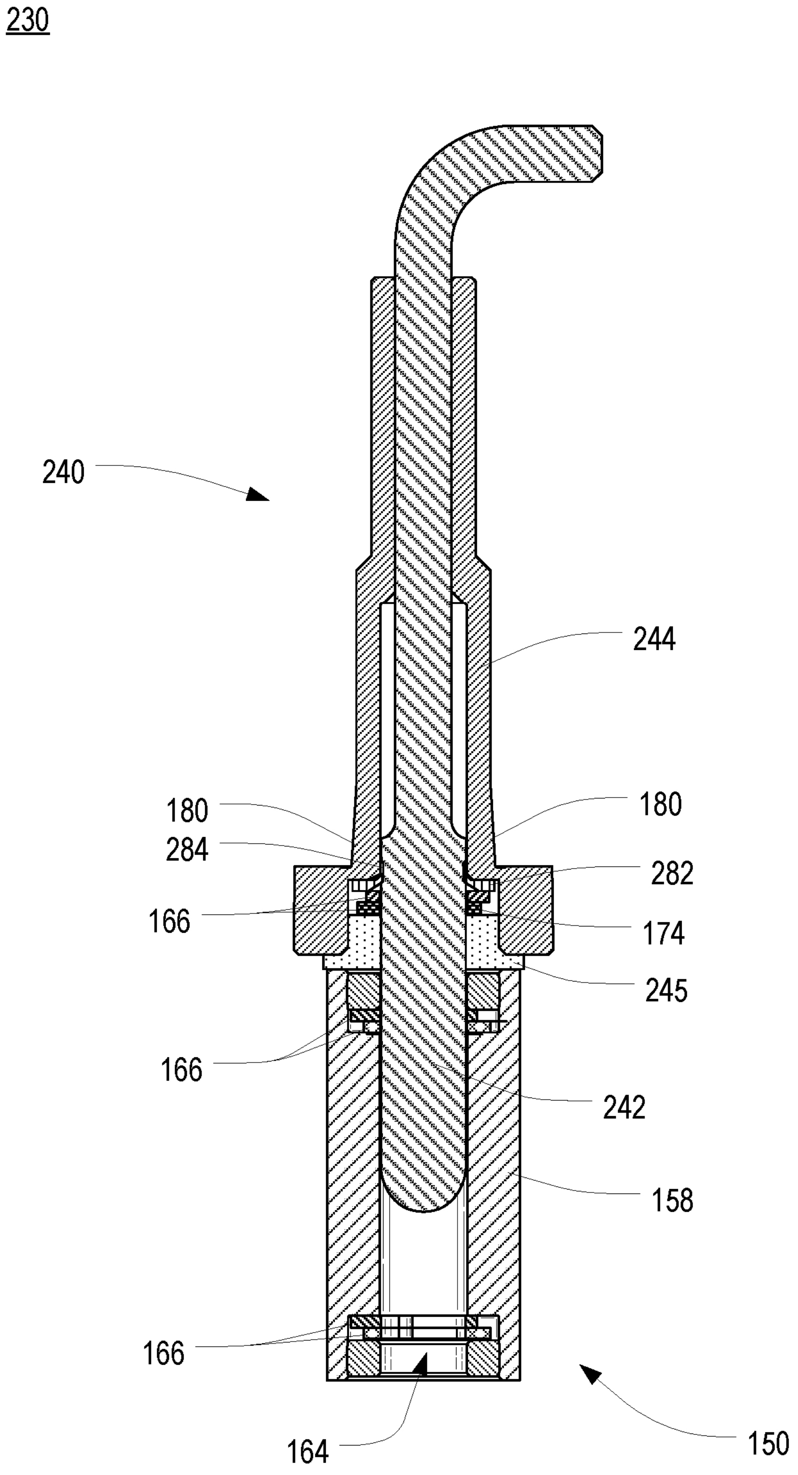
FIG. 26 is a left side cross-sectional view of the electrically-bonded internal hinge assembly of FIG. 24, taken along line 26-26.
Figure 27:
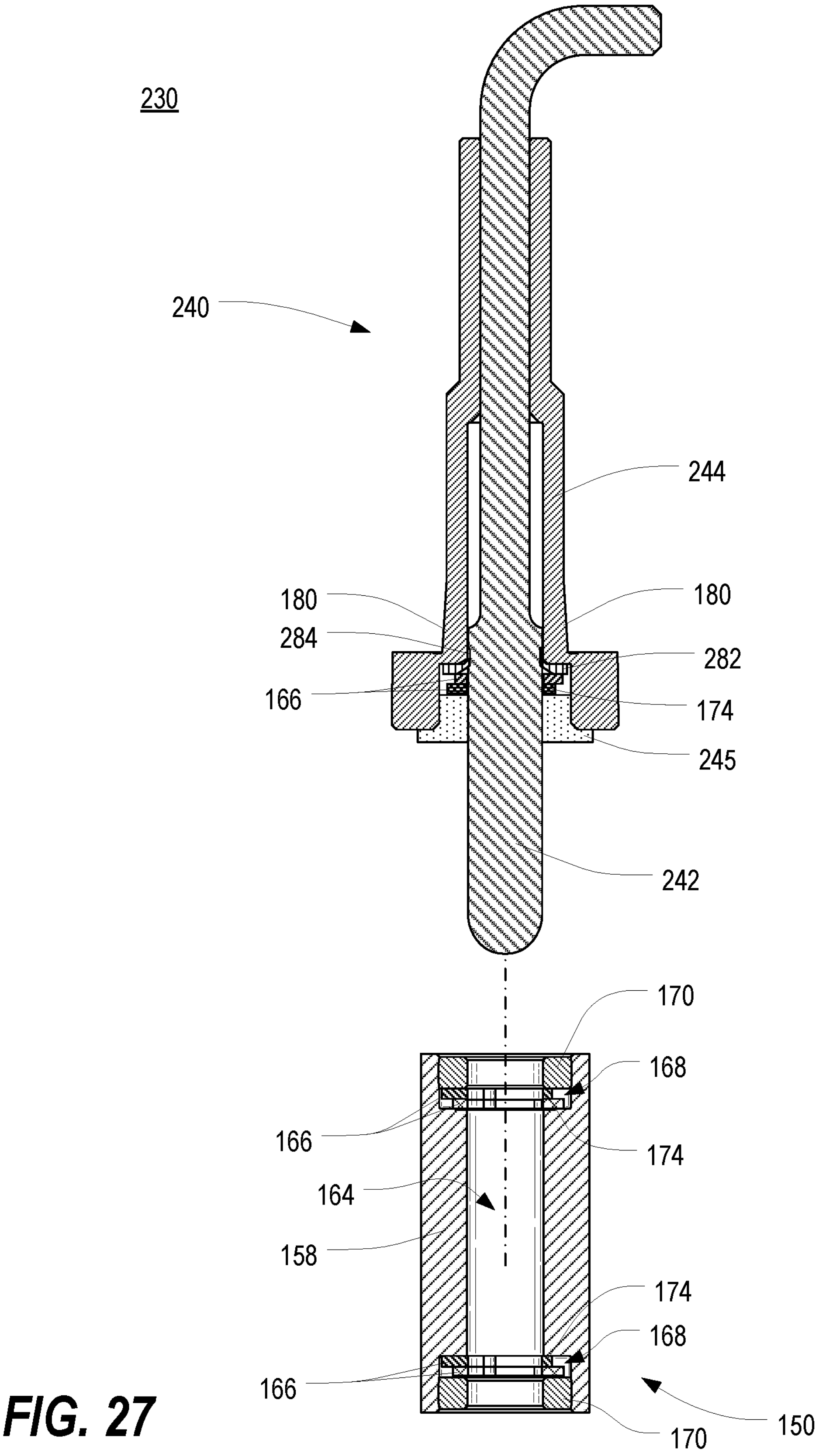
FIG. 27 is a left side cross-sectional view of the exploded electrically-bonded internal hinge assembly of FIG. 25, taken along line 27-27.
Figure 28:
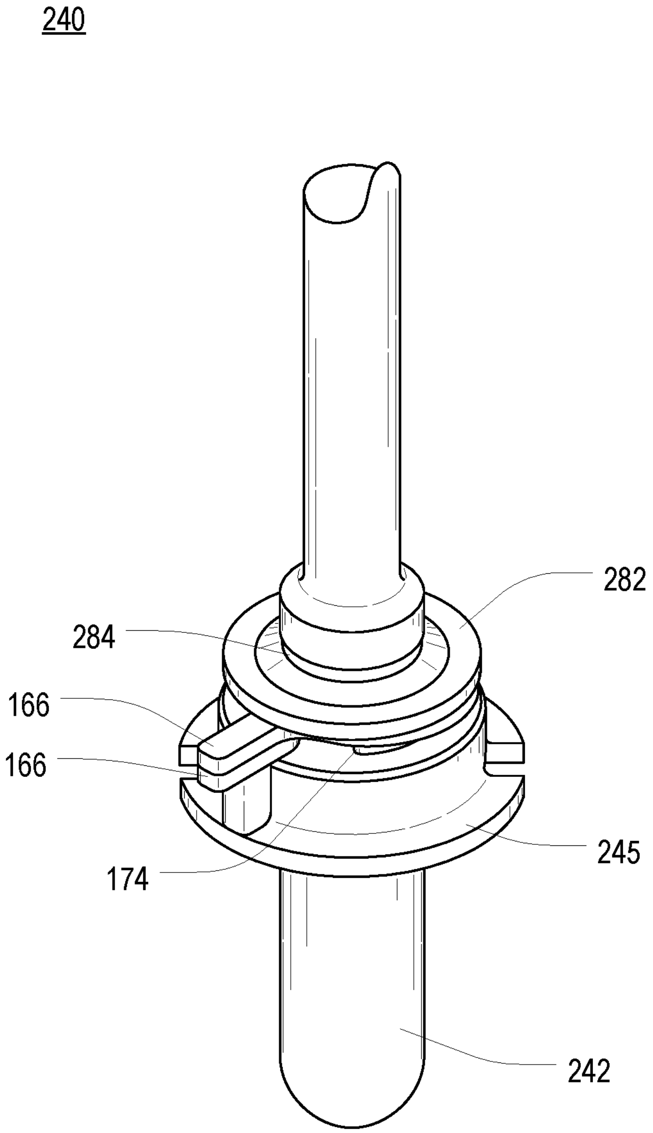
FIG. 28 is an enlarged fragmentary isometric view of the pin unit of FIG. 27, shown with the pin housing removed.

The internal hinge assembly 230 provides electrical connectivity between the frame structure 14 and the front door assembly 16 using the same general features as those used by the hinge assembly 130 of FIGS. 16-23, including features that provide a stable electrical connection between the pin 242 and the barrel 158 throughout the range of movement of the door 26 relative to the frame structure 14. In this regard, FIG. 26 is a left side cross-sectional view of the electrically-bonded internal hinge assembly 230 of FIG. 24, taken along line 26-26; FIG. 27 is a left side cross-sectional view of the exploded electrically-bonded internal hinge assembly 230 of FIG. 25, taken along line 27-27; and FIG. 28 is an enlarged fragmentary isometric view of the pin unit 240 of FIG. 27, shown with the pin housing 244 removed. As shown therein, the hinge assembly 230 includes a pair of the oppositely-oriented bonding contact clips 166 that are held in place within the pin housing 244 between a plastic end bushing 245 and a plastic retaining washer 282. An inside diameter of the plastic retaining washer 282 fits into a shallow circumferential groove 284 in the pin 242 such that during installation, as the pin 242 slides into an engaged position, the inside diameter of the washer 282 perceptibly snaps into the groove 284 and thereby indicates to the installer that the pin 242 is fully engaged. The bonding contact clips 166 are forced into place against the cylindrical pin 242 by a solid steel pin 276 located in the electrical interconnect housing 248, adjacent the bases 272 of the clips 166. Overall, functionality of the internal hinge assembly 230, including the electrical bonding achieved thereby, is otherwise similar to that of the internal hinge assembly 130 described previously.

Figure 29:
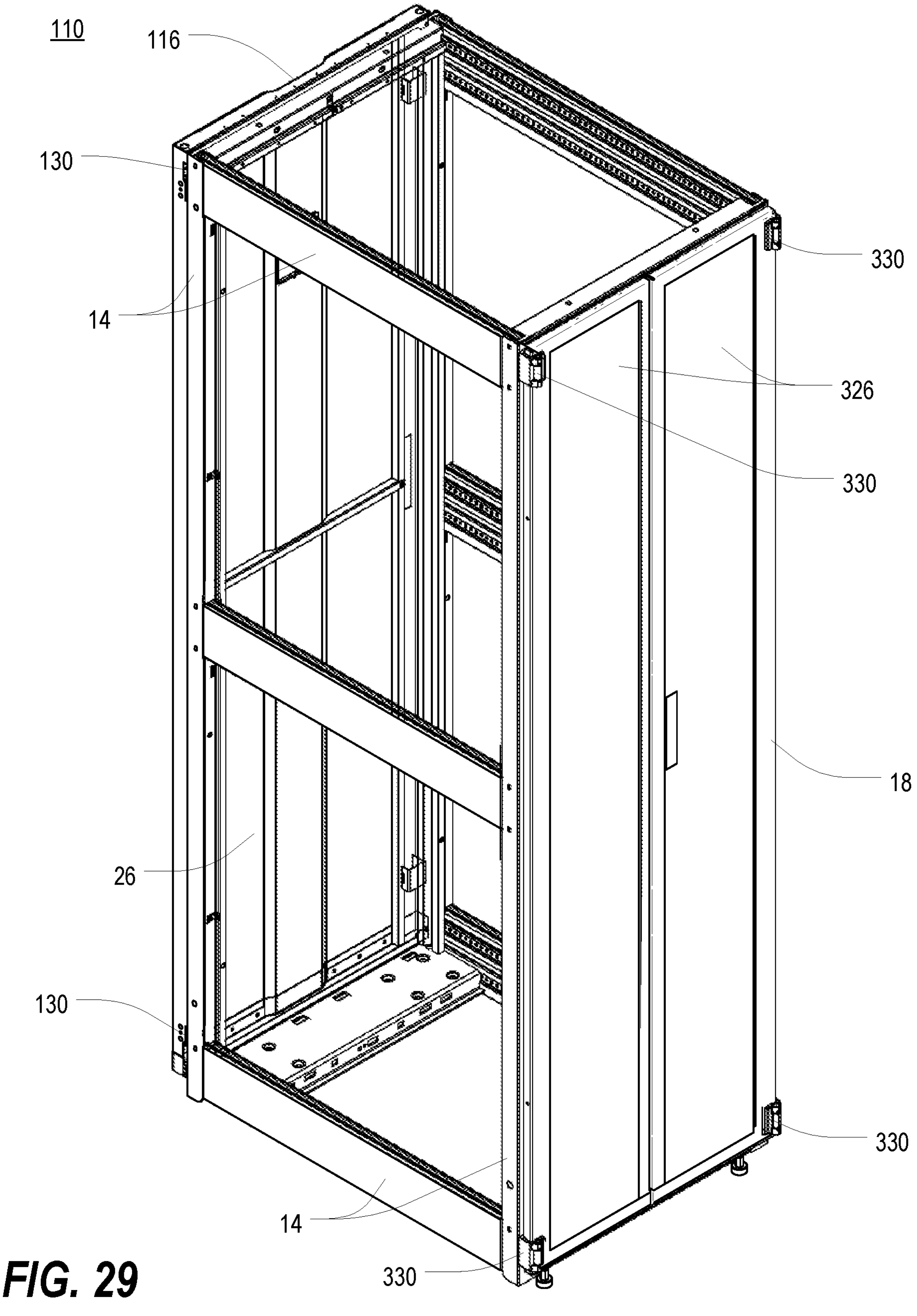
FIG. 29 is a rear isometric view of the electronic equipment enclosure of FIG. 14, shown with the top panel assembly removed.
Figure 30:
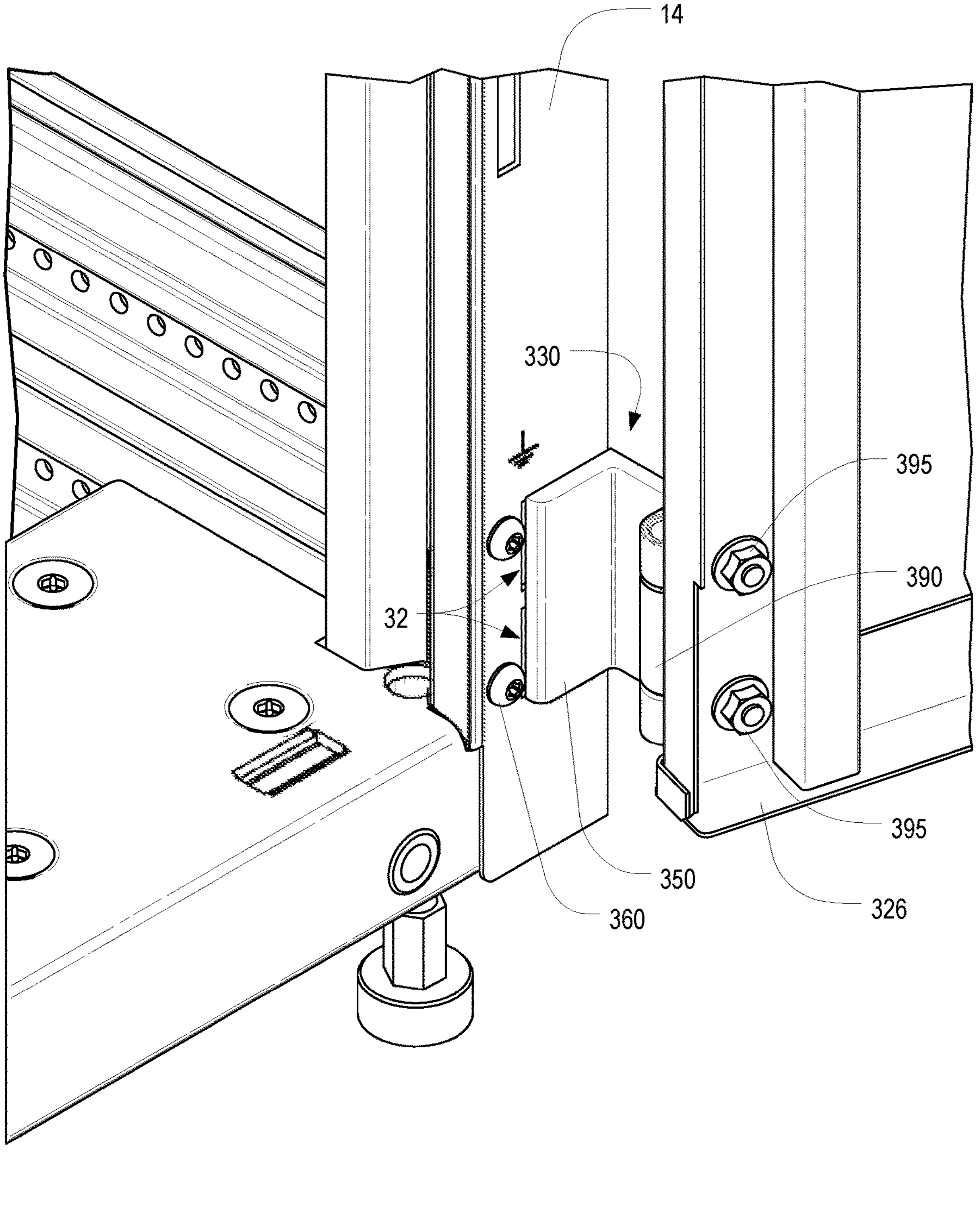
FIG. 30 is an enlarged fragmentary isometric view of the lower right corner of the electronic equipment enclosure of FIG. 29, shown with an open door supported on one of the external hinge assemblies.

FIG. 29 is a rear isometric view of the electronic equipment enclosure 110 of FIG. 14, shown with the top panel assembly 22 removed. The hinged doors 326 of the rear panel assembly 18 are each supported by two external hinge assemblies 330. In this regard, FIG. 30 is an enlarged fragmentary rear isometric view of the lower right corner of the electronic equipment enclosure 110 of FIG. 29, shown with an open door 326 supported on one of the external hinge assemblies 330. The hinge assemblies 330 of the rear panel assembly 18 are referred to as “external” hinge assemblies because they are visible on the front and side of the doors 326. Each hinge assembly 330 includes a pin 342, a first barrel unit 350, and a second barrel unit 390, with the barrel units 350,390 and pin 342 being rotatable relative to each other. The first barrel unit 350 is mounted to one of the posts of the frame structure 14, while the second barrel unit 390 is mounted to the door 326, thus allowing the door 326 to be rotated relative to the post of the frame structure 14.

Figure 31:
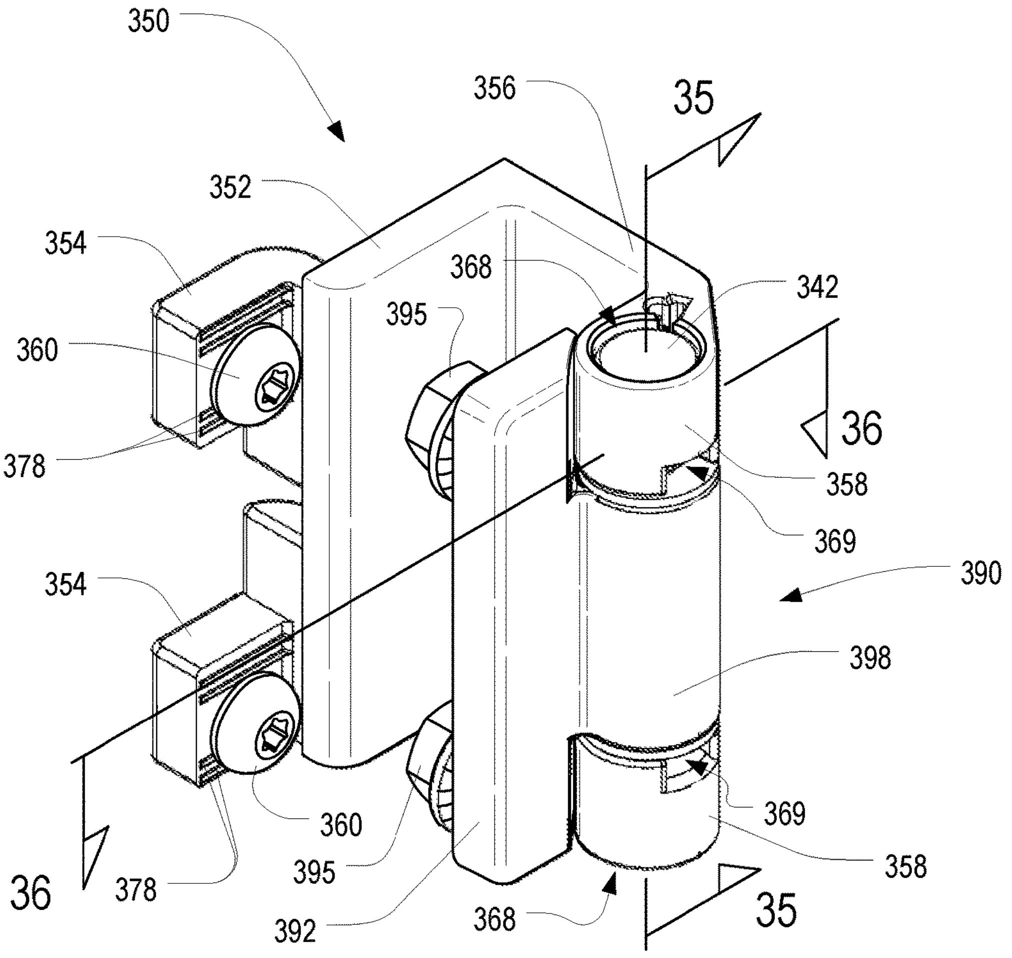
FIG. 31 is an isometric view of the electrically-bonded external hinge assembly of FIG. 29, shown in isolation.

FIG. 31 is an isometric view of the electrically-bonded external hinge assembly 330 of FIG. 29, shown in isolation. As shown therein, the first barrel unit 350 includes a base 352 carried on a pair of mounting brackets 354, a support arm 356 extending from the base 352, and two knuckles or barrels 358, each with a cylindrical receptacle 364, disposed at a distal end of the support arm 356. The mounting brackets 354 extend through openings 32 in the post of the frame structure 14 (partially visible in FIG. 30) and fit against a rear surface thereof, and the first barrel unit 350 is fixed to the post via fasteners 360 that extend through apertures in the post and corresponding threaded apertures 362 (visible in FIG. 33) in the mounting brackets 354.

Figure 32:
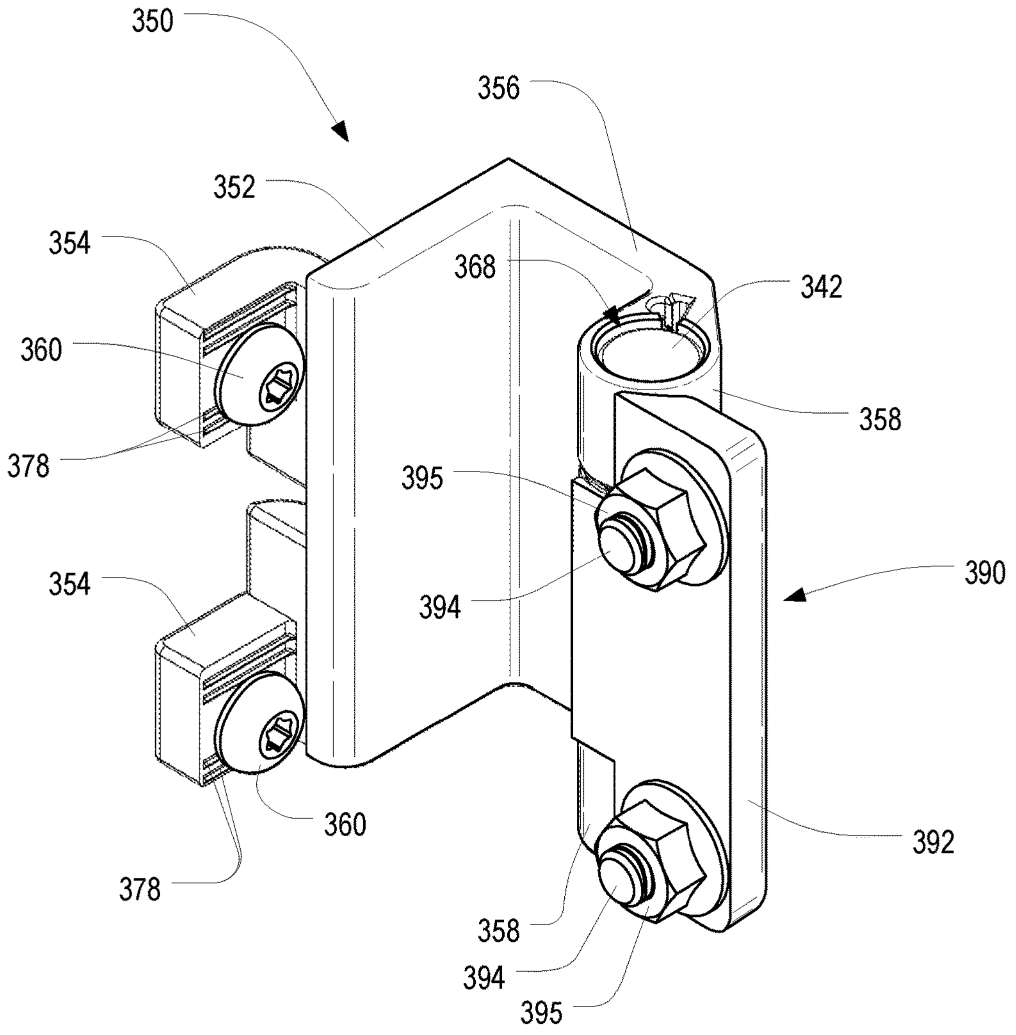
FIG. 32 is an isometric view of the electrically-bonded external hinge assembly of FIG. 31, shown with the hinge leaf structure rotated 90 degrees.
Figure 33:
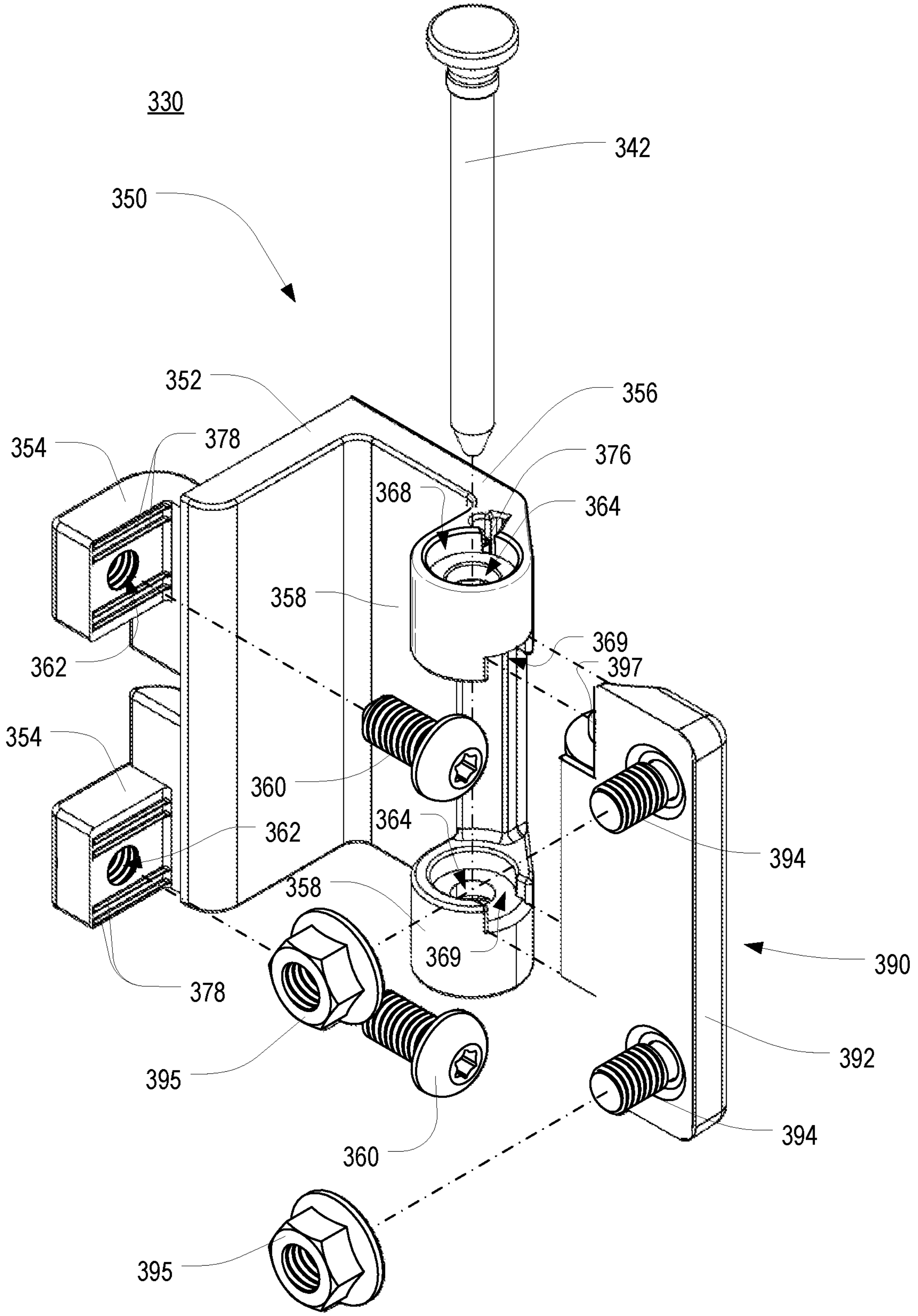
FIG. 33 is an exploded isometric view of the electrically-bonded external hinge assembly of FIG. 32.
Figure 34:
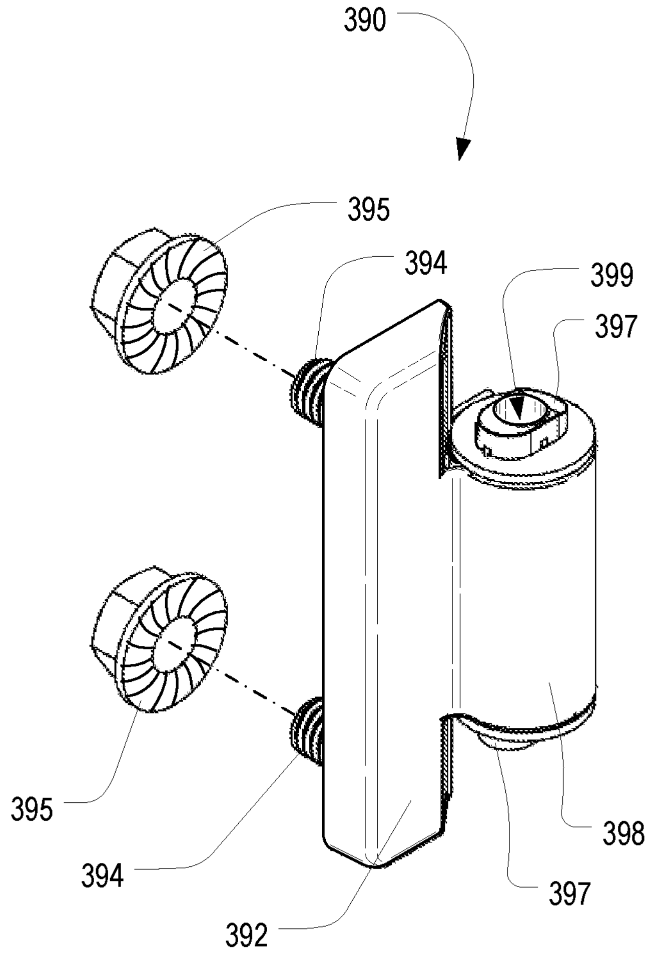
FIG. 34 is a reverse exploded isometric view of the second barrel unit of FIG. 33.

The second barrel unit 390 includes a hinge leaf structure 392, with two threaded studs 394 integrated therein, and a barrel 398. In this regard, FIG. 32 is an isometric view of the electrically-bonded external hinge assembly 330 of FIG. 31, shown with the hinge leaf structure 392 rotated 90 degrees; FIG. 33 is an exploded isometric view of the electrically-bonded external hinge assembly 330 of FIG. 32; and FIG. 34 is a reverse exploded isometric view of the second barrel unit 390 of FIG. 33. As shown therein, the barrel 398 includes a rotational boss 397 at both the top and bottom as well as a cylindrical receptacle 399 extending vertically therethrough. The rotational bosses 397, which in the illustrated embodiment are obround in shape, fit into corresponding counterbores 369 in the knuckles 358 of the first barrel unit 350. The pin 342 is generally cylindrical and fits closely within the cylindrical receptacles 364 of the knuckles or barrels 358 and the cylindrical receptacle 399 of the barrel 398. When the pin 342 is removed and the second barrel unit 390 is rotated into the orientation shown in FIGS. 32 and 33, the rotational bosses 397 may be freely removed from, or reinserted into, the counterbores 369 via side openings therein. The door 326 carried by the hinge assemblies 330 may thus be removed from the electronic equipment enclosure 110 by removing the pins 342 and rotating the door 326 approximately 90 degrees to an open position, at which point the rotational bosses 397 may be removed from the counterbores 396. However, the obround rotational bosses 397 prevent the door 326 from being removed when the door 326 is in a closed state, even if the pins 342 are removed.

As with the internal hinge assembly 130, the external hinge assembly 330 provides electrical connectivity between the frame structure 14 and the rear door assembly 18 using a variety of features. First, the first barrel unit 350, which itself is preferably constructed partially or entirely from a conductive material, may be bonded to the frame structure 14 via unpainted ribs 378 that make contact with an unpainted surface on the frame structure 14. Alternatively or additionally, the barrel unit 350 may be bonded to the frame structure 14 via the threaded apertures 362 (which eliminate rivet nuts or hex nuts), particularly when using thread cutting screws 360, and/or the like. Likewise, the studs 394 are attached to the door 326 via serrated nuts 395 that may break paint on the structural portions of the door 326, thereby bonding the door 326 to the studs 394 and the second barrel unit 390.

Figure 35:
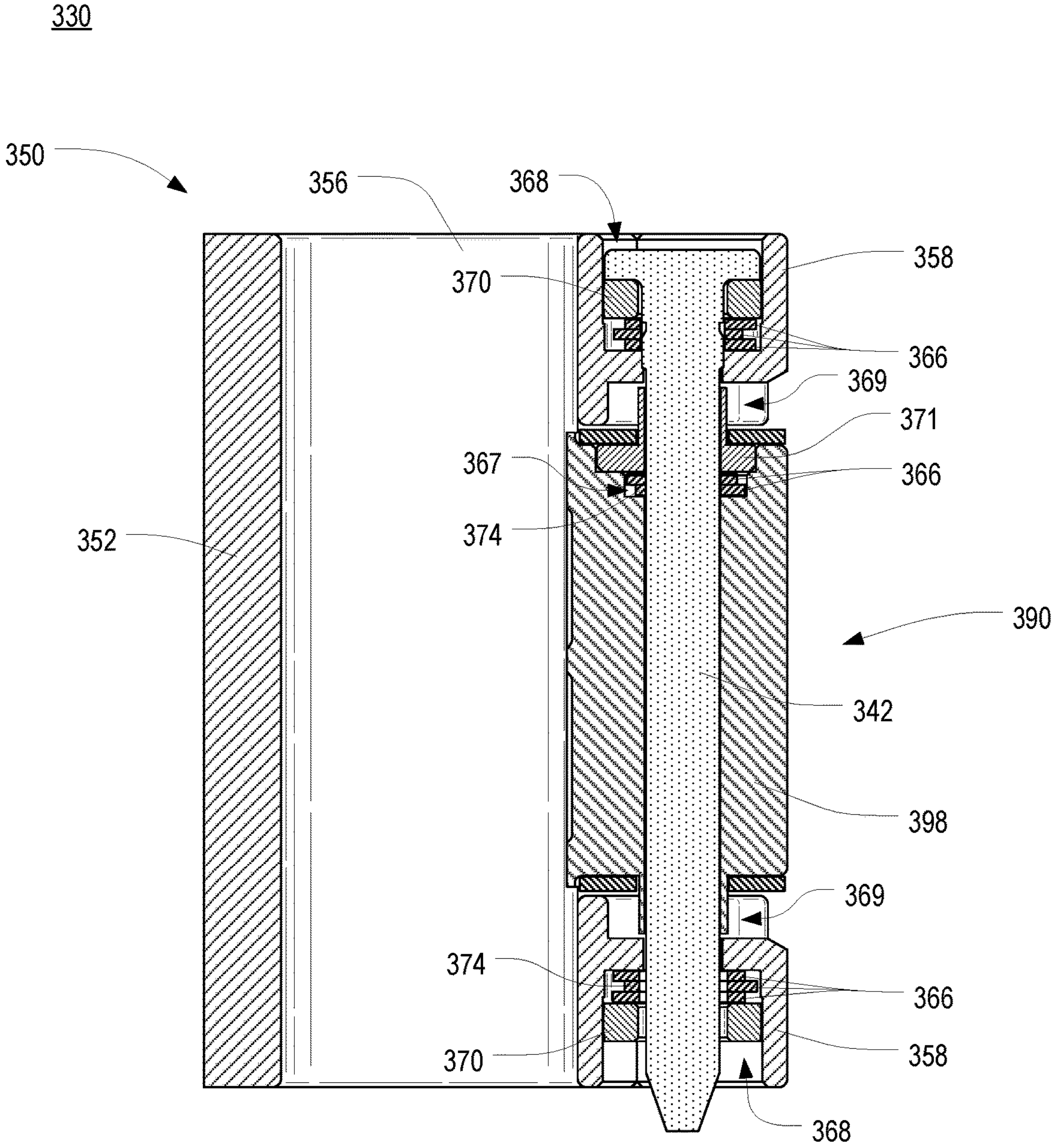
FIG. 35 is a left side cross-sectional view of the electrically-bonded internal hinge assembly of FIG. 31, taken along line 35-35.

Also, as with the internal hinge assembly 130, the external hinge assembly 330 further includes features that provide a stable electrical connection between the pin 342 and the barrel units 350,390 throughout the range of movement of the door 326 relative to the frame structure 14. In this regard, FIG. 35 is a left side cross-sectional view of the electrically-bonded external hinge assembly 330 of FIG. 31, taken along line 35-35. As shown therein, groupings of electrically-conductive bonding contact clips 366 are located in each of the knuckles 358 of the first barrel unit 350 as well as in the top of the barrel 398 of the second barrel unit 390. As with the bonding contact clips 166 of the internal hinge assembly 130, the bonding contact clips 366 are spring-biased such that they are forced inward, against sides of the pin 342, when the pin 342 is disposed in the cylindrical receptacles 364,399. In the knuckles 358 of the first barrel unit 350, the clips 366 of each grouping are arranged in a counterbore 368 in each end of the knuckle 358 and are held in place via an endcap 370. In the second barrel unit 390, the clips 366 are arranged in a counterbore 367 in an upper end of the barrel 398 and held in place by a separate section thereof.

Figure 36:
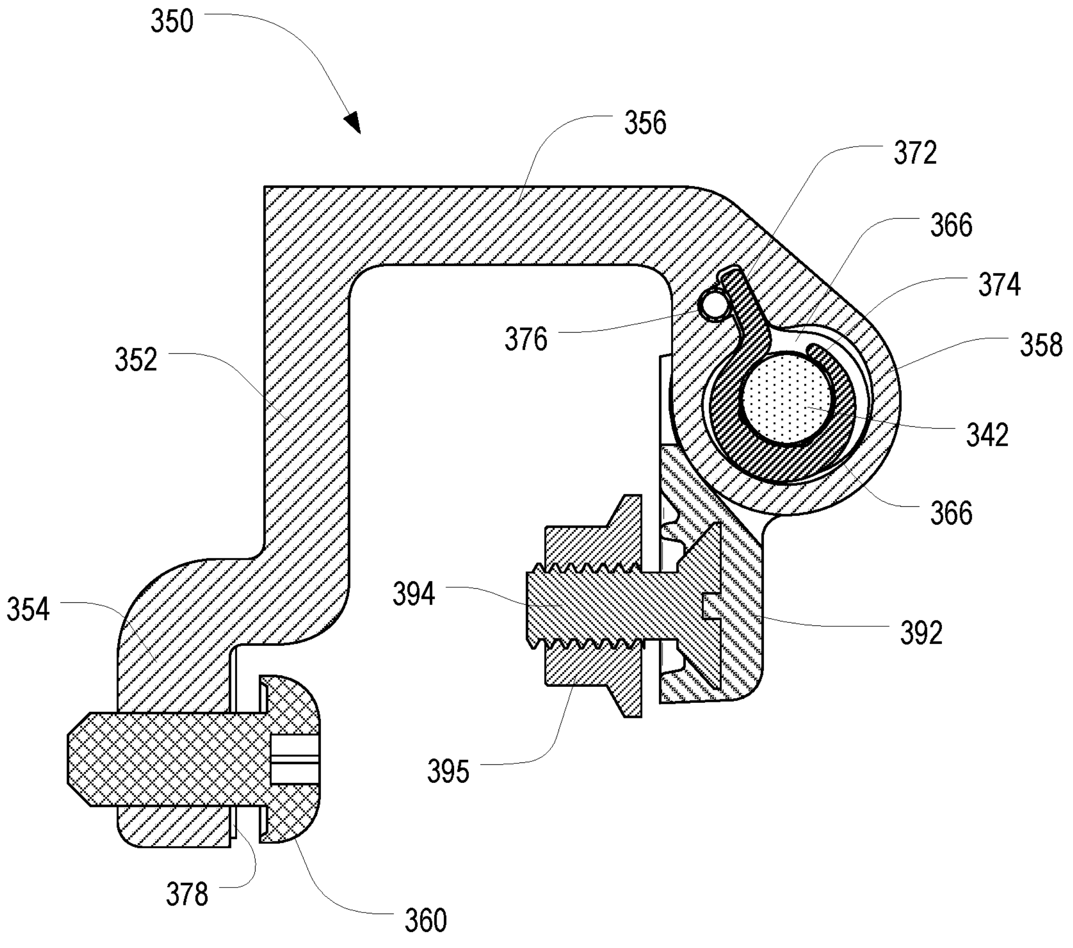
FIG. 36 is a top cross-sectional view of the electrically-bonded internal hinge assembly of FIG. 31, taken along line 36-36.

Notably, each grouping of bonding contact clips 366 includes at least one clip 366 oriented in an opposite direction from another clip 366 in the grouping so as to ensure contact between at least one of the clips 366 and the pin 342 no matter which way the door 326 is being rotated. This is better illustrated in FIG. 36, which is a top cross-sectional view of the electrically-bonded external hinge assembly 330 of FIG. 31, taken along line 36-36. As shown therein, each bonding contact clip 366 is shaped like a portion of a question mark such that it hooks around the pin 342 inside the barrels 358,398. In FIG. 36, a first clip 366 is shown in cross section, while a second clip 366 is partially visible beneath the first. From its base 372, the first clip 366 extends counter-clockwise around the pin 342, first widening and then tapering to a relatively narrow end 374. Although only partially visible, the second clip 366 is identical in shape but is reversed such that it extends clockwise around the pin 342.

The bonding contact clips 366 are also subjected to a biasing force. Again, because oppositely-oriented clips 366 are present in each grouping, the biasing force has the effect of ensuring that the first clip 366 contacts the pin 342 from one side, and that the second clip 366 contacts the pin 342 from the opposite side. Furthermore, because of how the clips 366 wrap or hook around the pin 342, these forces are applied even when the pin 342 rotates relative to the barrels 358,398. The biasing force may be applied in a variety of ways, but in the illustrated embodiment, a spiral torsion spring 376 is arranged immediately adjacent the various bases 372 of the clips 366. Other biasing mechanisms may likewise be utilized without departing from the scope of the present invention. Notably, the biasing mechanisms, such as the spiral torsion spring 376, may themselves provide further electrical connectivity between the structure in which they are housed and the bonding contact clips 366.

Thus, electrical bonding between the frame structure 14 and the door 326 may be provided by bonding the base 352 to the frame structure 14; bonding the pin 342 to the barrels 358 of the first barrel unit 350, particularly through the use of bonding elements in the form of alternating bonding contact clips 366 that are themselves bonded to other portions of the barrel unit 350 and which remain in contact with the pin 342 throughout the range of movement of the door 326 relative to the frame structure 14; bonding the barrel 398 of the second barrel unit 392 to the pin 342, particularly through the use of the use of alternating bonding contact clips 366 that are themselves bonded to other portions of the second barrel unit 390 and which remain in contact with the pin 342 throughout the range of movement of the door 326 relative to the frame structure 14; and bonding the second barrel unit 390 to the door 326.

It will be appreciated that electrically bonding a door via the pin of an external hinge assembly may be accomplished in other manners as well. For example, external hinge assemblies 530 generally similar to those of the external hinge assemblies 330 of FIGS. 31-34 may have barrel units that utilize an approach similar to that of FIGS. 8-13. More particularly, although not illustrated, the respective barrels of one or both of the first and second barrel units may each include a recess containing a bonding element in the form of a bonding contact spring that is biased against the pin, thereby maintaining an interference contact (and potentially electrical connectivity) between the bonding contact spring and the pin. The bonding contact spring may be, for example, a simple flat spring that is bowed in the middle and is thereby biased against the pin. Inclusion of one or more such springs, particularly in a grouping that includes at least one spring on each side of the pin, continues to provide some electrical connectivity (and thus electrical bonding) between the pin and at least one spring at all times, even when the pin rotates relative to the barrel, and throughout the range of movement of the door relative to the frame structure.

Figure 37:
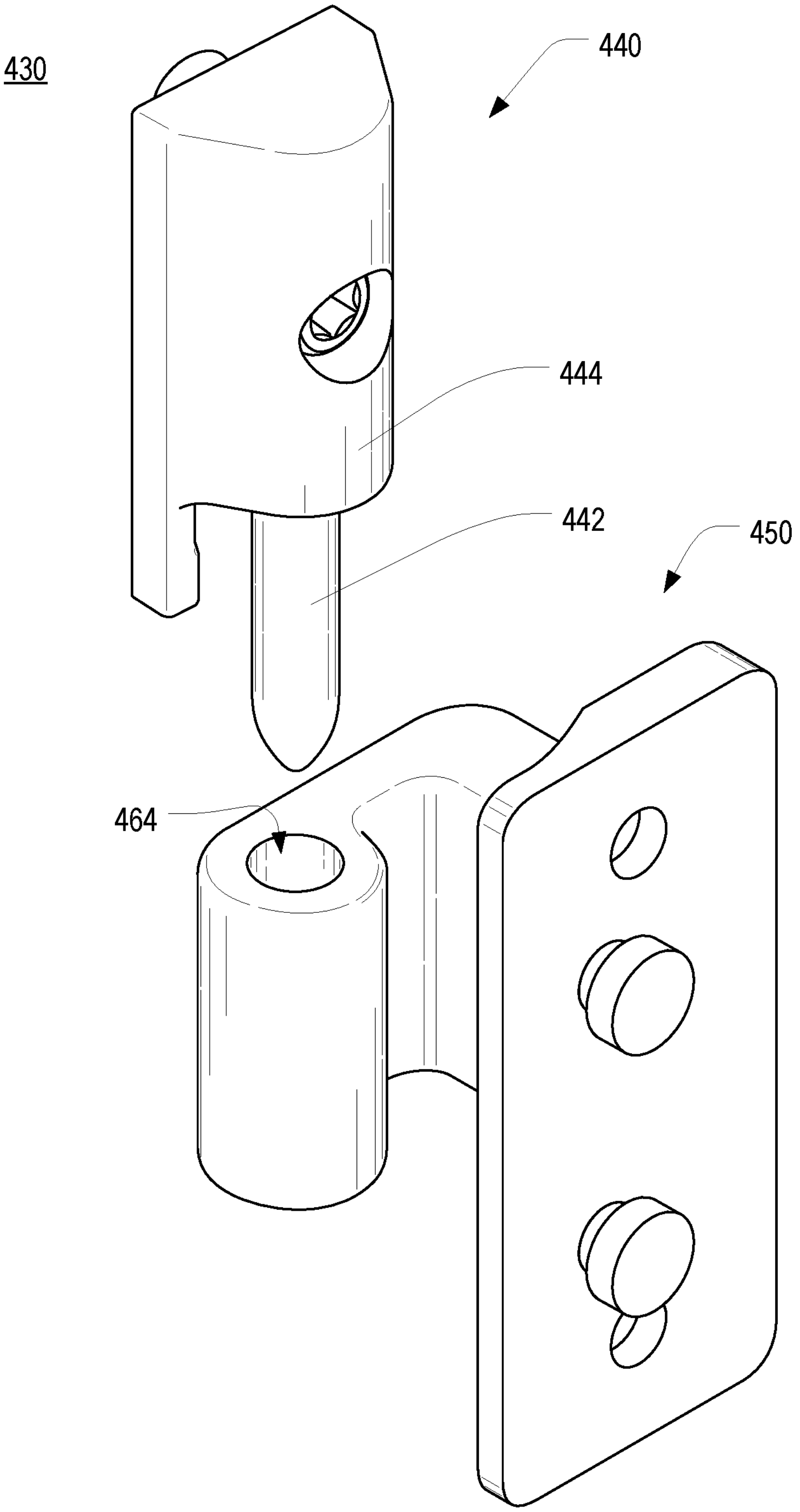
FIG. 37 is an exploded top orthogonal view of another alternative electrically-bonded hinge assembly in accordance with one or more preferred embodiments of the present invention.

Many of the approaches and mechanisms described and illustrated herein may be utilized in other types of hinge assemblies as well. In this regard, FIG. 37 is an exploded top orthogonal view of another alternative electrically-bonded hinge assembly 430 in accordance with one or more preferred embodiments of the present invention. In this bullet-type hinge assembly 430, wherein the pin assembly 440 includes a pin 442 that carries a housing 444 that is attached directly to a door (not shown), the same ring bonding method may be utilized. The pin 442 of the pin assembly 440 may be inserted and removed from a cylindrical receptacle 464 of a barrel unit 450. Use of such a hinge assembly 430 removes the complexity of the removable hinge pin.

Notably, in various alternative embodiments, the respective portions of each hinge assembly 30,130,230,330,430 may be reversed, such that the portion described as being mounted to the frame structure 14 of the enclosure 10 is instead mounted to the door, and the portion described as being mounted to the door is instead mounted to the frame structure 14, all without departing from the scope of the present invention.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A hinge assembly providing built-in electrical bonding for a removable door in an electronic equipment enclosure, comprising:

(a) a first hinge unit, adapted to be mounted to a frame structure of the electronic equipment enclosure, that includes:
  (i) a pin support comprising a barrel,
  (ii) a pin receptacle arranged in the pin support, and
  (iii) an electrically conductive bonding element disposed at least partly inside the pin support and adjacent the pin receptacle;

(b) an electrically conductive pin disposed in the pin receptacle and arranged to rotate therein; and (c) a removable second hinge unit carried on the pin and adapted to be mounted to a door of the electronic equipment enclosure, thereby supporting the door on the frame structure in a hinged relationship, wherein the second hinge unit can be removed from the first hinge unit to enable the door to be removed from the frame structure;

(d) wherein:
  (i) the electrically conductive bonding element is biased against the pin when the pin is disposed in the pin receptacle and remains in contact with the pin while the pin rotates within the pin receptacle from an open state to a closed state and from the closed state to the open state, and
  (ii) the electrically conductive bonding element is electrically connected to the frame structure so long as the first hinge unit is mounted to the frame structure,
  (iii) such that the pin is electrically bonded to the frame structure, via the biased electrically conductive bonding element, while the pin rotates within the pin receptacle from an open state to a closed state and from the closed state to the open state;

(e) wherein the electrically conductive bonding element is electrically connected to the pin support, and wherein the pin support is electrically connected to the frame structure;

(f) wherein the pin includes a cylindrical surface, and wherein the electrically conductive bonding element is biased against the cylindrical surface of the pin when the pin is disposed in the pin receptacle and remains in contact with the pin while the pin rotates within the pin receptacle from an open state to a closed state and from the closed state to the open state;

(g) wherein the electrically conductive bonding element is a bonding contact spring biased against the cylindrical surface of the pin; and (h) wherein the bonding contact spring is a simple flat spring, disposed in a recess in the barrel of the pin support, that is bowed in the middle and is thereby biased against the cylindrical surface of the pin.

2. The hinge assembly of claim 1, wherein the hinge assembly is an internal hinge assembly with the pin support being hidden by the door when the door is in the closed state.

3. The hinge assembly of claim 1, wherein the hinge assembly is an external hinge assembly with the pin support visibly wrapping around an outside edge of the door when the door is in the closed state.

4. A hinge assembly providing built-in electrical bonding for a removable door in an electronic equipment enclosure, comprising:

(a) a first hinge unit, adapted to be mounted to a frame structure of the electronic equipment enclosure, that includes:
 (i) a pin support comprising a barrel,
 (ii) a pin receptacle arranged in the pin support, and
 (iii) an electrically conductive bonding element disposed at least partly inside the pin support and adjacent the pin receptacle;
(b) an electrically conductive pin disposed in the pin receptacle and arranged to rotate therein; and
(c) a removable second hinge unit carried on the pin and adapted to be mounted to a door of the electronic equipment enclosure, thereby supporting the door on the frame structure in a hinged relationship, wherein the second hinge unit can be removed from the first hinge unit to enable the door to be removed from the frame structure;
(d) wherein:
 (i) the electrically conductive bonding element is biased against the pin when the pin is disposed in the pin receptacle and remains in contact with the pin while the pin rotates within the pin receptacle from an open state to a closed state and from the closed state to the open state, and
 (ii) the electrically conductive bonding element is electrically connected to the frame structure so long as the first hinge unit is mounted to the frame structure,
 (iii) such that the pin is electrically bonded to the frame structure, via the biased electrically conductive bonding element, while the pin rotates within the pin receptacle from an open state to a closed state and from the closed state to the open state;
(e) wherein the electrically conductive bonding element is electrically connected to the pin support, and wherein the pin support is electrically connected to the frame structure;
(f) wherein the pin includes a cylindrical surface, and wherein the electrically conductive bonding element is biased against the cylindrical surface of the pin when the pin is disposed in the pin receptacle and remains in contact with the pin while the pin rotates within the pin receptacle from an open state to a closed state and from the closed state to the open state;
(g) wherein the electrically conductive bonding element is a bonding contact spring biased against the cylindrical surface of the pin; and
(h) wherein the bonding contact spring is a wire spring, staked at one end in a groove in the barrel of the pin support, that applies a constant support against the cylindrical surface of the pin.

5. The hinge assembly of claim 4, wherein the pin includes a groove with which the wire spring engages, thereby acting as a detent for locking the pin in position.

6. The hinge assembly of claim 4, wherein the hinge assembly is an internal hinge assembly with the pin support being hidden by the door when the door is in the closed state.

7. The hinge assembly of claim 4, wherein the hinge assembly is an external hinge assembly with the pin support visibly wrapping around an outside edge of the door when the door is in the closed state.

8. A hinge assembly providing built-in electrical bonding for a removable door in an electronic equipment enclosure, comprising:

(a) a first hinge unit, adapted to be mounted to a frame structure of the electronic equipment enclosure, that includes:
 (i) a pin support comprising a barrel,
 (ii) a pin receptacle arranged in the pin support, and
 (iii) an electrically conductive bonding element disposed at least partly inside the pin support and adjacent the pin receptacle;
(b) an electrically conductive pin disposed in the pin receptacle and arranged to rotate therein; and
(c) a removable second hinge unit carried on the pin and adapted to be mounted to a door of the electronic equipment enclosure, thereby supporting the door on the frame structure in a hinged relationship, wherein the second hinge unit can be removed from the first hinge unit to enable the door to be removed from the frame structure;
(d) wherein:
 (i) the electrically conductive bonding element is biased against the pin when the pin is disposed in the pin receptacle and remains in contact with the pin while the pin rotates within the pin receptacle from an open state to a closed state and from the closed state to the open state, and
 (ii) the electrically conductive bonding element is electrically connected to the frame structure so long as the first hinge unit is mounted to the frame structure,
 (iii) such that the pin is electrically bonded to the frame structure, via the biased electrically conductive bonding element, while the pin rotates within the pin receptacle from an open state to a closed state and from the closed state to the open state;
(e) wherein the electrically conductive bonding element is electrically connected to the pin support, and wherein the pin support is electrically connected to the frame structure;
(f) wherein the pin includes a cylindrical surface, and wherein the electrically conductive bonding element is biased against the cylindrical surface of the pin when the pin is disposed in the pin receptacle and remains in contact with the pin while the pin rotates within the pin receptacle from an open state to a closed state and from the closed state to the open state;
(g) wherein the pin is electrically bonded to the second hinge unit such that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure;
(h) wherein the second hinge unit is electrically connected to the door so long as the second hinge unit is mounted to the door such that the door is electrically bonded to the frame structure via bonding between the door and the second hinge unit, bonding between the second hinge unit and the pin, bonding between the pin and the electrically conductive bonding element, bonding between the electrically conductive bonding element and the pin support, and bonding between the pin support and the frame structure; and
(i) wherein the second hinge unit includes a pin housing that is press fit into an opening provided in a structural member of the door.

9. The hinge assembly of claim 8, wherein the pin housing includes a plurality of unpainted ribs that make electrical contact with edges of the opening in the structural member of the door when the pin housing is press fit into the opening.

10. The hinge assembly of claim 8, wherein the pin housing has a key structure that interlocks with the opening in the structural member of the door.

11. The hinge assembly of claim 8, wherein the second hinge unit includes a second pin support comprising a barrel, and wherein the second pin support is electrically connected to the door.

12. The hinge assembly of claim 11, wherein the second pin support is electrically connected to the door via fasteners that make electrical contact with both the door and with the second pin support.

13. The hinge assembly of claim 12, wherein the fasteners utilize paint-cutting surfaces to establish the electrical contact between the door and the second pin support.

14. The hinge assembly of claim 8, wherein the hinge assembly is an internal hinge assembly with the pin support being hidden by the door when the door is in the closed state.

15. The hinge assembly of claim 8, wherein the hinge assembly is an external hinge assembly with the pin support visibly wrapping around an outside edge of the door when the door is in the closed state.

16. A hinge assembly providing built-in electrical bonding for a removable door in an electronic equipment enclosure, comprising:

(a) a first hinge unit, adapted to be mounted to a frame structure of the electronic equipment enclosure, that includes:
  (i) a pin support comprising a barrel,
  (ii) a pin receptacle arranged in the pin support, and
  (iii) an electrically conductive bonding element disposed at least partly inside the pin support and adjacent the pin receptacle;

(b) an electrically conductive pin disposed in the pin receptacle and arranged to rotate therein; and (c) a removable second hinge unit carried on the pin and adapted to be mounted to a door of the electronic equipment enclosure, thereby supporting the door on the frame structure in a hinged relationship, wherein the second hinge unit can be removed from the first hinge unit to enable the door to be removed from the frame structure;

(d) wherein:
  (i) the electrically conductive bonding element is biased against the pin when the pin is disposed in the pin receptacle and remains in contact with the pin while the pin rotates within the pin receptacle from an open state to a closed state and from the closed state to the open state, and
  (ii) the electrically conductive bonding element is electrically connected to the frame structure so long as the first hinge unit is mounted to the frame structure,
  (iii) such that the pin is electrically bonded to the frame structure, via the biased electrically conductive bonding element, while the pin rotates within the pin receptacle from an open state to a closed state and from the closed state to the open state;

(e) wherein the electrically conductive bonding element is electrically connected to the pin support, and wherein the pin support is electrically connected to the frame structure;

(f) wherein the pin includes a cylindrical surface, and wherein the electrically conductive bonding element is biased against the cylindrical surface of the pin when the pin is disposed in the pin receptacle and remains in contact with the pin while the pin rotates within the pin receptacle from an open state to a closed state and from the closed state to the open state;

(g) wherein the pin is electrically bonded to the second hinge unit such that the second hinge unit is electrically bonded to the frame structure via bonding between the second hinge unit and the pin, bonding between the pin and the electrically conductive bonding element, bonding between the electrically conductive bonding element and the pin support, and bonding between the pin support and the frame structure; and (h) wherein the second hinge unit includes a pin housing supporting a return spring that biases the pin into position in the pin receptacle but which, when a biasing force is overcome, permits the pin to be withdrawn from the pin receptacle such that the second hinge unit may be removed from the first hinge unit.

17. The hinge assembly of claim 16, wherein the return spring makes electrical contact with both the pin and the pin housing, thereby establishing the electrical bonding between the pin and the second hinge unit.

18. The hinge assembly of claim 17, wherein the return spring is a coil spring arranged coaxially around the pin.

19. The hinge assembly of claim 16, wherein the hinge assembly is an internal hinge assembly with the pin support being hidden by the door when the door is in the closed state.

20. The hinge assembly of claim 16, wherein the hinge assembly is an external hinge assembly with the pin support visibly wrapping around an outside edge of the door when the door is in the closed state.

* * * * *